(12) United States Patent
Shishido et al.

(10) Patent No.: US 12,717,183 B2
(45) Date of Patent: Aug. 25, 2026

(54) TOUCH PANEL

(71) Applicant: Semiconductor Energy Laboratory Co., Ltd., Atsugi (JP)

(72) Inventors: Hideaki Shishido, Atsugi (JP); Daisuke Kubota, Atsugi (JP); Yusuke Kubota, Atsugi (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 175 days.

(21) Appl. No.: 18/818,822

(22) Filed: Aug. 29, 2024

(65) Prior Publication Data

US 2025/0060625 A1 Feb. 20, 2025

Related U.S. Application Data

(63) Continuation of application No. 18/524,248, filed on Nov. 30, 2023, now Pat. No. 12,078,883, which is a (Continued)

(30) Foreign Application Priority Data

May 27, 2015 (JP) ................................ 2015-107248

(51) Int. Cl.
*G02F 1/1333* (2006.01)
*G06F 3/041* (2006.01)

(52) U.S. Cl.
CPC ........ *G02F 1/13338* (2013.01); *G06F 3/0412* (2013.01); *G06F 2203/04103* (2013.01)

(58) Field of Classification Search
CPC .. G06F 3/041; G06F 3/0412; G06F 2203/041; G06F 2203/04103; G06F 2203/04112; B32B 2457/208
See application file for complete search history.

(56) References Cited

U.S. PATENT DOCUMENTS 8,345,173 B2 1/2013 Cho
8,643,796 B2 2/2014 Kimura et al.
(Continued)

FOREIGN PATENT DOCUMENTS

CN 101387796 A 3/2009
CN 101409282 A 4/2009
(Continued)

OTHER PUBLICATIONS

International Search Report (Application No. PCT/IB2016/052926) Dated Sep. 6, 2016.
(Continued)

*Primary Examiner* — Mariam Qureshi
(74) *Attorney, Agent, or Firm* — Eric J. Robinson; Robinson Intellectual Property Law Office, P.C.

(57) ABSTRACT

To provide a thin touch panel, a touch panel having a simple structure, a touch panel which can be easily incorporated into an electronic device, or a touch panel with a small number of components. The touch panel includes pixel electrodes arranged in a matrix, a plurality of signal lines, a plurality of scan lines, a plurality of first wirings extending in a direction parallel to the signal lines, and a plurality of second wirings extending in a direction parallel to the scan line. Part of the first wiring and part of the second wiring function as a pair of electrodes included in a touch sensor. The first wiring and the second wiring each have a stripe shape or form a mesh shape and are each provided between two adjacent pixel electrodes in a plan view.

5 Claims, 54 Drawing Sheets

Related U.S. Application Data continuation of application No. 17/876,719, filed on Jul. 29, 2022, now Pat. No. 11,835,809, which is a continuation of application No. 16/827,279, filed on Mar. 23, 2020, now Pat. No. 11,428,974, which is a continuation of application No. 15/155,095, filed on May 16, 2016, now Pat. No. 10,684,500.

(56) References Cited

U.S. PATENT DOCUMENTS

| | | | | |
|---|---|---|---|---|
| 9,366,896 | B2 | 6/2016 | Yamazaki et al. | |
| 9,417,475 | B2 | 8/2016 | Fukutome et al. | |
| 9,563,301 | B2 | 2/2017 | Sun et al. | |
| 9,847,380 | B2 | 12/2017 | Yamazaki et al. | |
| 9,911,755 | B2 | 3/2018 | Yamazaki et al. | |
| 10,007,133 | B2 | 6/2018 | Yamazaki et al. | |
| 10,168,809 | B2 | 1/2019 | Hirakata et al. | |
| 10,401,662 | B2 | 9/2019 | Yamazaki et al. | |
| 2007/0072439 | A1 | 3/2007 | Akimoto et al. | |
| 2009/0066861 | A1 | 3/2009 | Rho et al. | |
| 2010/0194707 | A1 | 8/2010 | Hotelling et al. | |
| 2011/0149185 | A1 | 6/2011 | Yamazaki | |
| 2011/0255046 | A1* | 10/2011 | Kurokawa | G06F 3/0412 349/140 |
| 2012/0038585 | A1 | 2/2012 | Kim | |
| 2012/0119322 | A1 | 5/2012 | Tada | |
| 2013/0033439 | A1 | 2/2013 | Kim et al. | |
| 2013/0162570 | A1* | 6/2013 | Shin | G06F 3/0412 345/173 |
| 2013/0257798 | A1 | 10/2013 | Tamura et al. | |
| 2013/0299789 | A1 | 11/2013 | Yamazaki et al. | |
| 2013/0300968 | A1 | 11/2013 | Okajima et al. | |
| 2013/0308073 | A1 | 11/2013 | Yamazaki et al. | |
| 2013/0321333 | A1 | 12/2013 | Tamura | |
| 2013/0342801 | A1 | 12/2013 | Hamada et al. | |
| 2014/0043546 | A1 | 2/2014 | Yamazaki et al. | |
| 2014/0104508 | A1 | 4/2014 | Yamazaki et al. | |
| 2014/0106503 | A1 | 4/2014 | Hirakata et al. | |
| 2014/0118639 | A1 | 5/2014 | Matsushima | |
| 2014/0192019 | A1* | 7/2014 | Fukushima | G06F 3/0445 345/174 |
| 2014/0240617 | A1 | 8/2014 | Fukutome et al. | |
| 2014/0285732 | A1 | 9/2014 | Tanabe et al. | |
| 2014/0292711 | A1 | 10/2014 | Teranishi et al. | |
| 2015/0022500 | A1 | 1/2015 | Kita et al. | |
| 2015/0109548 | A1 | 4/2015 | Kim et al. | |
| 2015/0138041 | A1 | 5/2015 | Hirakata. et al. | |
| 2015/0185930 | A1 | 7/2015 | Xu | |
| 2015/0234538 | A1 | 8/2015 | Xu | |
| 2015/0287381 | A1* | 10/2015 | Kim | G06F 3/0418 345/82 |
| 2015/0309644 | A1 | 10/2015 | Sun et al. | |
| 2015/0346776 | A1 | 12/2015 | Miyake | |
| 2015/0346866 | A1 | 12/2015 | Kusunoki et al. | |
| 2015/0355763 | A1 | 12/2015 | Miyake et al. | |
| 2016/0028034 | A1 | 1/2016 | Yasumoto et al. | |
| 2016/0048241 | A1 | 2/2016 | Zhao et al. | |
| 2016/0048267 | A1 | 2/2016 | Lee et al. | |
| 2016/0098120 | A1 | 4/2016 | Miyake | |
| 2016/0188083 | A1 | 6/2016 | Shi et al. | |
| 2016/0282989 | A1 | 9/2016 | Hirakata et al. | |
| 2016/0282990 | A1 | 9/2016 | Kimura et al. | |
| 2016/0299601 | A1 | 10/2016 | Yamazaki et al. | |
| 2016/0328051 | A1 | 11/2016 | Shishido et al. | |
| 2016/0328061 | A1 | 11/2016 | Chiang et al. | |
| 2017/0102595 | A1 | 4/2017 | Lu | |
| 2017/0184896 | A1 | 6/2017 | Zhao | |
| 2017/0220164 | A1 | 8/2017 | Shi et al. | |

FOREIGN PATENT DOCUMENTS

| | | | |
|---|---|---|---|
| CN | 103280448 | A | 9/2013 |
| CN | 103294273 | A | 9/2013 |
| CN | 104393025 | A | 3/2015 |
| CN | 104571752 | A | 4/2015 |
| CN | 104636015 | A | 5/2015 |
| EP | 2866125 | A | 4/2015 |
| EP | 3232474 | A | 10/2017 |
| JP | 2007-096055 | A | 4/2007 |
| JP | 2007-123861 | A | 5/2007 |
| JP | 2009-271460 | A | 11/2009 |
| JP | 2010-160382 | A | 7/2010 |
| JP | 2011-137882 | A | 7/2011 |
| JP | 2012-242796 | A | 12/2012 |
| JP | 2012-247542 | A | 12/2012 |
| JP | 2013-242432 | A | 12/2013 |
| JP | 2014-035434 | A | 2/2014 |
| JP | 2014-095892 | A | 5/2014 |
| JP | 2014-095895 | A | 5/2014 |
| JP | 2014-142617 | A | 8/2014 |
| JP | 2014-186724 | A | 10/2014 |
| JP | 2014-197522 | A | 10/2014 |
| JP | 2015-014886 | A | 1/2015 |
| JP | 2015-082112 | A | 4/2015 |
| KR | 2015-0046901 | A | 5/2015 |
| WO | WO-2014/103900 | | 7/2014 |
| WO | WO-2014/190736 | | 12/2014 |
| WO | WO-2015/062274 | | 5/2015 |

OTHER PUBLICATIONS

Written Opinion (Application No. PCT/IB2016/052926) Dated Sep. 6, 2016.

Chinese Office Action (Application No. 201680030074.7) Dated Jun. 12, 2020.

Chinese Office Action (Application No. 201680030074.7) Dated Feb. 7, 2021.

Gao.H et al., Liquid Crystal and Flat Panel Display Technology, Jun. 1, 2007, p. 218, Beijing University of Posts and Telecommunications Press.

Notification of Reexamination (Application No. 201680030074.7) Dated Jul. 5, 2024.

* cited by examiner

FIG. 9A
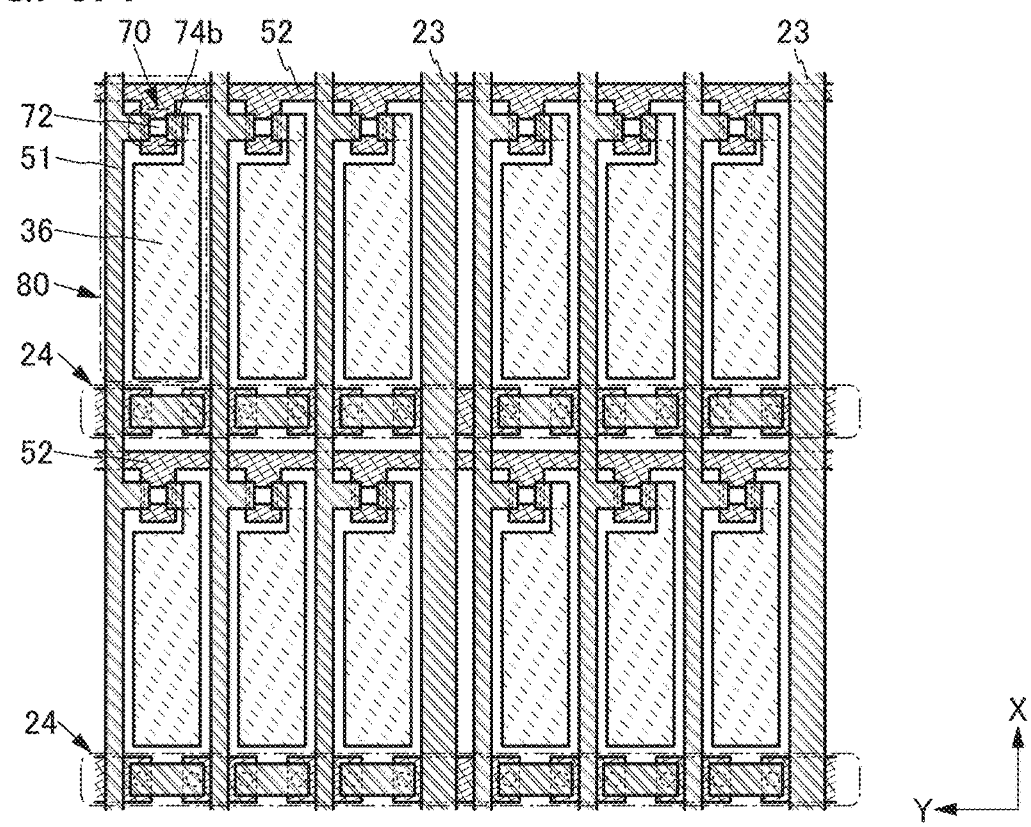
FIG. 9B
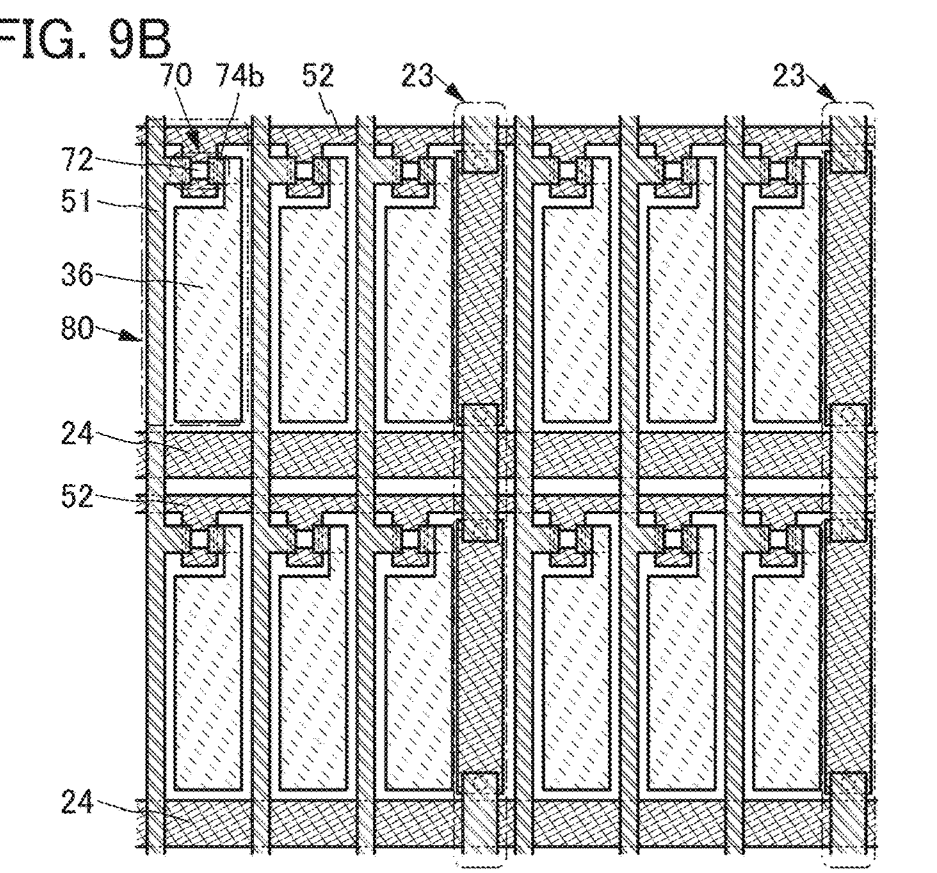
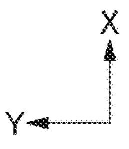

FIG. 10A
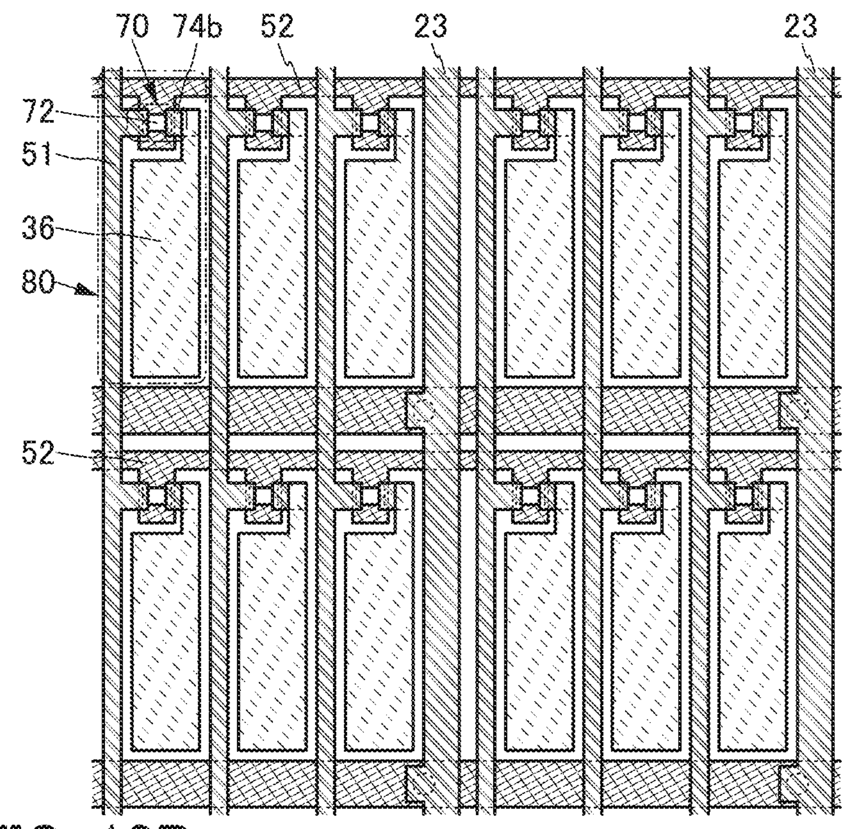
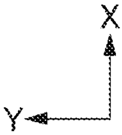
FIG. 10B
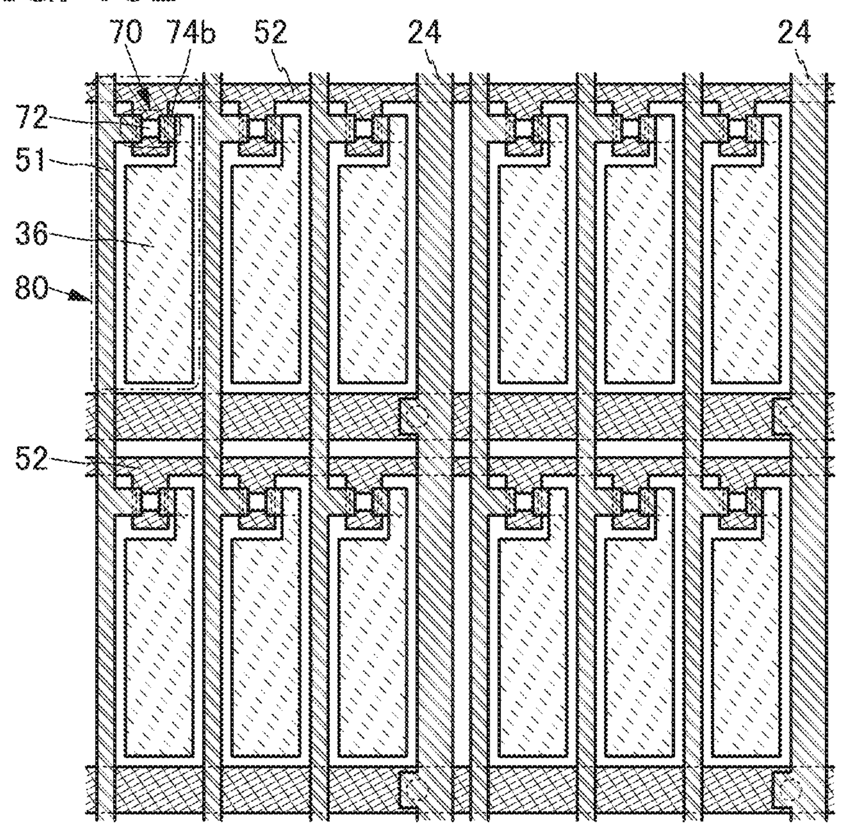
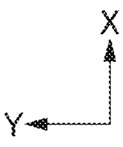

FIG. 20
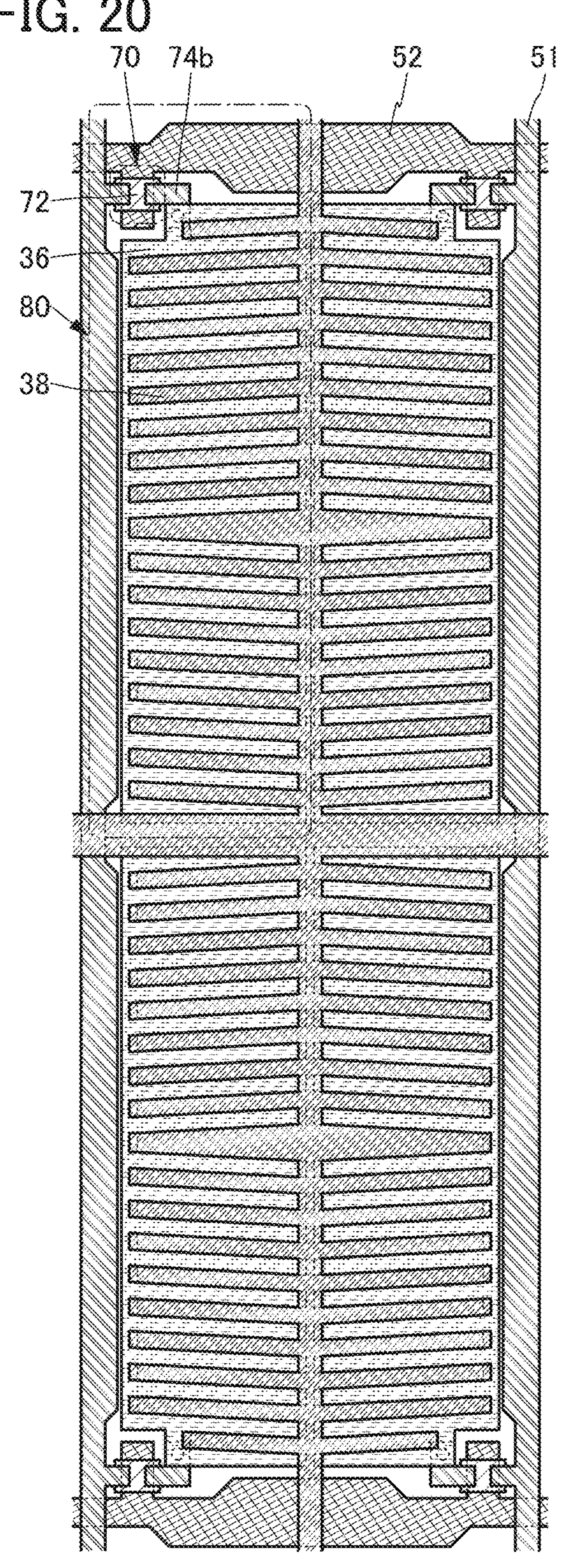
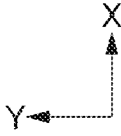

70a
74b
52
55
23
51
23
72
76
51
85
36
80
70b
24
52
24
X
Y 70a
74b
52
55
23
51
23
72
76
51
85
36
80
70b
24
52
24
X
Y 70a
74b
52
55
23
51
72
76
51
85
36
80
70b
52
X
Y 70a
74b
52
55
23
51
72
76
51
85
36
80
70b
52
X
Y

FIG. 25A
70a 74b 52 55 23 51 23
72
76
51
85
36
80
70b
24
52
24
X
Y
FIG. 25B
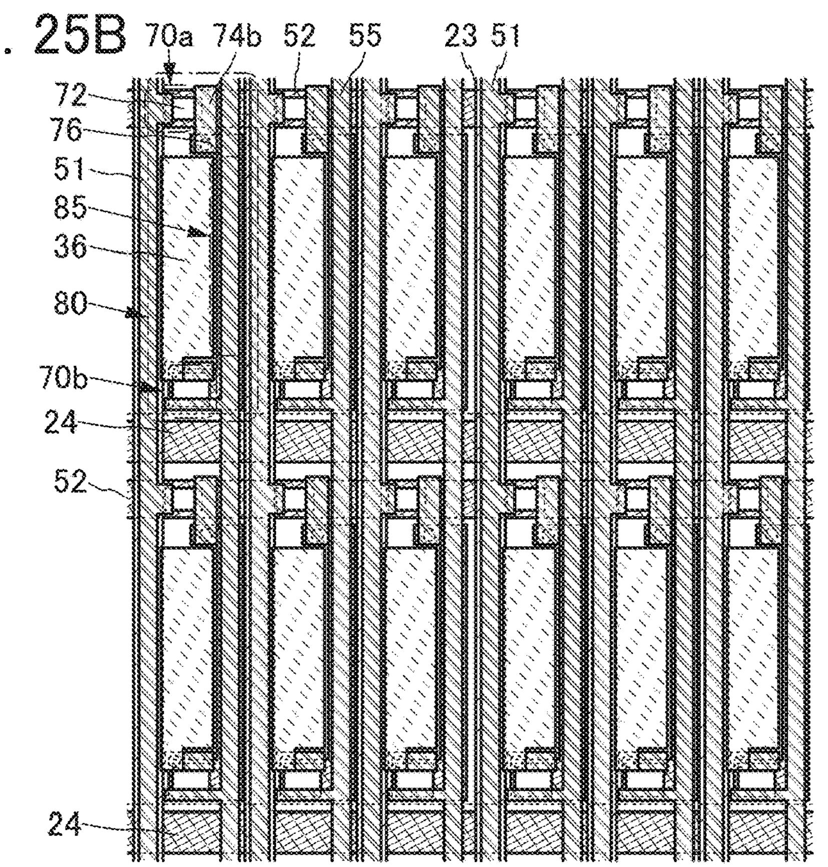
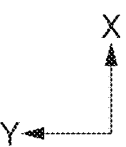

FIG. 44A1
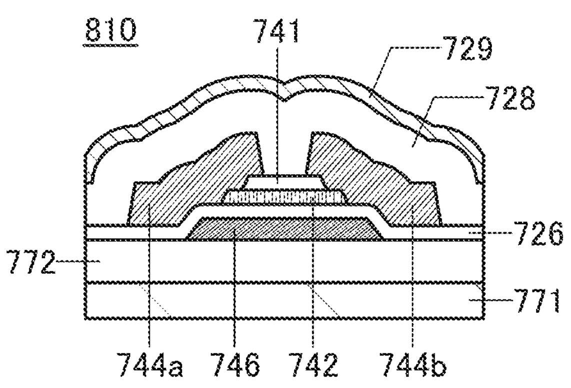
FIG. 44A2
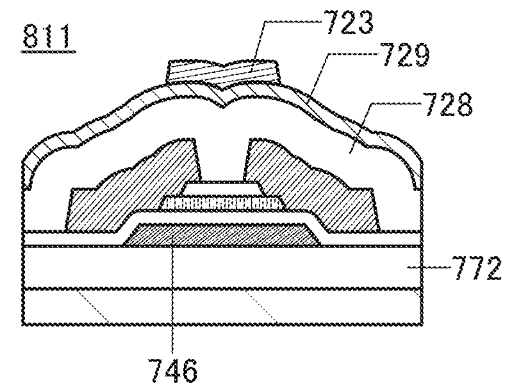
FIG. 44B1
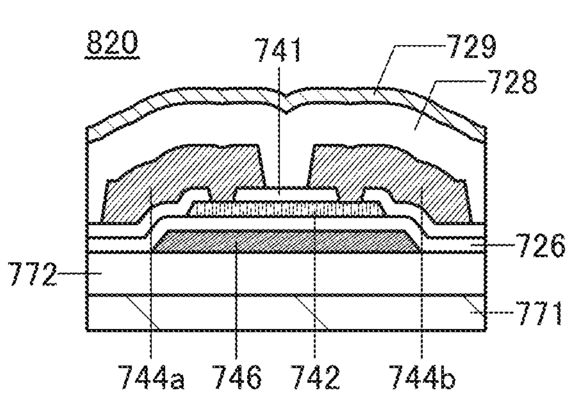
FIG. 44B2
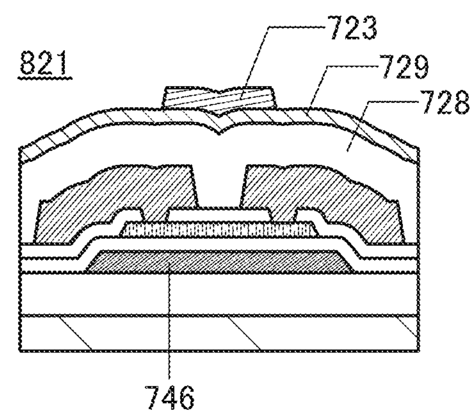
FIG. 44C1
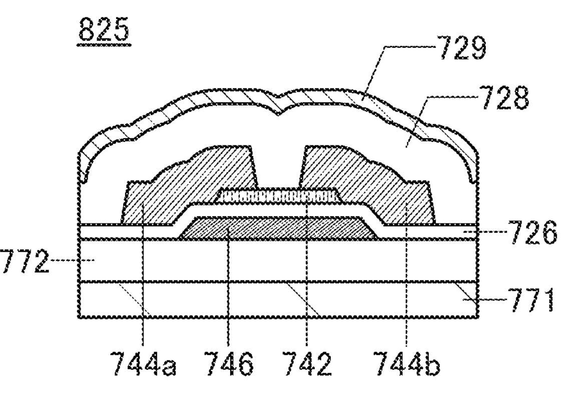
FIG. 44C2
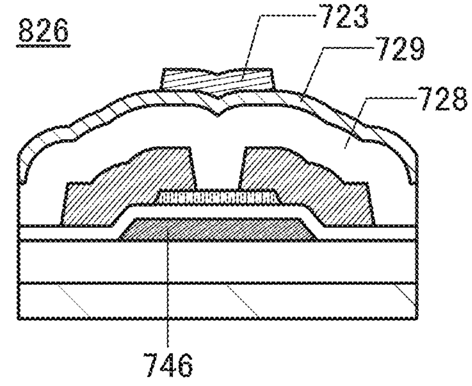

FIG. 45A1
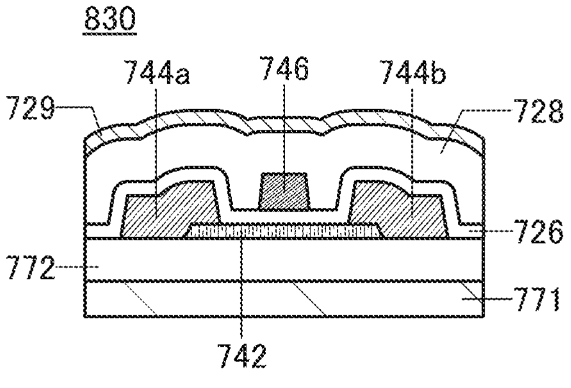
FIG. 45A2
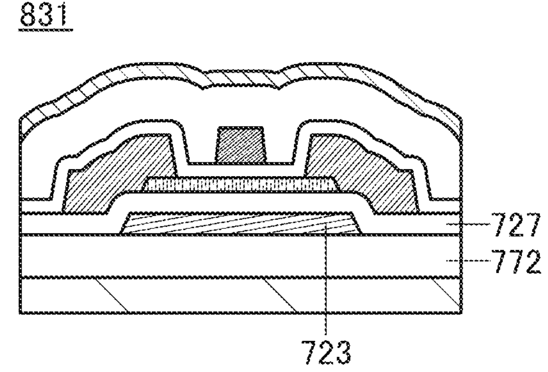
FIG. 45A3
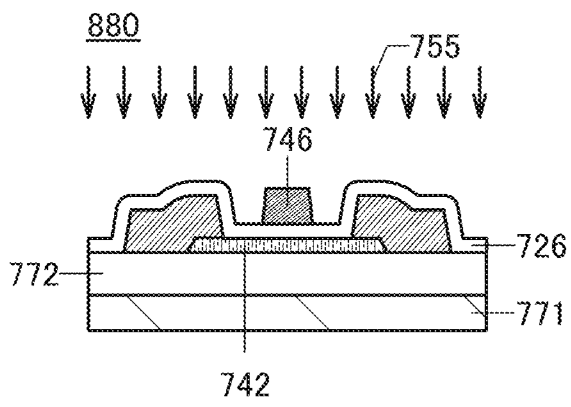
FIG. 45B1
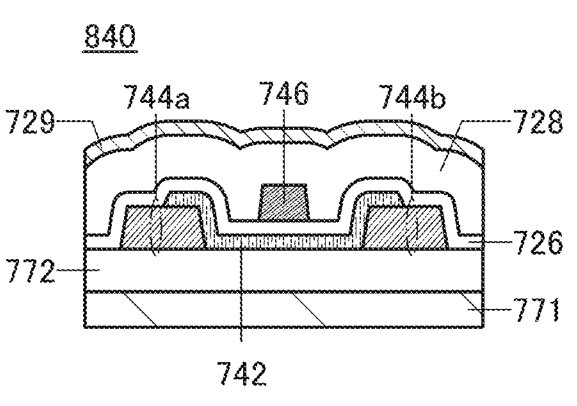
FIG. 45B2
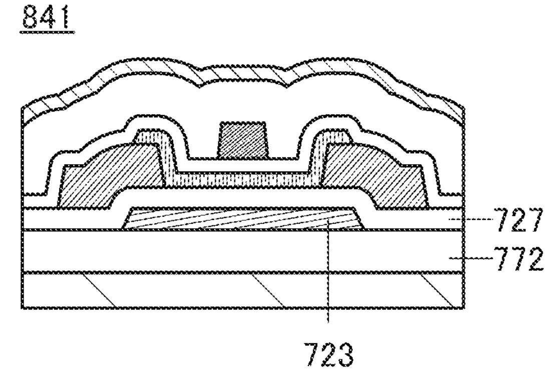

FIG. 46A1
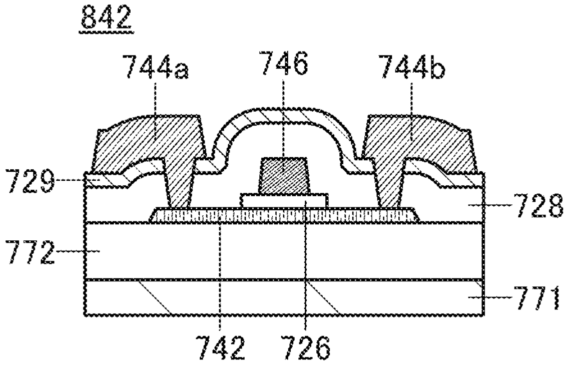
FIG. 46A2
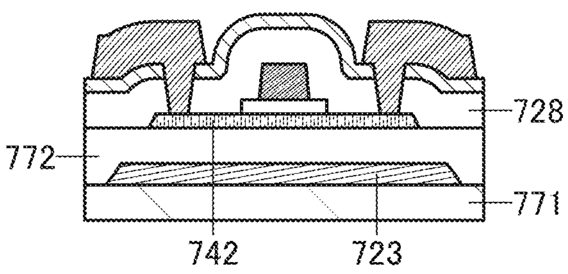
FIG. 46A3
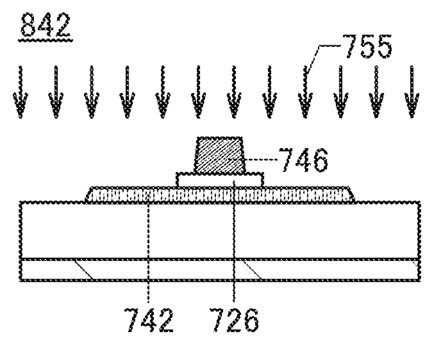
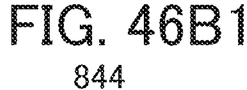
FIG. 46B1
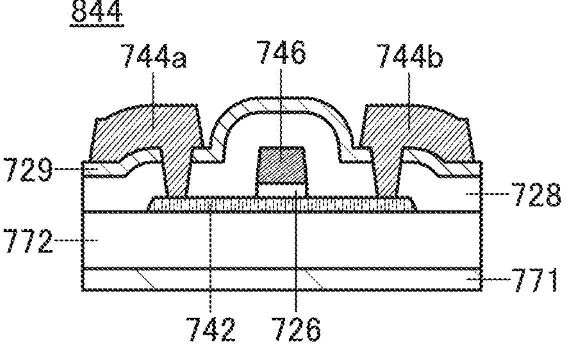
FIG. 46B2
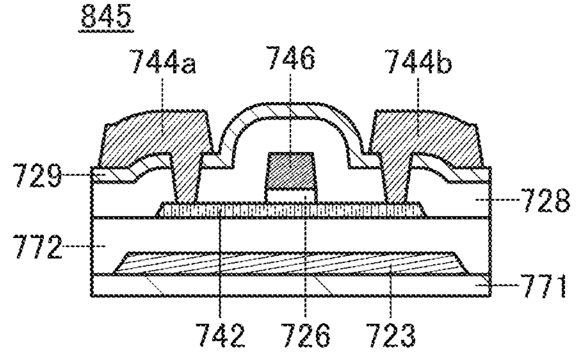
FIG. 46C1
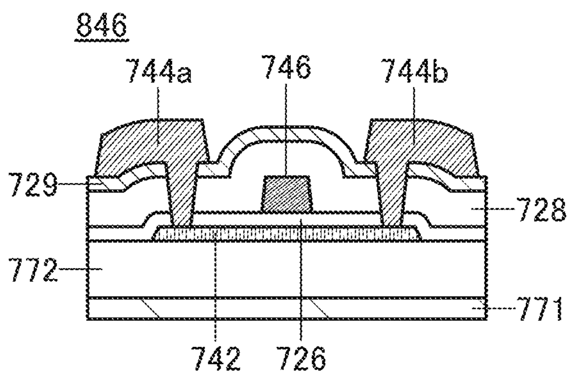
FIG. 46C2
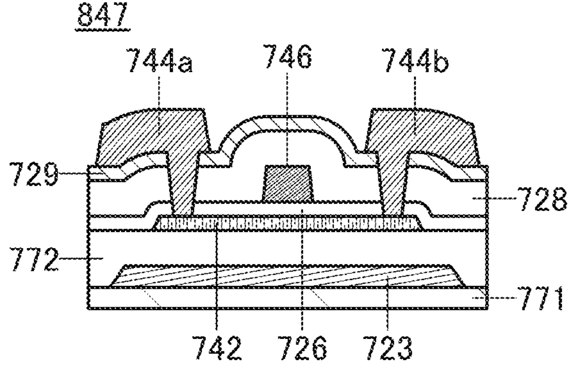

FIG. 54A
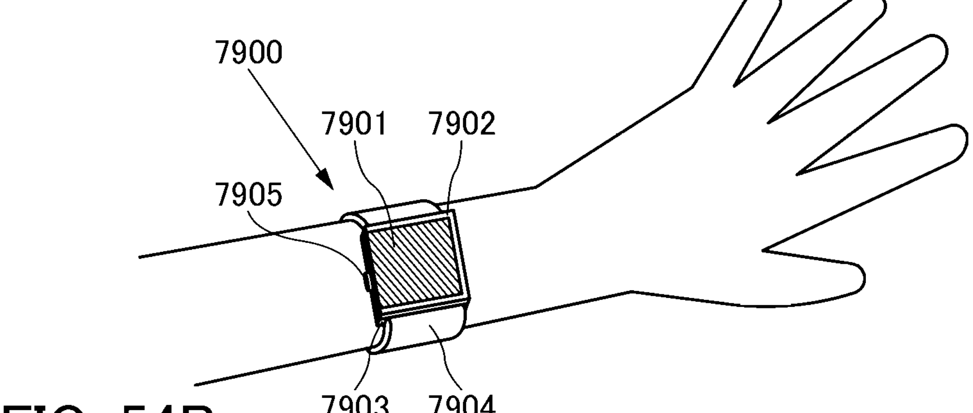
FIG. 54B
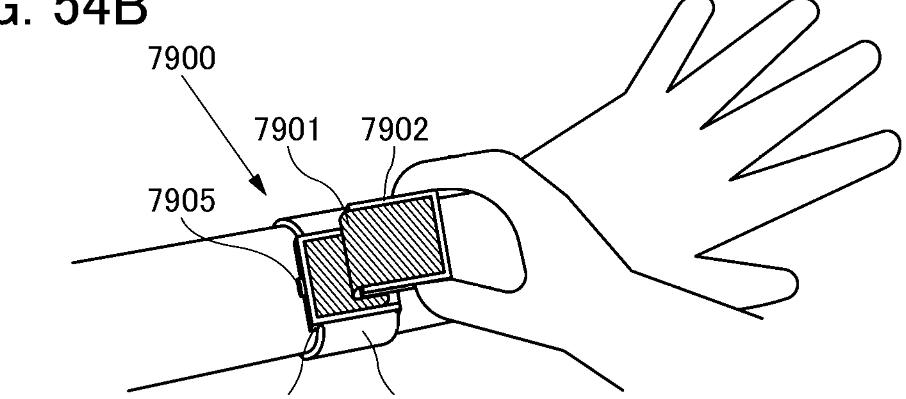
FIG. 54C
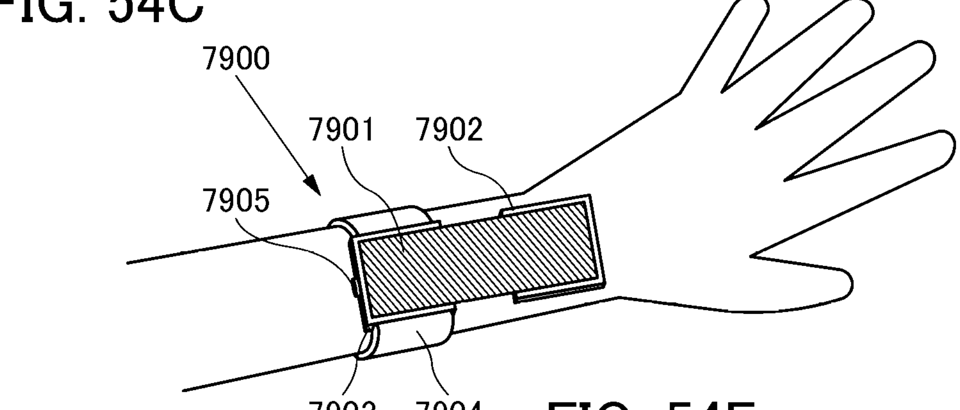
FIG. 54D
FIG. 54E
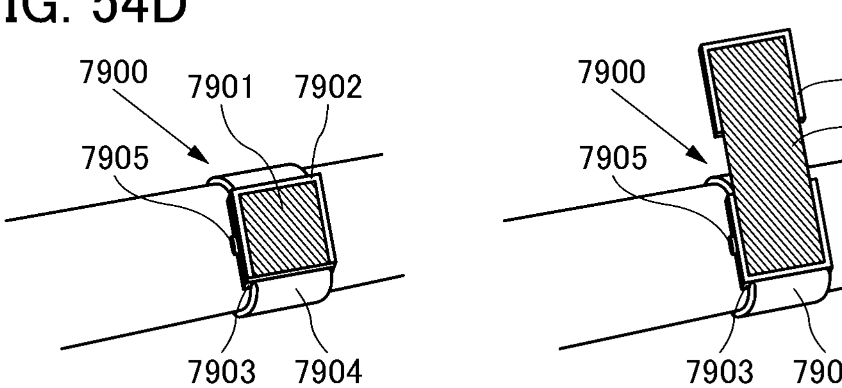

TOUCH PANEL

BACKGROUND OF THE INVENTION

1. Field of the Invention

One embodiment of the present invention relates to an input device. One embodiment of the present invention relates to a display device. One embodiment of the present invention relates to an input/output device. One embodiment of the present invention relates to a touch panel.

Note that one embodiment of the present invention is not limited to the above technical field. Examples of the technical field of one embodiment of the present invention disclosed in this specification and the like include a semiconductor device, a display device, a light-emitting device, a power storage device, a memory device, an electronic device, a lighting device, an input device, an input/output device, a driving method thereof, and a manufacturing method thereof.

In this specification and the like, a semiconductor device generally means a device that can function by utilizing semiconductor characteristics. A semiconductor element such as a transistor, a semiconductor circuit, an arithmetic device, and a memory device are each an embodiment of a semiconductor device. An imaging device, a display device, a liquid crystal display device, a light-emitting device, an input device, an input/output device, an electro-optical device, a power generation device (including a thin film solar cell, an organic thin film solar cell, and the like), and an electronic device may each include a semiconductor device.

2. Description of the Related Art

In recent years, a display device provided with a touch sensor as a position-input device has been in practical use. For example, a display device provided with a touch sensor is called a touch panel, a touch screen, or the like. Examples of a portable information terminal provided with a touch panel are a smartphone and a tablet terminal.

As one of display devices, there is a liquid crystal display device provided with a liquid crystal element. For example, an active matrix liquid crystal display device, in which pixel electrodes are arranged in a matrix and transistors are used as switching elements connected to respective pixel electrodes, has attracted attention.

For example, an active matrix liquid crystal display device including transistors, in which metal oxide is used for a channel formation region, as switching elements connected to respective pixel electrodes is already known (Patent Documents 1 and 2).

It is known that a liquid crystal display device is classified into two major types: transmissive type and reflective type.

In a transmissive liquid crystal display device, a backlight such as a cold cathode fluorescent lamp or an LED is used, and a state in which light from the backlight is transmitted through liquid crystal and output to the outside of the liquid crystal display device or a state in which light is not output is selected using optical modulation action of liquid crystal, whereby bright and dark images are displayed. Furthermore, those displays are combined to display an image.

In a reflective liquid crystal display device, a state in which external light, that is, incident light is reflected at a pixel electrode and output to the outside of the device or a state in which incident light is not output to the outside of the device is selected using optical modulation action of liquid crystal, whereby bright and dark images are displayed. Furthermore, those displays are combined to display an image.

Examples of the display device include a light-emitting device including a light-emitting element such as an organic electroluminescent (EL) element or a light-emitting diode (LED), and an electronic paper performing display by an electrophoretic method or the like.

Patent Document 3 discloses a flexible light-emitting device in which an organic EL element is used.

REFERENCE

Patent Document

[Patent Document 1] Japanese Published Patent Application No. 2007-123861

[Patent Document 2] Japanese Published Patent Application No. 2007-096055

[Patent Document 3] Japanese Published Patent Application No. 2014-197522

SUMMARY OF THE INVENTION

What is desirable is a touch panel in which a display panel is provided with a function of inputting data with a finger, a stylus, or the like touching a screen as a user interface.

Furthermore, it is demanded that an electronic appliance using a touch panel is reduced in thickness and weight. Therefore, a touch panel itself is required to be reduced in thickness and weight.

For example, in a touch panel, a substrate provided with a touch sensor can be attached to the display surface side of a display panel. However, in such a structure, the thickness of the touch panel cannot be reduced and the number of components is increased.

One object of one embodiment of the present invention is to provide a thin touch panel. Another object is to provide a touch panel having a simple structure. Another object is to provide a touch panel which can be easily incorporated into an electronic device. Another object is to provide a touch panel with a small number of components. Another object is to provide a lightweight touch panel. Another object is to provide a touch panel with high detection sensitivity.

Another object is to provide a novel input device. Another object is to provide a novel input device, a novel output device, a novel input/output device, or the like. Note that the description of these objects does not disturb the existence of other objects. In one embodiment of the present invention, there is no need to achieve all the objects. Other objects can be derived from the description of the specification, the drawings, the claims, and the like.

One embodiment of the present invention is a touch panel including a display portion, a signal line, a scan line, a first wiring, and a second wiring. The display portion includes a plurality of pixel electrodes. The plurality of pixel electrodes are arranged in a first direction and a second direction intersecting the first direction in a matrix. The signal line extends in the first direction. The scan line extends in the second direction. The first wiring extends in the first direction. The second wiring extends in the second direction. The first wiring includes a first portion parallel to the signal line, and the first portion is between two pixel electrodes adjacent in the second direction in a plan view. The second wiring includes a second portion parallel to the scan line, and the second portion is between two pixel electrodes adjacent in the first direction in a plan view.

In the above, it is preferable that the first wiring do not intersect the signal line in a portion overlapping with the display portion and the second wiring do not intersect the scan line in a portion overlapping with the display portion. In that case, it is preferable that the signal line and the first wiring be formed by processing the same conductive film and the scan line and the second wiring be formed by processing the same conductive film.

Alternatively, it is preferable that the first wiring be formed by processing the same conductive film as the signal line, and the second wiring include a third portion formed by processing the same conductive film as the signal line and a fourth portion formed by processing the same conductive film as the scan line. In that case, the fourth portion preferably intersects the signal line or the first wiring.

Alternatively, it is preferable that the second wiring be formed by processing the same conductive film as the scan line and the first wiring include a fifth portion formed by processing the same conductive film as the signal line and a sixth portion formed by processing the same conductive film as the scan line. In that case, the fifth portion preferably intersects the scan line or the second wiring.

Alternatively, the first wiring preferably includes a seventh portion parallel to the scan line and intersecting the signal line. In that case, the seventh portion is preferably between two pixel electrodes adjacent in the first direction. The second wiring preferably includes an eighth portion parallel to the signal line and intersecting the scan line. The eighth portion is preferably between two pixel electrodes adjacent in the second direction.

In that case, the first wiring preferably has a mesh shape surrounding one or more of the pixel electrodes in a plan view. The second wiring preferably has a mesh shape surrounding another one or more of the pixel electrodes in a plan view.

In the above, the first portion of the first wiring, the eighth portion of the second wiring, and the signal line are preferably formed by processing the same conductive film. The seventh portion of the first wiring, the second portion of the second wiring, and the scan line are preferably formed by processing the same conductive film.

In the above, one of the first wiring and the second wiring is preferably formed by processing the same conductive film as the scan line or the signal line. The other of the first wiring and the second wiring is preferably formed by processing a conductive film different from the scan line and the signal line. In that case, the other of the first wiring and the second wiring is preferably formed by processing the same conductive film as the pixel electrode.

Alternatively, in the above, the first wiring is preferably formed by processing a conductive film different from the scan line and the signal line. The second wiring is preferably formed by processing a conductive film different from the scan line and the signal line. In that case, the first wiring or the second wiring, or the first wiring and the second wiring are preferably formed by processing the same conductive film as the pixel electrode.

In the above, the touch panel preferably includes a liquid crystal element including a pixel electrode, a liquid crystal, and a common electrode.

In that case, the touch panel preferably includes a first substrate, a second substrate, a first polarizing plate, a second polarizing plate, and a backlight. The backlight, the first polarizing plate, the first substrate, the second substrate, and the second polarizing plate are preferably stacked in this order. In that case, the signal line, the scan line, the first wiring, the second wiring, and the pixel electrode are preferably provided on the second substrate side of the first substrate.

Alternatively, in the above, the touch panel preferably includes a light-emitting element including a pixel electrode, an EL layer, and a common electrode.

In that case, the touch panel preferably includes a first substrate, a second substrate, and a polarizing plate. The polarizing plate, the first substrate, and the second substrate are preferably stacked in this order. In that case, the signal line, the scan line, the first wiring, the second wiring, and the pixel electrode are preferably provided on the second substrate side of the first substrate.

In this specification and the like, a display panel has a function of displaying or outputting an image or the like on or to a display surface. Thus, the display panel is one embodiment of an output device.

In this specification and the like, a structure in which a connector such as a flexible printed circuit (FPC) or a tape carrier package (TCP) is attached to a substrate of a display panel, or a structure in which an integrated circuit (IC) is mounted on a substrate by a chip on glass (COG) method is referred to as a display panel module or a display module, or simply referred to as a display panel or the like in some cases.

In this specification and the like, a touch sensor has a function of sensing the contact or approach of an object such as a finger or a stylus. Therefore, the touch sensor is one embodiment of an output device.

In this specification and the like, a substrate including a touch sensor is referred to as a touch sensor panel or simply referred to as a touch sensor or the like in some cases. Furthermore, in this specification and the like, a structure in which a connector such as an FPC or a TCP is attached to a substrate of a touch sensor panel, or a structure in which an integrated circuit (IC) is mounted on a substrate by a COG method is referred to as a touch sensor panel module, a touch sensor module, or a sensor module, or simply referred to as a touch sensor or the like in some cases.

Note that in this specification and the like, a touch panel has a function of displaying or outputting an image or the like on or to a display surface and a function as a touch sensor capable of detecting the contact or approach of an object such as a finger or a stylus on or to the display surface. Therefore, the touch panel is an embodiment of an input/output device.

A touch panel can be referred to, for example, a display panel (or display device) with a touch sensor or a display panel (or display device) having a touch sensor function.

A touch panel can include a display panel and a touch sensor panel. Alternatively, a touch panel can have a function of a touch sensor inside a display panel.

In this specification and the like, a structure in which a connector such as an FPC or a TCP is attached to a substrate of a touch panel, or a structure in which an integrated circuit (IC) is mounted on a substrate by a COG method is referred to as a touch panel module, a display module, or simply referred to as a touch panel or the like in some cases.

According to one embodiment of the present invention, a thin touch panel can be provided. Alternatively, a touch panel with a simple structure can be provided. Alternatively, a touch panel which can be easily incorporated into an electronic device. Alternatively, a touch panel with a small number of components can be provided. Alternatively, a lightweight touch panel can be provided.

One embodiment of the present invention does not necessarily achieve all the effects listed above. Other effects will be apparent can be derived from the description of the specification, the drawings, the claims, and the like.

BRIEF DESCRIPTION OF THE DRAWINGS

FIGS. 9A and 9B each show a structure example of a touch panel module of an embodiment.

FIGS. 10A and 10B each show a structure example of a touch panel module of an embodiment.

FIGS. 11A and 11B each show a structure example of a touch panel module of an embodiment.

FIGS. 12A and 12B each show a structure example of a touch panel module of an embodiment.

FIG. 20 shows a structure example of a pixel of an embodiment.

FIGS. 25A and 25B each show a structure example of a touch panel module of an embodiment.

FIG. 29 shows a configuration example of a circuit of an embodiment.

FIG. 32 shows a structure example of a touch panel module of an embodiment.

FIG. 35 shows a structure example of a touch panel module of an embodiment.

FIG. 38 shows a structure example of a touch panel module of an embodiment.

FIG. 40 shows a structure example of a touch panel module of an embodiment.

FIG. 41 shows a structure example of a touch panel module of an embodiment.

FIG. 42 shows a structure example of a touch panel module of an embodiment.

FIGS. 44A1, 44A2, 44B1, 44B2, 44C1, and 44C2 are cross-sectional views each illustrating an embodiment of a transistor.

FIGS. 45A1, 45A2, 45A3, 45B1, and 45B2 are cross-sectional views each illustrating an embodiment of a transistor.

FIGS. 46A1, 46A2, 46A3, 46B1, 46B2, 46C1, and 46C2 are cross-sectional views each illustrating an embodiment of a transistor.

FIGS. 52A, 52B, 52C1, 52C2, 52D, 52E, 52F, 52G, and 52H each illustrate an electronic device of an embodiment.

FIGS. 53A1, 53A2, 53B, 53C, 53D, 53E, 53F, 53G, 53H, and 53I each illustrate an electronic device of an embodiment.

FIGS. 54A to 54E illustrate electronic devices of embodiments.

DETAILED DESCRIPTION OF THE INVENTION

Figure 1A:
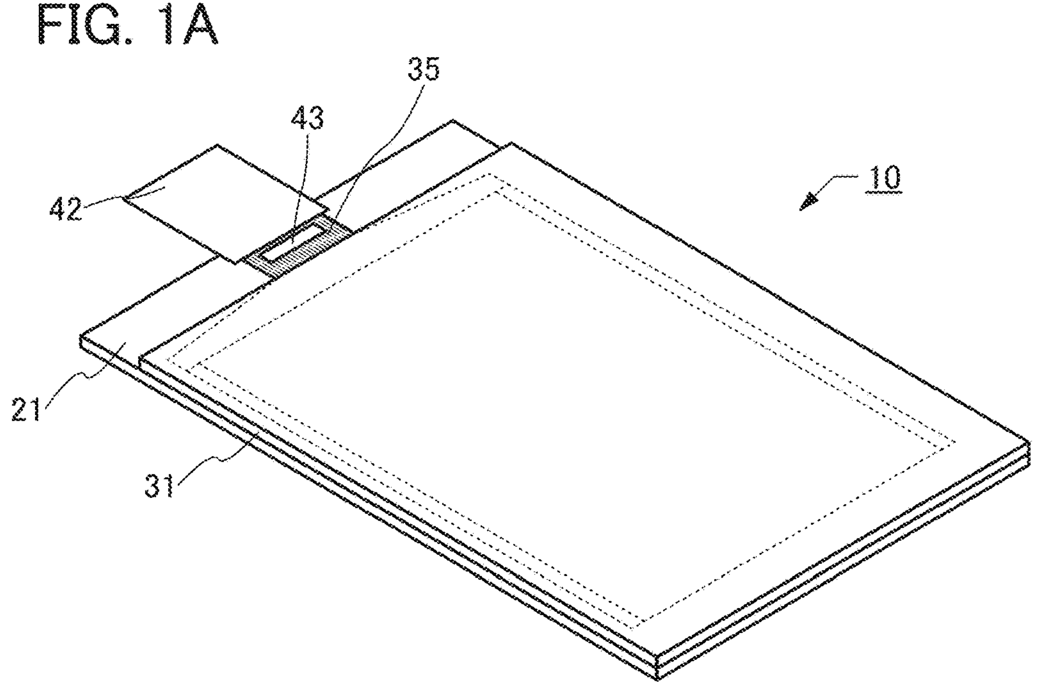
FIGS. 1A and 1B show a structure example of a touch panel module of an embodiment.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below.

Note that in the structures of the invention described below, the same portions or portions having similar functions are denoted by the same reference numerals in different drawings, and description of such portions is not repeated. Furthermore, the same hatching pattern is applied to portions having similar functions, and the portions are not especially denoted by reference numerals in some cases.

Note that in each drawing described in this specification, the size, the layer thickness, or the region of each component is exaggerated for clarity in some cases. Therefore, embodiments of the present invention are not limited to such a scale.

Note that in this specification and the like, ordinal numbers such as "first", "second", and the like are used in order to avoid confusion among components and do not limit the number.

Embodiment 1

In this embodiment, a structure example of a touch panel of one embodiment of the present invention will be described with reference to drawings. Specifically, an example where a capacitive touch sensor is used for the touch panel of one embodiment of the present invention will be described below.

Examples of the capacitive touch sensor are a surface capacitive touch sensor and a projected capacitive touch sensor. Examples of a projected capacitive touch sensor are a self-capacitive touch sensor and a mutual capacitive touch sensor. The use of a mutual capacitive touch sensor is preferable because multiple points can be detected simultaneously.

The touch sensor that can be used for the touch panel of one embodiment of the present invention includes a pair of conductive layers. Capacitive coupling is generated in the pair of conductive layers. The capacitance of the pair of conductive layers changes when an object touches or approaches the pair of conductive layers. Utilizing this effect, detection can be conducted.

The touch panel of one embodiment of the present invention includes pixels arranged in a matrix, a plurality of signal lines, and a plurality of scan lines. The pixel includes a pixel electrode. The signal lines and the scan lines are provided to extend in directions intersecting each other. Here, a direction in which the signal lines extend is referred to as a first direction or an X direction, and a direction in which the scan lines extend is referred to as a second direction or a Y direction. It is acceptable as long as the first direction and the second direction intersect each other; however, they are preferably orthogonal to each other.

In addition, the touch panel of one embodiment of the present invention includes a plurality of first wirings extending in the first direction and a plurality of second wirings extending in the second direction. Part of the first wiring and part of the second wiring function as a pair of electrodes included in the touch sensor. In other words, capacitive coupling occurs between the first wiring and the second wiring.

In this specification and the like, "a layer, a wiring, a structure, or the like extends in a direction" means that the layer, the wiring, the structure, or the like is provided to extend in the direction. When seen from the above, the layer, the wiring, the structure, or the like may have a long extending shape in the direction, and may partly have a portion extending in a direction different from the direction.

The first wiring and the second wiring each can be provided between two adjacent pixel electrodes in a plan view. In this case, part of the first wiring and part of the second wiring may overlap with the pixel electrode.

The pair of wirings included in the touch sensor are provided in a region other than an optical path of light from a display element; thus, moire is not generated in principle. Here, moire means interference fringes generated in the case where two or more regular patterns overlap with each other. As a result, a touch panel having extremely high display quality can be obtained.

It is preferable that a light-blocking layer or a circularly polarizing plate be provided closer to the display surface side than the pair of wirings included in the touch sensor are. This can reduce or prevent reflection of external light caused by the pair of wirings, and the pair of wirings are less likely to be recognized by a user.

For example, the first wiring and the second wiring each can have a shape extending in the first direction or the second direction in the form of stripes. In that case, some of the plurality of first wirings are electrically connected to each other in a region outside the display portion that displays an image to form a group. Similarly, some of the plurality of second wirings are electrically connected to each other in a region outside the display portion to form a group. With such a structure, an area which contributes to detection in the first wiring and the second wiring is increased, so that the detection sensitivity can be increased.

As another example, the first wiring and the second wiring each can have a mesh shape including portions parallel to the first direction and the second direction. In that case, one or more pixel electrodes can be provided in an opening of the mesh in a plan view. When the first wiring and the second wiring each have a mesh shape, the conductivity in the extending directions can be increased, so that delay of signals can be suppressed; thus, the detection sensitivity can be increased.

Here, the first wiring and the second wiring are preferably formed by processing the same film as a wiring, an electrode, a semiconductor, or the like included in the pixel or the display element of the touch panel, a driver circuit, or the like. Thus, a touch panel can be manufactured without providing a special step for adding a function of a touch sensor, which leads to a reduction in manufacturing cost.

Typically, in the case where the first wiring and the second wiring each have a stripe shape as described above, for example, the first wiring can be formed by processing the same conductive film as the signal line and the second wiring can be formed by processing the same conductive film as the scan line. Thus, the first wiring and the second wiring can be formed over different insulating layers, so that the first wiring and the second wiring can intersect each other without a special contrivance. Since the first wiring and the scan line are formed over different insulating layers and the second wiring and the signal line are formed over different insulating layers in that case, the first wiring and the scan line, or the second wiring and the signal line can intersect each other without a special contrivance.

For example, in the case where the first wiring and the second wiring each have a mesh shape as described above, the mesh shape can be formed in such a manner that portions parallel to the first direction are formed by processing the same conductive film as the signal line and portions parallel to the second direction are formed by processing the same conductive film as the scan line and these two types of portions are electrically connected to each other. Thus, arbitrary two of the first wiring, the second wiring, the signal line, and the scan line can intersect each other without a special contrivance.

Note that the structures of the first wiring and the second wiring are not limited thereto. Other examples are described later.

In the case where the first wiring and the second wiring are formed by processing the same film as a wiring, an electrode, a semiconductor layer, or the like included in the pixel or the display element of the touch panel, the driver circuit, or the like, when the side of a substrate over which the first wiring and the second wiring are formed (also referred to as a first substrate or an element substrate) functions as a touch surface, the first wiring and the second wiring can be close to the touch surface; thus, higher sensitivity can be preferably obtained. In that case, the first substrate side of the touch panel functions as a display surface. In the case where a transmissive liquid crystal display device is used as the display element, for example, a polarizing plate and a backlight can be provided outside a substrate which is provided to face the first substrate and seals liquid crystal (also referred to as a second substrate or a counter substrate) and a polarizing plate can be provided outside the first substrate. A bottom emission light-emitting element can be used as the display element, for example.

A more specific structure example of one embodiment of the present invention is described below with reference to drawings.

Structure Example

FIG. 1A is a schematic perspective view of a touch panel module 10 of one embodiment of the present invention. In the touch panel module 10, a substrate 21 and a substrate 31 are attached to each other.

Figure 1B:
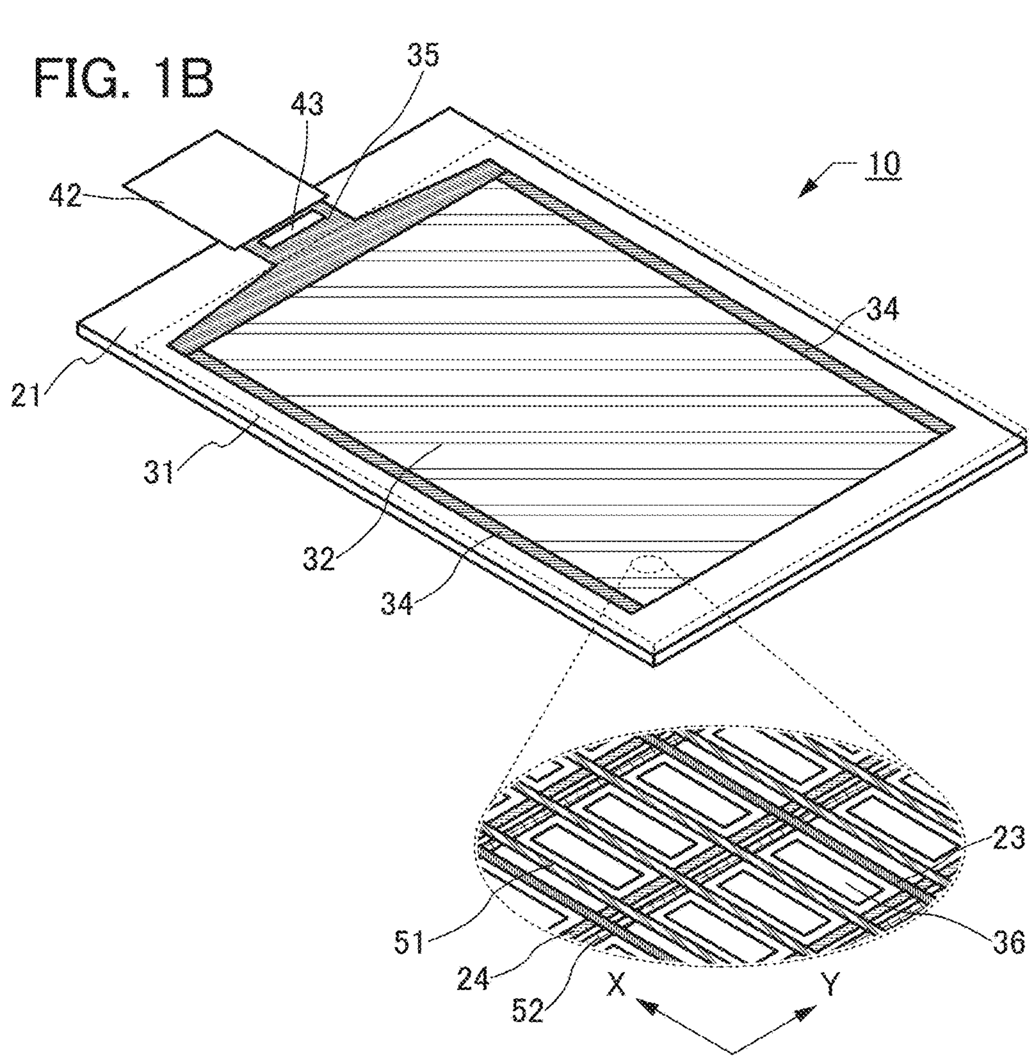

FIG. 1B illustrates a structure of the substrate 21, and the substrate 31 is denoted by a broken line. A display portion 32 including a plurality of pixel circuits, a circuit 34, a wiring 35, and the like are provided over the substrate 21. An IC 43 and an FPC 42 are mounted over the substrate 31.

FIG. 1B is an enlarged view of part of the display portion 32. The display portion 32 includes a plurality of signal lines 51 extending in the X direction, a plurality of scan lines 52 extending in the Y direction, and a plurality of pixel electrodes 36 arranged in the X direction and the Y direction in a matrix. Furthermore, a plurality of wirings 23 extending in the X direction and a plurality of wirings 24 extending in the Y direction are provided in the display portion 32. The wiring 23 includes a portion parallel to the signal line 51 and the wiring 24 includes a portion parallel to the scan line 52.

The wiring 23 and the wiring 24 function as a pair of electrodes included in the touch sensor.

As described above, the touch panel module 10 of one embodiment of the present invention includes a pair of wirings functioning as electrodes of the touch sensor over a substrate over which the pixel electrode 36, the signal line 51, the scan line 52, and the like are provided. Thus, the pair of wirings of the touch sensor can be formed through the same steps as the pixel electrode 36, the signal line 51, the scan line 52, or the like which are used to display an image, so that manufacturing cost can be reduced.

Capacitive coupling occurs between the wiring 23 and the wiring 24. For example, in the case of employing a projected mutual-capacitive driving method, one of the wirings 23 and 24 can be used as a transmission-side wiring (electrode), and the other thereof can be used as a reception-side wiring (electrode). In the case of employing a projected self-capacitive driving method, each of the wiring 23 and the wiring 24 can serve as both a transmission wiring and a reception wiring.

The wiring 23 and the wiring 24 are preferably formed by processing the same film as the signal line 51, the scan line 52, the pixel electrode 36, or a wiring, an electrode, a semiconductor, or the like provided in the display portion 32, for example.

For example, a low-resistance material is preferably used as a material of the wirings 23 and 24. As an example, metal such as silver, copper, or aluminum may be used. Alternatively, a metal nanowire including a number of conductors with an extremely small width (for example, a diameter of several nanometers) may be used. Examples of such a metal nanowire include an Ag nanowire, a Cu nanowire, and an Al nanowire. In the case of using an Ag nanowire, light transmittance of 89% or more and a sheet resistance of 40 ohm/square or more and 100 ohm/square or less can be achieved. Note that because such a metal nanowire provides high transmittance, the metal nanowire may be used for an electrode of the display element, e.g., a pixel electrode or a common electrode.

Alternatively, conductive oxide can be used for at least one of the wiring 23 and the wiring 24. For example, a conductive material containing indium oxide, tin oxide, or zinc oxide may be used. In the case where a material that transmits visible light is used for the wiring 23 or the wiring 24, the wiring and a display element may be provided to overlap with each other and light from the display element may be emitted through the wiring. In other words, in the case where a material that transmits visible light is used, the wiring may be provided to overlap with the pixel electrode 36.

A display element in which the pixel electrode 36 is used as an electrode can be applied to the display portion 32. Here, a light-emitting element such as a transmissive liquid crystal display element or an organic EL element can be preferably used as the display element.

Note that the display element is not limited thereto, and a variety of elements can be used. Examples of the display element include reflective or semi-transmissive liquid crystal elements; display elements (electronic ink) that perform display by an electrophoretic method, an electronic liquid powder (registered trademark) method, or the like; MEMS shutter display elements; and optical interference type MEMS display elements. A pixel included in the display portion 32 may include a pixel circuit in addition to the display element. The pixel circuit may have a transistor, a capacitor, a wiring that electrically connects the transistor and the capacitor, and the like, for example.

Cross-Sectional Structure Example 1

Figure 2A:
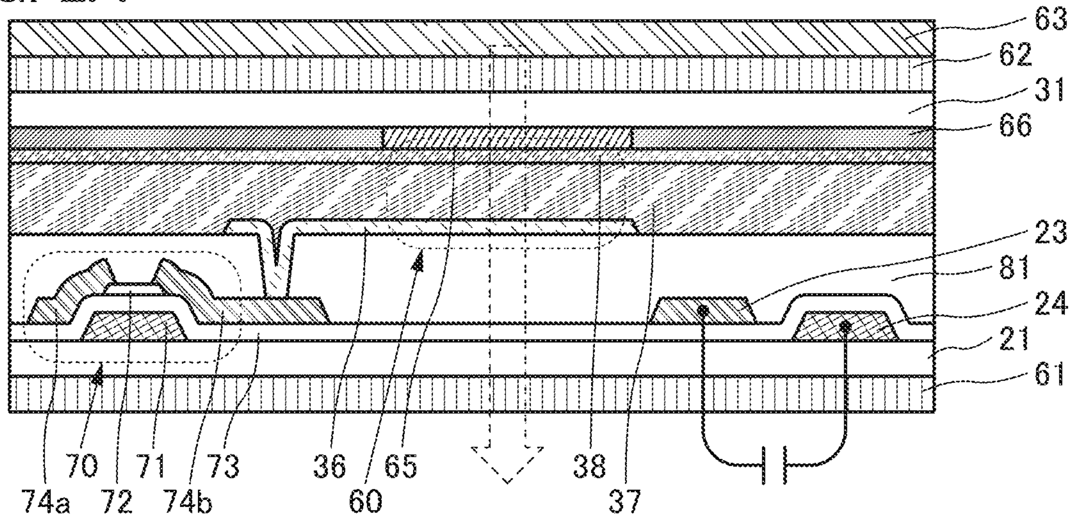
FIGS. 2A to 2C each show a structure example of a touch panel module of an embodiment.

FIG. 2A is a schematic cross-sectional view of part of the display portion 32. FIG. 2A illustrates an example of one pixel, the wiring 23, and the wiring 24. Here, an example where a liquid crystal element is used as a display element provided in the pixel is shown.

Although not illustrated here, in the touch panel module 10, the substrate 21 and the substrate 31 are attached to each other with an adhesive layer or the like in a peripheral portion. Furthermore, a liquid crystal 37 is sealed between the substrate 21 and the substrate 31.

In the display portion 32, a transistor 70, the pixel electrode 36, the wiring 23, the wiring 24, and the like are provided over the substrate 21. A coloring layer 65, a light-blocking layer 66, a common electrode 38, and the like are provided on the side of a surface of the substrate 31 which faces the substrate 21.

The transistor 70 includes a conductive layer 71 functioning as a gate, a semiconductor layer 72, an insulating layer 73 functioning as a gate insulating layer, a conductive layer 74*a* functioning as one of a source and a drain, a conductive layer 74*b* functioning as the other of the source and the drain, and the like.

As an example, the conductive layer 74*a* is part of the signal line 51 and the conductive layer 71 is part of the scan line 52.

An insulating layer 81 is provided to cover the transistor 70, and the pixel electrode 36 is provided over the insulating layer 81. The pixel electrode 36 is electrically connected to the conductive layer 74*b* through an opening in the insulating layer 81. The liquid crystal element 60 includes the pixel electrode 36, the common electrode 38, and the liquid crystal 37 sandwiched therebetween. In FIG. 2A, the liquid crystal element 60 is a transmissive liquid crystal element using a vertical alignment (VA) mode.

Here, as for the liquid crystal element 60, a pair of electrodes are provided in the thickness direction of the touch panel module 10 and an electric field is applied to the liquid crystal 37 in the thickness direction. The arrangement of the electrodes is not limited thereto, and a method in which an electric field is applied in a direction perpendicular to the thickness direction may be employed.

Furthermore, a normally black liquid crystal display device, for example, a transmissive liquid crystal display device using a vertical alignment (VA) mode can be used as the touch panel module 10. Examples of the vertical alignment mode include a multi-domain vertical alignment (MVA) mode, a patterned vertical alignment (PVA) mode, and an advanced super view (ASV) mode.

Liquid crystal elements using a variety of modes can be used as the liquid crystal element 60. For example, a liquid crystal element using, instead of a VA mode, a twisted nematic (TN) mode, an in-plane switching (IPS) mode, a fringe field switching (FFS) mode, an axially symmetric aligned micro-cell (ASM) mode, an optically compensated birefringence (OCB) mode, a ferroelectric liquid crystal (FLC) mode, an antiferroelectric liquid crystal (AFLC) mode, or the like can be used.

The liquid crystal element controls transmission or non-transmission of light utilizing an optical modulation action of liquid crystal. Note that optical modulation action of liquid crystal is controlled by an electric field applied to the liquid crystal (including a horizontal electric field, a vertical electric field, or an oblique electric field). As the liquid crystal used for the liquid crystal element, thermotropic liquid crystal, low-molecular liquid crystal, high-molecular liquid crystal, polymer dispersed liquid crystal (PDLC), ferroelectric liquid crystal, anti-ferroelectric liquid crystal, or the like can be used. These liquid crystal materials exhibit a cholesteric phase, a smectic phase, a cubic phase, a chiral nematic phase, an isotropic phase, or the like depending on conditions.

As the liquid crystal material, either of a positive liquid crystal and a negative liquid crystal may be used, and an appropriate liquid crystal material can be used depending on the mode or design to be used.

FIG. 2A illustrates an example where the wiring 24 and the conductive layer 71 are formed by processing the same conductive film and provided on the same surface. Furthermore, the wiring 23, the conductive layer 74*a*, and the conductive layer 74*b* are formed by processing the same conductive film and provided on the same surface. Here, the wiring 23 is formed over the insulating layer 73, and the wiring 24 is formed over the substrate 21 having an insulating property. Since the insulating layer 73 is provided between the wiring 23 and the wiring 24, the wirings 23 and 24 can intersect each other without a special contrivance.

As illustrated in FIG. 2A, capacitive coupling occurs between the wiring 23 and the wiring 24. For example, in the case of employing a projected capacitive driving method, one of the wirings 23 and 24 can be used as a transmission-side electrode, and the other thereof can be used as a reception-side electrode.

A polarizing plate 61 and a polarizing plate 62 are provided so that the substrate 21 and the substrate 31 are sandwiched therebetween. A backlight 63 is provided outside the polarizing plate 62. Thus, light enters from the backlight in a direction shown by an arrow in FIG. 2A, and the substrate 21 side functions as the display surface side.

As the backlight 63, a direct-below backlight or an edge-light backlight may be used. When a direct-below backlight including a light-emitting diode (LED) is used, local dimming is easily performed; thus, contrast can be preferably increased. When an edge-light type backlight is used, the thickness of a touch panel module including the backlight can be preferably reduced.

Figure 2B:
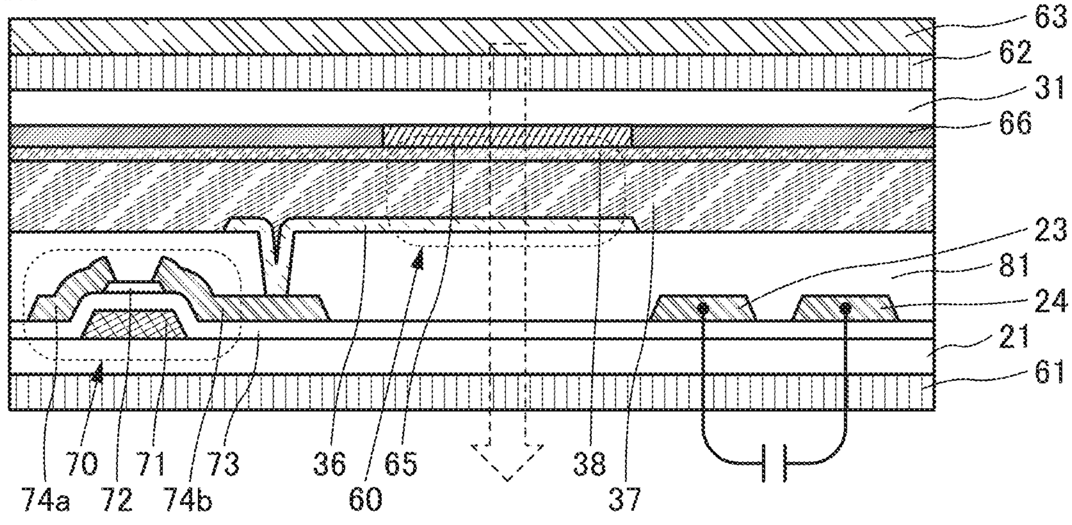
Figure 2C:
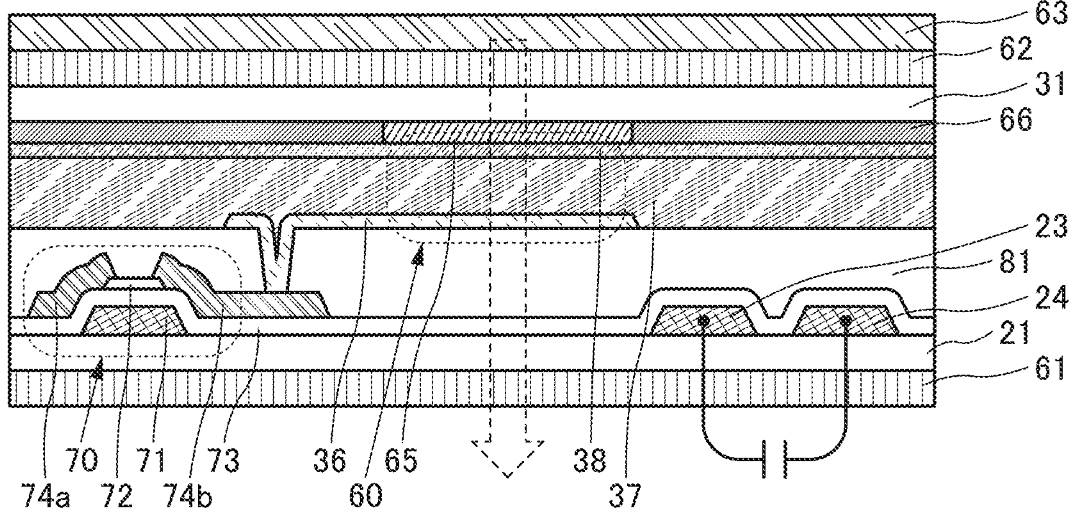

As the polarizing plate 61 on the display surface side, a linear polarizing plate or a circularly polarizing plate can be used. As the circularly polarizing plate, for example, a stack including a linear polarizing plate and a quarter-wave retardation plate can be used. In particular, as illustrated in FIGS. 2A to 2C, in the case where the wiring 23 and the wiring 24 included in the touch sensor are provided on the substrate 21 side, external light is reflected by the wirings and the reflected light is visually recognized in some cases. In this case, reflection can be suppressed with a circularly polarizing plate used as the polarizing plate 61.

In the case where a circularly polarizing plate is used as the polarizing plate 61, a circularly polarizing plate may be also used as the polarizing plate 62 and a general linear polarizing plate may be used. The cell gap, alignment, driving voltage, and the like of the liquid crystal element 60 are controlled depending on the kinds of polarizing plates used as the polarizing plates 61 and 62 so that desirable contrast is obtained.

The coloring layer 65 can also be referred to as a color filter, and converts light of the backlight 63 into light exhibiting a specific color. For example, the coloring layer 65 of red, green, or blue is provided as a coloring layer in each pixel (sub-pixel); thus, full-color display can be performed. When a pixel (sub-pixel) corresponding to yellow, white, or the like in addition to the three colors is provided, power consumption can be reduced, which is preferable.

In the case where a transmissive liquid crystal element is used as the liquid crystal element 60, a light-transmitting conductive film can be used as the pixel electrode 36 and the common electrode 38. In the case where a reflective liquid crystal element is used, a light-reflecting material can be used for the pixel electrode 36 or the common electrode 38.

In the liquid crystal element 60 in FIG. 2A, the pixel electrode 36 and the common electrode 38 have a function of transmitting visible light. By having such a structure, the liquid crystal element 60 can be a transmissive liquid crystal element. For example, in the case where the backlight 63 is positioned on the substrate 31 side, light from the backlight 63 which is polarized by the polarizing plate 62 passes through the substrate 31, the common electrode 38, the liquid crystal 37, the pixel electrode 36, the substrate 21, and the like, and then reaches the polarizing plate 61. In this case, alignment of the liquid crystal 37 is controlled with a voltage applied between the pixel electrode 36 and the common electrode 38, and thus, optical modulation of light can be controlled. In other words, the intensity of light emitted through the polarizing plate 61 can be controlled. Light other than one in a particular wavelength region of the incident light is absorbed by the coloring layer 65, and thus, emitted light has emission spectrum peak in the particular wavelength region. For example, light emitted through the polarizing plate 61 becomes light with red, green, or blue.

It is preferable that the transistor 70 be provided to overlap with the light-blocking layer 66 as illustrated in FIG. 2A. With such a structure, the semiconductor layer 72 of the transistor 70 is prevented from being irradiated with light from the backlight 63; thus, the reliability can be increased. Furthermore, it is preferable that the wiring 23 and the wiring 24 be provided to overlap with the light-blocking layer 66. Thus, irregular reflection of light from the backlight 63 which is caused by the wiring 23 or the wiring 24 can be prevented, so that contrast of an image or a movie to be displayed can be increased.

FIG. 2B illustrates an example where both of the wirings 23 and 24 are formed by processing the same conductive film as the conductive layer 74*a* and the conductive layer 74*b*. In that case, a bridge structure is formed in an intersection portion of the wiring 23 and the wiring 24 by using a conductive layer obtained by processing the same conductive film as the conductive layer 71, the pixel electrode 36, or the like so that the wirings 23 and 24 intersect each other. For example, the conductive layer may be provided to overlap with one of the wirings 23 and 24 and electrically connected to the other thereof.

FIG. 2C illustrates an example where both of the wirings 23 and 24 are formed by processing the same conductive film as the conductive layer 71. In that case, in the same manner as the above, a bridge structure is formed in an intersection portion of the wiring 23 and the wiring 24 by using a conductive layer obtained by processing the same conductive film as the conductive layer 74*a*, the pixel electrode 36, or the like.

Although the transistor 70 is a bottom-gate transistor in each of FIGS. 2A to 2C, a top-gate transistor may be used.

Figure 3A:
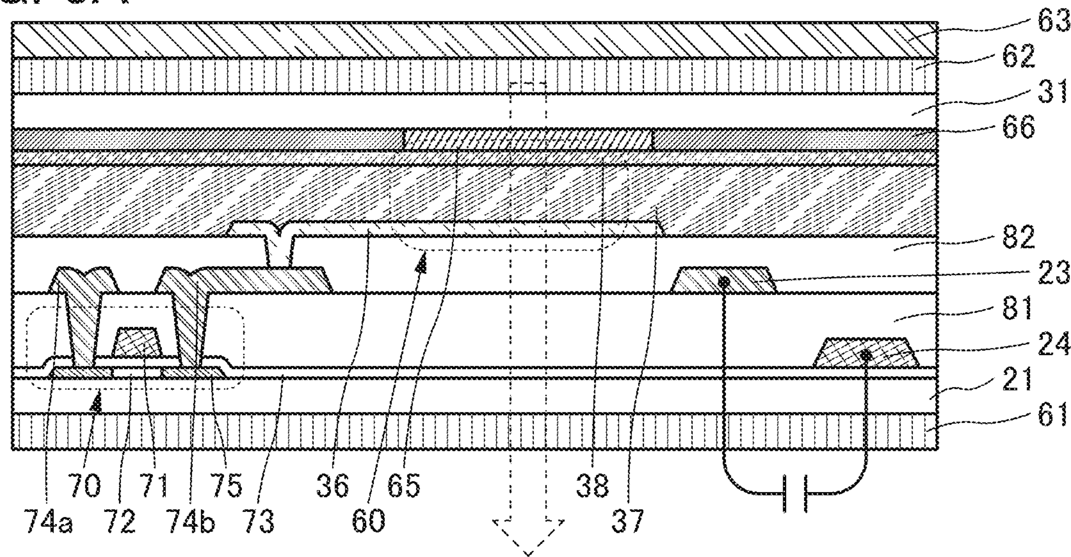
FIGS. 3A to 3C each show a structure example of a touch panel module of an embodiment.

FIG. 3A illustrates an example where the transistor 70 is a top-gate transistor.

The transistor 70 in FIG. 3A includes the semiconductor layer 72, the insulating layer 73 covering the semiconductor layer 72, and the conductive layer 71 overlapping with part of the semiconductor layer 72. The semiconductor layer 72 includes a pair of low-resistance regions 75 between which a region where a channel is formed (a region overlapping with the conductive layer 71) is interposed. One of the low-resistance regions 75 functions as a source and the other thereof functions as a drain. The conductive layer 74*a* and the conductive layer 74*b* are electrically connected to the respective low-resistance regions 75 through openings in the insulating layer 81.

As illustrated in FIG. 3A, an insulating layer 82 is provided to cover the conductive layer 74*a* and the conductive layer 74*b*, and the pixel electrode 36 is provided over the insulating layer 82. The pixel electrode 36 is electrically connected to the conductive layer 74*b* through an opening in the insulating layer 82.

FIG. 3A illustrates an example where the wiring 23 is formed by processing the same conductive film as the conductive layers 74*a* and 74*b* and the wiring 24 is formed by processing the same conductive film as the conductive layer 71. The wiring 23 is positioned over the insulating layer 81 and the wiring 24 is positioned over the insulating layer 73.

Figure 3B:
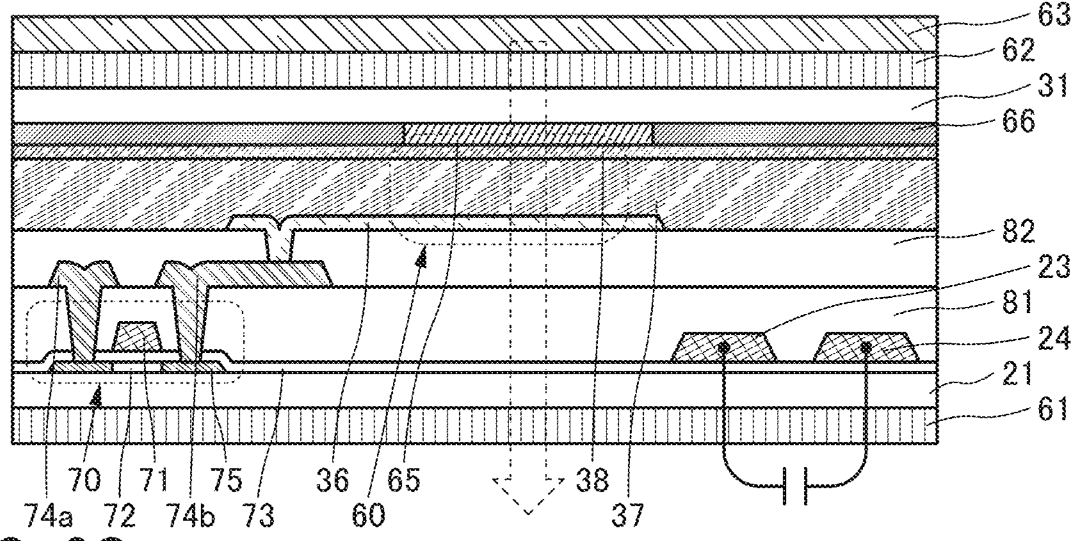
Figure 3C:
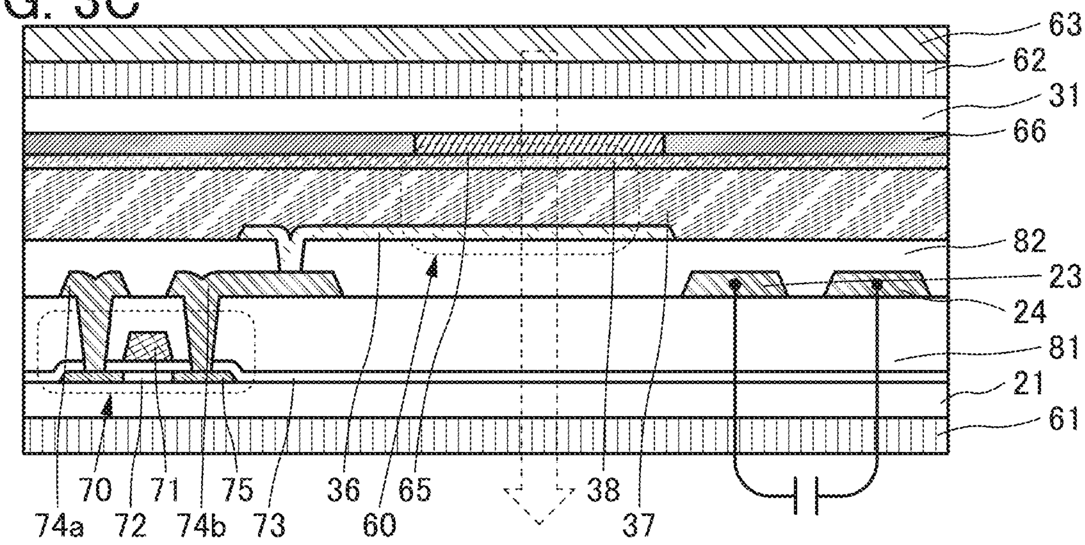

FIG. 3B illustrates an example where both of the wirings 23 and 24 are formed by processing the same conductive film as the conductive layer 71. Moreover, FIG. 3C illustrates an example where both of the wirings 23 and 24 are formed by processing the same conductive film as the conductive layer 74*a* and the conductive layer 74*b*.

In each of FIGS. 2A to 2C and FIGS. 3A to 3C, the substrate 21 side functions as the display surface side; however, the substrate 31 side may function as the display surface side. In that case, the backlight 63 is provided outside the polarizing plate 61. Moreover, a circularly polarizing plate may be used as the polarizing plate 61, or a circularly polarizing plate may be provided in addition to the polarizing plate 61.

Here, an example where the backlight 63 is provided outside the substrate 31 and the substrate 21 side functions as the display surface and the touch surface of the touch panel is shown. In particular, when the substrate 21 side on which the wiring 23 and the wiring 24 are supported functions as the touch surface of the touch panel, the physical distance between an object and the wiring 23 or the wiring 24 can be short; thus, the detection sensitivity of the touch sensor can be increased. Note that one embodiment of the present invention is not limited thereto, and the backlight 63 can be provided outside the substrate 21 and the substrate 31 side can function as the display surface and the touch surface of the touch panel.

The above is the description of Cross-sectional Structure Example 1.

Cross-Sectional Structure Example 2

An example where a bottom-emission organic EL element is used as a display element in a pixel is shown below. Note that portions similar to those described above are not described in some cases.

Figure 4A:
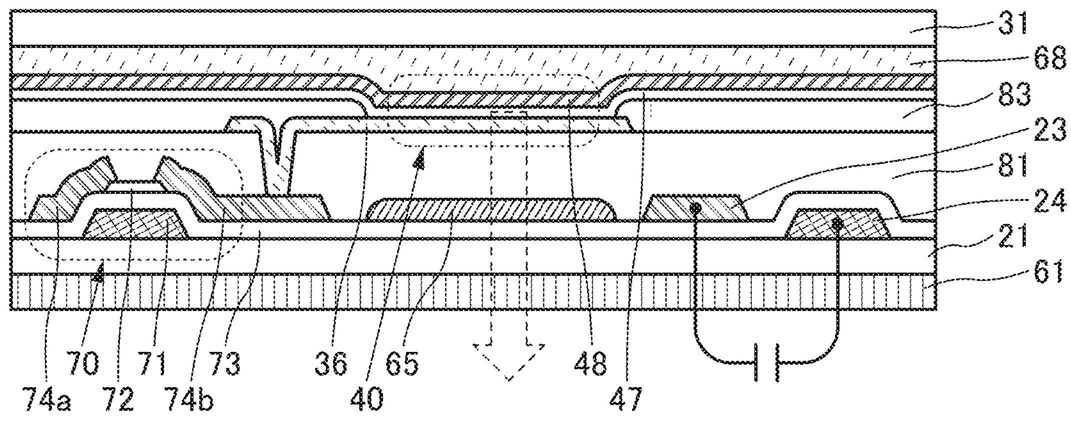
FIGS. 4A to 4C each show a structure example of a touch panel module of an embodiment.

FIG. 4A is a schematic cross-sectional view of part of the display portion 32. FIG. 4A illustrates an example of one pixel, the wiring 23, and the wiring 24. The substrate 21 side of the display portion 32 functions as the display surface side.

In the touch panel module 10, the substrate 21 and the substrate 31 are attached to each other with an adhesive layer 68.

The insulating layer 81 is provided to cover the transistor 70, and the pixel electrode 36 is provided over the insulating layer 81. The pixel electrode 36 is electrically connected to the conductive layer 74*b* through an opening in the insulating layer 81. The insulating layer 83 is provided over the insulating layer 81. The insulating layer 83 includes an opening overlapping with the pixel electrode 36. Part of the insulating layer 83 is provided to cover an end portion of the pixel electrode 36. An EL layer 47 and a common electrode 48 are stacked in this order over the insulating layer 83 and the pixel electrode 36. The light-emitting element 40 includes the pixel electrode 36, the common electrode 48, and the EL layer 47 sandwiched therebetween.

The light-emitting element 40 in FIG. 4A is a bottom-emission light-emitting element in which light is emitted to the substrate 21 side on which the light-emitting element 40 is supported. Thus, among the pair of electrodes of the light-emitting element 40, the pixel electrode 36 on the substrate 21 side has a function of transmitting visible light and the common electrode 48 on the substrate 31 side has a function of reflecting visible light.

In the structure in FIG. 4A, the coloring layer 65 is provided in a position closer to the substrate 21 side than the light-emitting element 40 is.

The coloring layer 65 converts light from the light-emitting element 40 into light having a specific color. For example, when a light-emitting element emitting white light is used as the light-emitting element 40, the coloring layer 65 of red, green, or blue is provided as a coloring layer in each pixel (sub-pixel); thus, full-color display can be performed. When a pixel (sub-pixel) corresponding to yellow, white, or the like in addition to the three colors is provided, power consumption can be reduced, which is preferable.

The structure of the light-emitting element 40 is not limited thereto, and a top-emission light-emitting element or a dual-emission light-emitting element can be used. The EL layer 47 of the light-emitting element 40 is separately fabricated in each pixel (sub-pixel), and thus, the light-emitting elements 40 exhibiting different colors may be separately fabricated in pixels (sub-pixels). In that case, the coloring layer 65 is not necessarily provided.

FIG. 4A illustrates an example where the polarizing plate 61 is provided outside the substrate 21, i.e., on the display surface side. As the polarizing plate 61, a circularly polarizing plate can be preferably used. The circularly polarizing plate used as the polarizing plate 61 can prevent reflection due to the wiring 23, the wiring 24, or the like.

Figure 4B:
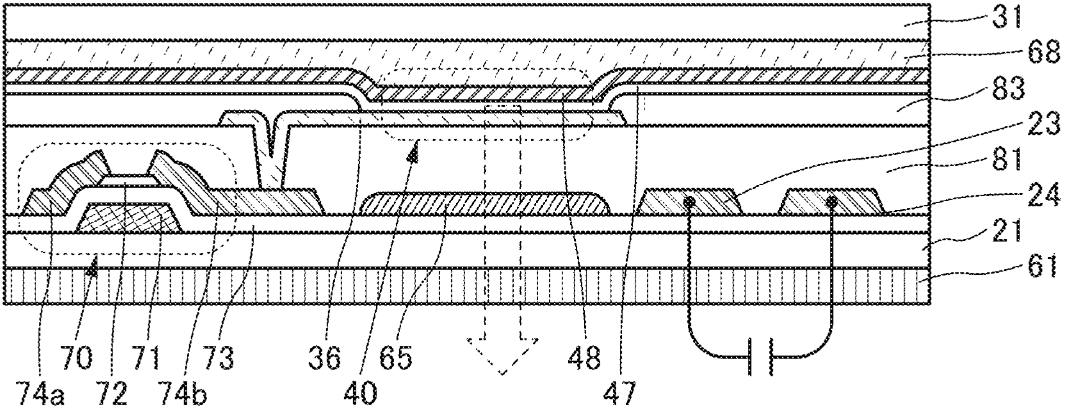
Figure 4C:
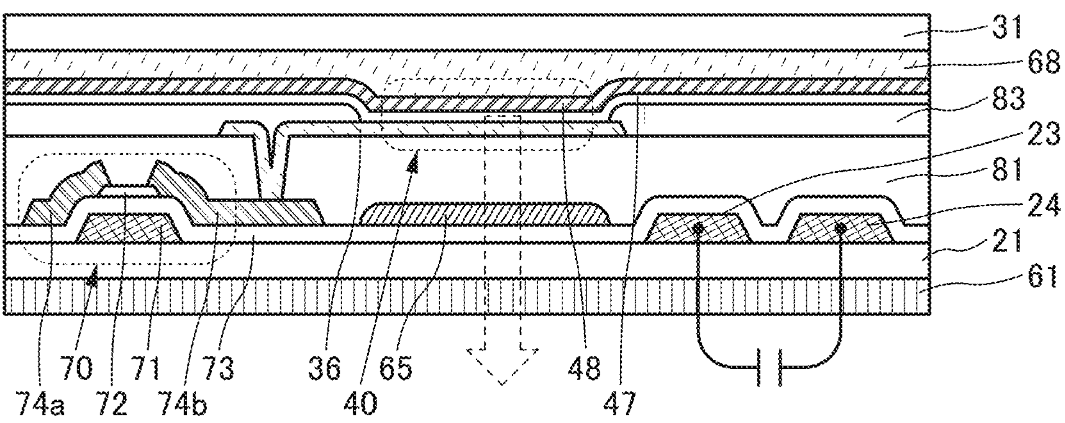

FIG. 4B illustrates an example where both of the wirings 23 and 24 are formed by processing the same conductive film as the conductive layer 74*a* and the conductive layer 74*b*. FIG. 4C illustrates an example where both of the wirings 23 and 24 are formed by processing the same conductive film as the conductive layer 71.

Figure 5A:
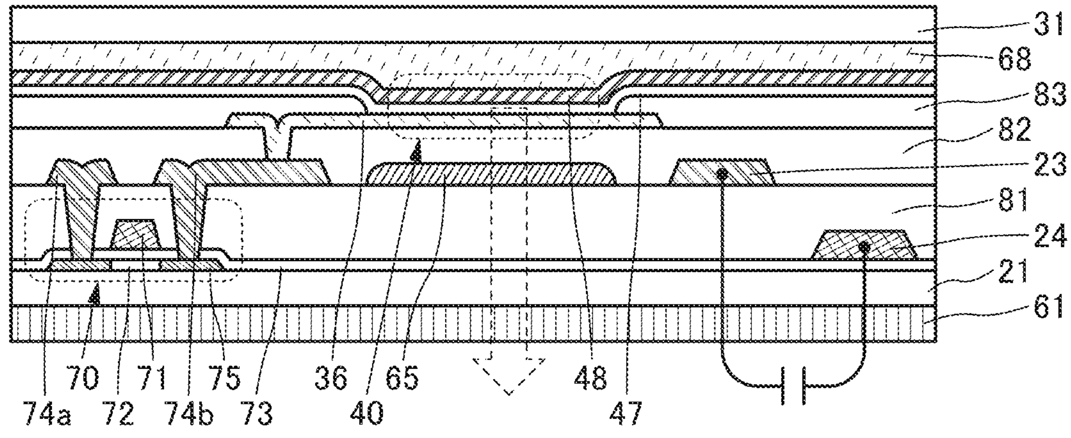
FIGS. 5A to 5C each show a structure example of a touch panel module of an embodiment.
Figure 5B:
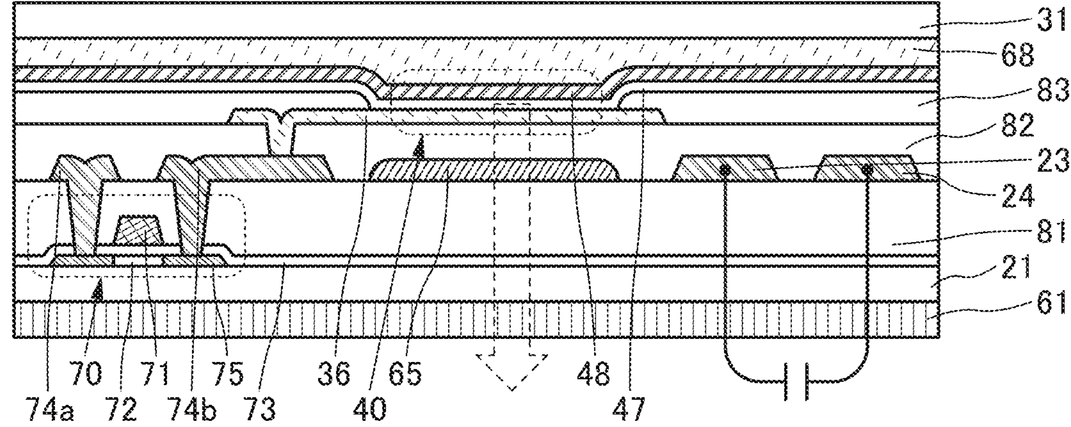
Figure 5C:
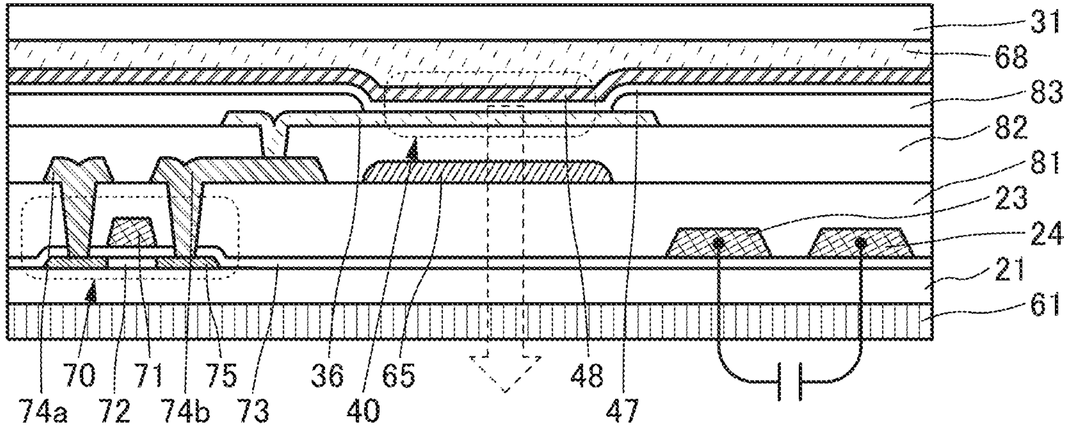

FIG. 5A illustrates an example where a top-gate transistor is used as the transistor 70. FIG. 5B illustrates an example where both of the wirings 23 and 24 are formed by processing the same conductive film as the conductive layer 74*a* and the conductive layer 74*b*. FIG. 5C illustrates an example where both of the wirings 23 and 24 are formed by processing the same conductive film as the conductive layer 71.

Here, an example where a bottom-emission light-emitting element is used as the light-emitting element 40 and the substrate 21 side functions as the display surface and the touch surface of the touch panel is shown. In particular, when the substrate 21 side on which the wiring 23 and the wiring 24 are supported functions as the touch surface of the touch panel, the physical distance between an object and the wiring 23 or the wiring 24 can be short; thus, the detection sensitivity of the touch sensor can be increased. Note that one embodiment of the present invention is not limited thereto, and a top-emission light-emitting element or a dual-emission light-emitting element can be used as the light-emitting element 40 and the substrate 31 side may function as the display surface and the touch surface of the touch panel.

Wiring Shape

Example 1 of Wiring Shape

Figure 6A:
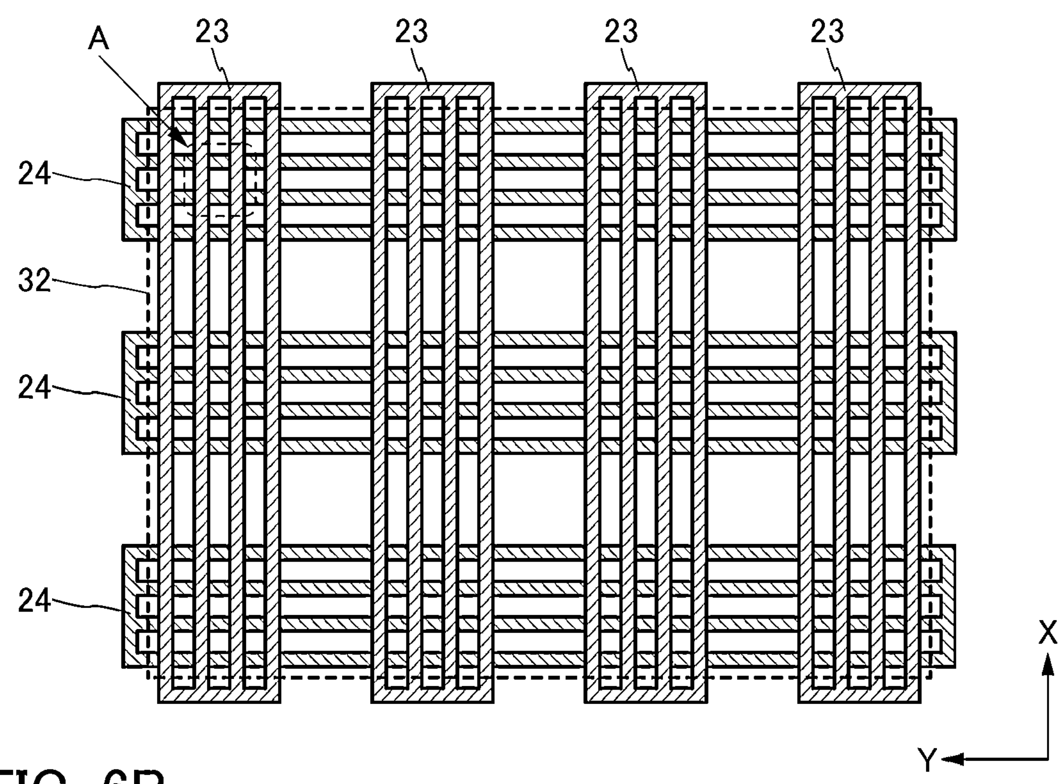
FIGS. 6A and 6B each illustrate structural examples of wirings of an embodiment.

FIG. 6A illustrates an example of top surface shapes of the wirings 23 and the wirings 24. The wirings 23 extend in the X direction and the wirings 24 extend in the Y direction. The wirings 23 each include a plurality of stripes extending in the X direction in a region overlapping with the display portion 32, and the plurality of stripes are connected to each other in a region outside the display portion 32.

With such a structure, the wiring 23 can be formed using only portions substantially parallel in the X direction and the wiring 24 can be formed using only portions substantially parallel in the Y direction in a portion overlapping with the display portion 32. In that case, since the wiring 23 can be arranged not to intersect the signal line 51 (not illustrated) extending in the X direction, they can be formed at the same time by processing the same conductive film. Similarly, the wiring 24 is arranged not to intersect the scan line 52 (not illustrated) extending in the Y direction and they can be formed using the same conductive film.

Figure 6B:
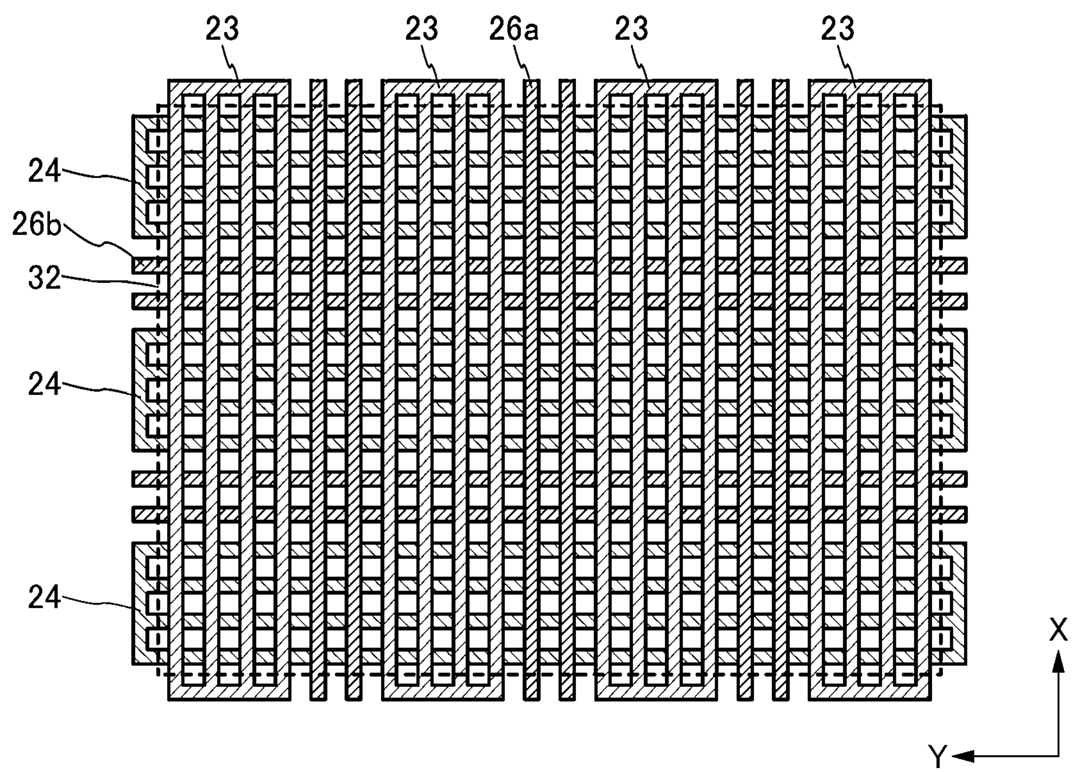

As illustrated in FIG. 6B, a conductive layer 26*a* extending in the X direction may be provided between the adjacent wirings 23. Similarly, a conductive layer 26*b* extending in the Y direction may be provided between the adjacent wirings 24. The conductive layer 26*a* and the conductive layer 26*b* can be brought into an electrically floating state or supplied with a predetermined constant potential, for example. Furthermore, it is preferable in that case that the wiring 23 and the conductive layer 26*a* be formed by processing the same conductive film and that the wiring 24 and the conductive layer 26*b* be formed by processing the same conductive film. Thus, in the display portion 32, a regular pattern in layout from a region where the wiring 23 and the wiring 24 are provided to a region where they are not provided can be maintained. Therefore, between a pixel close to the wiring 23 and the wiring 24 and a pixel far from them, luminance unevenness due to a thickness difference or the like of stacks included in the pixels can be suppressed.

A short-side direction of the display portion 32 is referred to as the X direction and a long-side direction of the display portion 32 is referred to as the Y direction in FIGS. 6A and 6B and the like; however, one embodiment of the present invention is not limited thereto, and the short-side direction and the long-side direction may be referred to as the Y direction and the X direction, respectively.

Example 2 of Wiring Shape

Figure 7A:
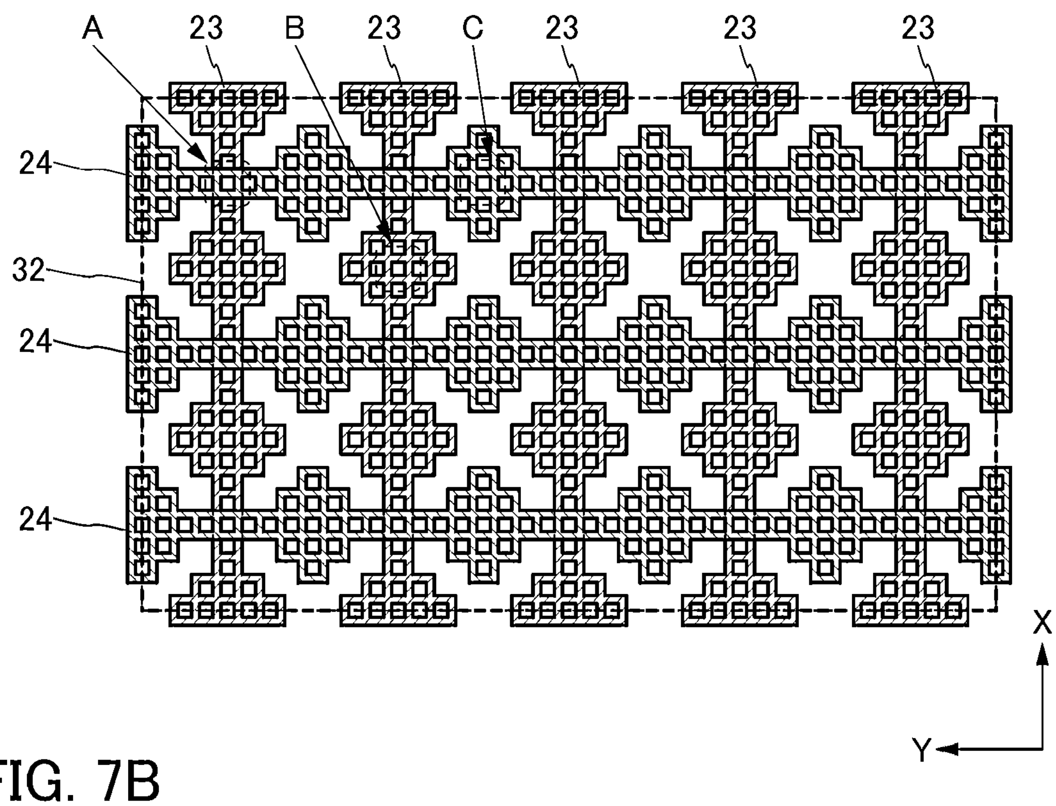
FIGS. 7A and 7B each illustrate structural examples of wirings of an embodiment.

FIG. 7A illustrates an example of the wiring 23 and the wiring 24 having shapes different from those in FIG. 6A.

The wiring 23 and the wiring 24 each have portions parallel in the X direction and portions parallel in the Y direction, and a mesh-like top surface shape can be formed by these two types of portions. In that case, the wiring 23 and the wiring 24 are provided so that one or more pixel electrodes 36 (not illustrated) are included in the opening of the mesh in a plan view, and accordingly, they can be provided not to block light from the display element.

Figure 7B:
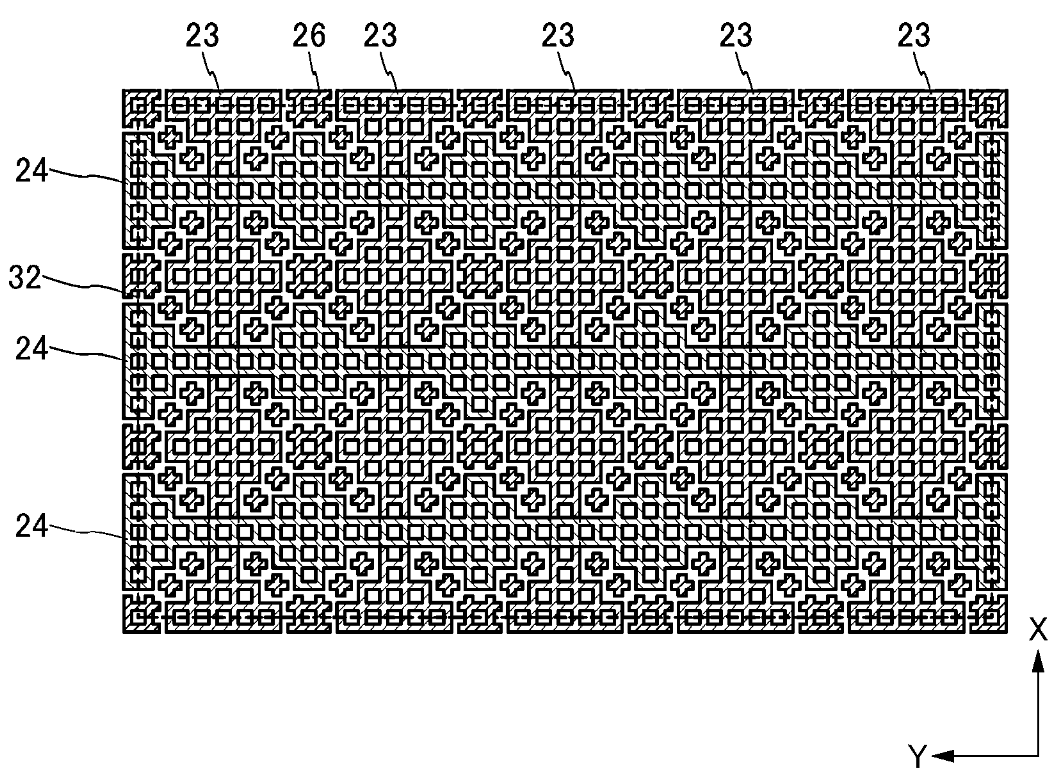

Alternatively, the conductive layer 26 may be provided to fill a space between the wiring 23 and the wiring 24 as illustrated in FIG. 7B. In that case, the conductive layer 26 preferably includes portions parallel in the X direction and portions parallel in the Y direction as well as the wiring 23 and the wiring 24. Moreover, part of the conductive layer 26 preferably has a mesh shape.

When the wiring 23 and the wiring 24 are formed by processing different conductive films over different insulating layers, the wiring 23 and the wiring 24 can intersect each other without a special contrivance. Alternatively, the wiring 24 may have a structure in which an island-shaped portion formed by processing the same conductive film as the wiring 23 and an island-shaped portion formed by processing a conductive film over an insulating layer that is different from the wiring 23 are connected to each other so that the wiring 23 and the wiring 24 intersect each other, for example. Alternatively, the wiring 23 may have a structure in which such two types of island-shaped portions are connected to each other. Alternatively, the wiring 23 and the wiring 24 may intersect each other without an electrical short-circuit in such a manner that at least one of the wirings 23 and 24 is formed using portions parallel in the X direction and portions parallel in the Y direction which are formed by processing different conductive films over different insulating layers and the two types of portions are connected to each other.

The above is the description of the wiring shape example.

Structure Example 1 of Wiring

A specific structure example of a wiring in the case where a liquid crystal element is used for the display portion 32 is described below. Note that in the following diagrams, a layer, a wiring, and the like formed by processing the same conductive film are shown with the same hatching pattern for simplicity.

Structure Example 1-1

Figure 8:
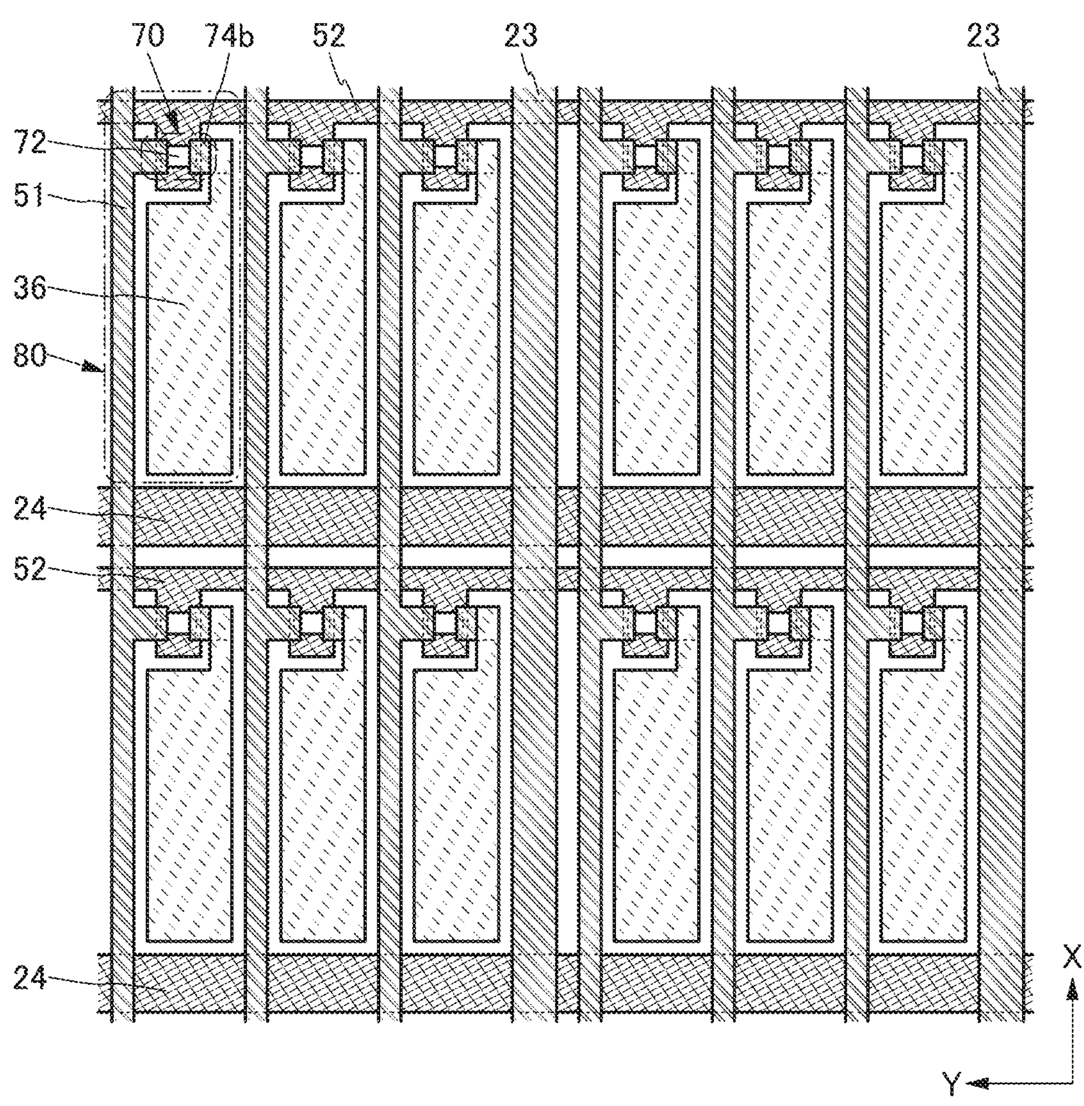
FIG. 8 shows a structure example of a touch panel module of an embodiment.

FIG. 8 illustrates an example of arrangement (layout) of the signal line 51, the scan line 52, the wiring 23, the wiring 24, the pixel electrode 36, and the like in the display portion 32. FIG. 8 corresponds to an enlarged view of the region A in FIG. 6A or FIG. 7A.

The signal line 51 and the wiring 23 are parallel in the X direction. The scan line 52 and the wiring 24 are parallel in the Y direction. The signal line 51 and the wiring 23 are formed by processing the same conductive film, and the scan line 52 and the wiring 24 are formed by processing the same conductive film. Thus, the wiring 23 and the wiring 24 can be formed without an increase in the number of steps.

Such a structure enables the wiring 23 and the wiring 24, the signal line 51 and the wiring 24, and the scan line 52 and the wiring 23 to intersect each other without a special contrivance.

FIG. 8 illustrates a pixel circuit 80 including the transistor 70 and the pixel electrode 36. The pixel circuits 80 are arranged in the X direction and the Y direction in a matrix. The pixel circuit 80 corresponds to one sub-pixel included in the display portion 32.

In the pixel circuit 80, part of the scan line 52 functions as a gate electrode. Part of the signal line 51 functions as a source electrode or a drain electrode. As illustrated in FIG. 8, the semiconductor layer 72 is provided to overlap with a projected portion of the scan line 52, and a projected portion of the signal line 51 is provided to overlap with part of the semiconductor layer 72. Furthermore, the conductive layer 74*b* is provided on a side opposite to the signal line 51 of the semiconductor layer 72. The conductive layer 74*b* is electrically connected to the pixel electrode 36.

The wiring 23 is provided between the two pixel circuits 80 adjacent in the Y direction. It can be said that the wiring 23 is provided between the two pixel electrodes 36 adjacent in the Y direction, between the two signal lines 51 adjacent in the Y direction, between the two semiconductor layers 72 adjacent in the Y direction, between the two conductive layers 74*b* adjacent in the Y direction, or the like.

Meanwhile, the wiring 24 is provided between the two pixel circuit 80 adjacent in the X direction. It can be said that the wiring 24 is provided between the two pixel electrodes 36 adjacent in the X direction, between the two scan lines 52 adjacent in the X direction, between the two semiconductor layers 72 adjacent in the X direction, between the two conductive layers 74*b* adjacent in the X direction, or the like.

FIG. 8 illustrates an example where the width of the wiring 24 is larger than that of the wiring 23. For example, in the case where the wiring 24 is formed using a material with lower conductivity than a material used for the wiring 23, the case where the wiring 24 is arranged along the long-side direction of the display portion, or the like, the width of the wiring 24 is preferably larger than that of the wiring 23 to reduce electrical resistance. Alternatively, the thickness of the wiring 24 may be larger than that of the wiring 23 to reduce electrical resistance of the wiring 24. Note that the width of the wiring 23 and the width of the wiring 24 are not limited thereto, and that of the wiring 23 may be larger than that of the wiring 24 or those of the wirings 23 and 24 may be substantially the same. The width, thickness, material, and the like of each of the wirings 23 and 24 can be appropriately set so that for example, the time constant of the wiring 23 and that of the wiring 24 are substantially the same or one of the wirings 23 and 24 which is used as a detection-side wiring has a smaller time constant than the other.

Structure Example 1-2

FIG. 9A illustrates an example where the structure of the wiring 24 is different from that in FIG. 8. The wiring 24 in FIG. 9A has a structure in which a portion formed by processing the same conductive film as the signal line 51 and a portion formed by processing the same conductive film as the scan line 52 are alternately arranged. The two types of portions overlap with each other in regions and are electrically connected to each other through openings in an insulating layer positioned therebetween in the regions.

Each of the portions of the wiring 24 that are formed by processing the same conductive film as the scan line 52 intersects at least one of the signal line 51 and the wiring 23.

Structure Example 1-3

FIG. 9B illustrates an example where the structure of the wiring 23 is different from that in FIG. 8. The wiring 23 in FIG. 9B has a structure in which a portion formed by processing the same conductive film as the signal line 51 and a portion formed by processing the same conductive film as the scan line 52 are alternately arranged. The two types of portions overlap with each other in regions and are electrically connected to each other through openings in an insulating layer positioned therebetween in the regions.

Each of the portions of the wiring 23 that are formed by processing the same conductive film as the signal line 51 intersects at least one of the scan line 52 and the wiring 24.

Structure Examples 1-1 to 1-3 are preferably used in the case where the wiring 23 and the wiring 24 have a stripe shape in a portion overlapping with the display portion 32 as illustrated in Example 1 of Wiring Shape (e.g., FIGS. 6A and 6B), for example.

Structure Example 2-1

FIG. 10A illustrates an example where the wiring 23 includes both of portions parallel in the X direction and portions parallel in the Y direction. FIG. 10B illustrates an example where the wiring 24 includes both of portions parallel in the X direction and portions parallel in the Y direction. FIG. 10A corresponds to an enlarged view of the region B in FIG. 7A, and FIG. 10B corresponds to an enlarged view of the region C in FIG. 7A. Although the wiring 23 is used for the description here, the wiring 24, and the conductive layer 26, the conductive layer 26*a*, the conductive layer 26*b*, and the like, which are described above can have similar shapes.

The portions parallel in the X direction in the wiring 23 are formed by processing the same conductive film as the signal line 51. Meanwhile, the portions parallel in the Y direction are formed by processing the same conductive film as the scan line 52. In the wiring 23, the portions parallel in the X direction are electrically connected to the portions parallel in the Y direction through openings in an insulating film positioned between the two types of portions at the intersections of the two types of portions. With such a structure, the wiring 23 can have a mesh shape.

Here, it can be said that the wiring 23 has one opening surrounded by two portions adjacent and parallel in the X direction and two portions adjacent and parallel in the Y direction. Although FIGS. 10A and 10B each illustrate a structure where the three pixel electrodes 36 are provided in the opening, one embodiment of the present invention is not limited thereto, and a structure where one or more pixel electrodes 36 are provided can be employed. When the wiring 23 has a dense mesh shape, the resistance of the wiring 23 can be reduced. Meanwhile, when the wiring 23 has a sparse mesh shape, parasitic capacitance of the wiring 23 can be reduced.

In each of FIGS. 10A and 10B, the distance between the two portions parallel and adjacent in the X direction in the wiring 23 and the distance between the two portions parallel and adjacent in the Y direction in the wiring 23 are set to be substantially the same; however, they may be different from each other. For example, the two portions parallel and adjacent in the Y direction may be provided with a distance of two pixels (e.g., with a distance of six sub-pixels in the case where three sub-pixels of RGB are provided) therebetween, and the two portions parallel and adjacent in the X direction may be provided with a distance of one pixel therebetween. In that case, the wiring 23 has a mesh shape including an opening which is long in the Y direction.

Structure Example 2-2

Figures 11A, 11B:
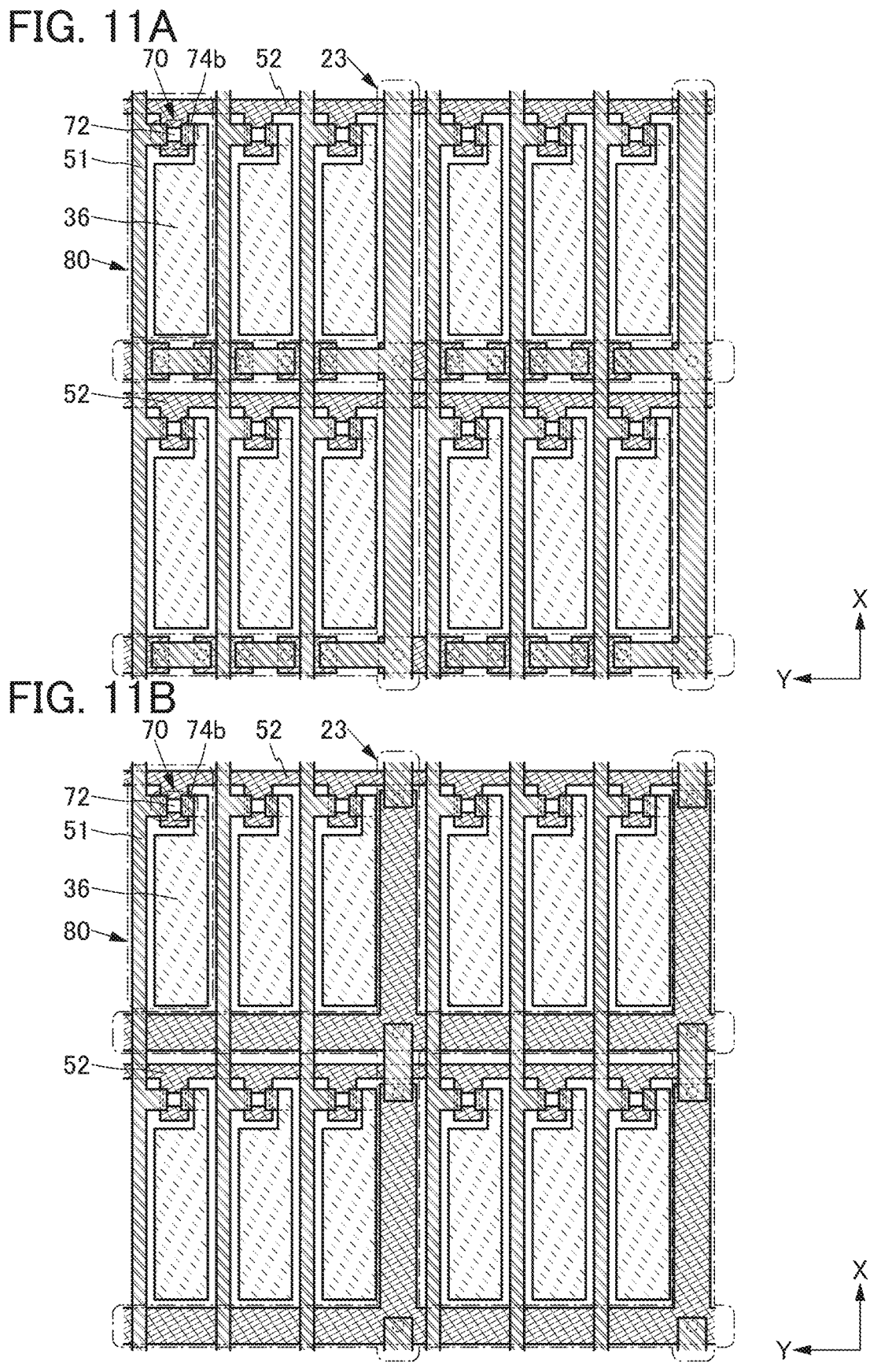

FIG. 11A illustrates an example where the structure of the wiring 23 is different from those in FIGS. 10A and 10B. In the structure in FIG. 11A, portions parallel in the X direction in the wiring 23 are formed by processing the same conductive film as the signal line 51. Meanwhile, portions parallel in the Y direction in the wiring 23 have a structure in which a portion (conductive layer) obtained by processing the same conductive film as the signal line 51 and a portion (conductive layer) obtained by processing the same conductive film as the scan line 52 are alternately arranged. In the portions parallel in the Y direction, the two different conductive layers overlap with each other in regions and are electrically connected to each other through openings in an insulating layer positioned therebetween in the regions.

In the portions of the wiring 23 which are parallel in the Y direction, the portions obtained by processing the same conductive film as the scan line 52 intersect the signal line 51.

Structure Example 2-3

FIG. 11B illustrates an example where the structure of the wiring 23 is different from those in FIGS. 10A and 10B and FIG. 11A. In the structure in FIG. 11B, portions parallel in the Y direction in the wiring 23 are formed by processing the same conductive film as the scan line 52. Meanwhile, portions parallel in the X direction in the wiring 23 have a structure in which a portion (conductive layer) obtained by processing the same conductive film as the scan line 52 and a portion (conductive layer) obtained by processing the same conductive film as the signal line 51 are alternately arranged. In the portions parallel in the X direction, the two different conductive layers overlap with each other in regions and are electrically connected to each other through openings in an insulating layer positioned therebetween in the regions.

In the portions of the wiring 23 which are parallel in the X direction, the portions obtained by processing the same conductive film as the signal line intersect the scan line 52.

Structure Examples 2-1 to 2-3 are preferably used in the case where the wiring 23 and the wiring 24 have a mesh shape as illustrated in Example 2 of Wiring Shape (e.g., FIGS. 7A and 7B), for example.

Structure Example 3-1

Although the example where the wiring 23 and the wiring 24 are formed by processing the same conductive films as the signal line 51 and the scan line 52 is described above, one or both of the wirings 23 and 24 may be formed by processing a conductive film different from the signal line 51 and the scan line 52.

Figures 12A, 12B:
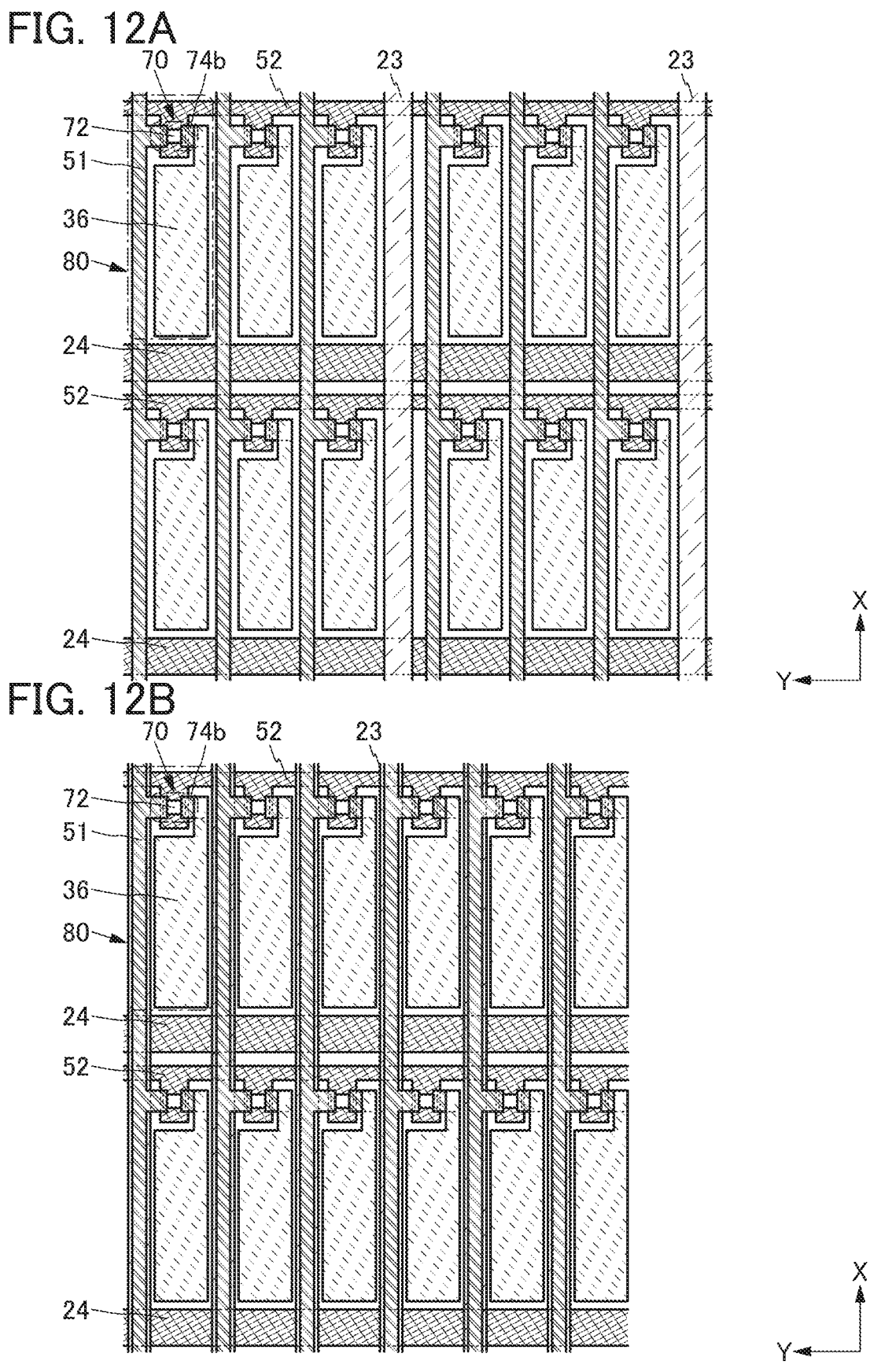

FIG. 12A illustrates an example where the wiring 23 is formed by processing a conductive film different from the signal line 51 unlike the structure illustrated in FIG. 8.

Here, the wiring 23 may be positioned above the signal line 51 and the scan line 52, between the scan line 52 and the signal line 51, or below the signal line 51 and the scan line 52 (on the substrate 21 side). In that case, the wiring 23, the signal line 51, and the scan line 52 are preferably formed over respective insulating layers.

The wiring 23 may be formed by processing the same conductive film as the pixel electrode 36, for example. In that case, the wiring 23 can be formed through the same steps as the pixel electrode 36.

The wiring 23 and the wiring 24 are electrically connected to each other through openings in the insulating layer positioned therebetween to form a mesh shape.

In the case where the wiring 23 and the signal line 51 are provided over different insulating layers, they can be provided to overlap with each other as illustrated in FIG. 12B. Thus, a space for the wiring 23 is unnecessary in the Y direction, which leads to an increase in resolution or aperture ratio.

FIG. 12B illustrates the case where a linear portion of the signal line 51 is included in the wiring 23 in a plan view; however, one embodiment of the present invention is not limited thereto. For example, the wiring 23 and the signal line 51 may be provided so that the wiring 23 has a smaller width than the signal line 51 and is included in the signal line 51 in a plan view. The wiring 23 and the signal line 51 may be provided so that part of the signal line 51 overlaps with the wiring 23 and the other part thereof does not overlap with the wiring 23. Thus, parasitic capacitance between the signal line 51 and the wiring 23 can be reduced.

Figure 13:
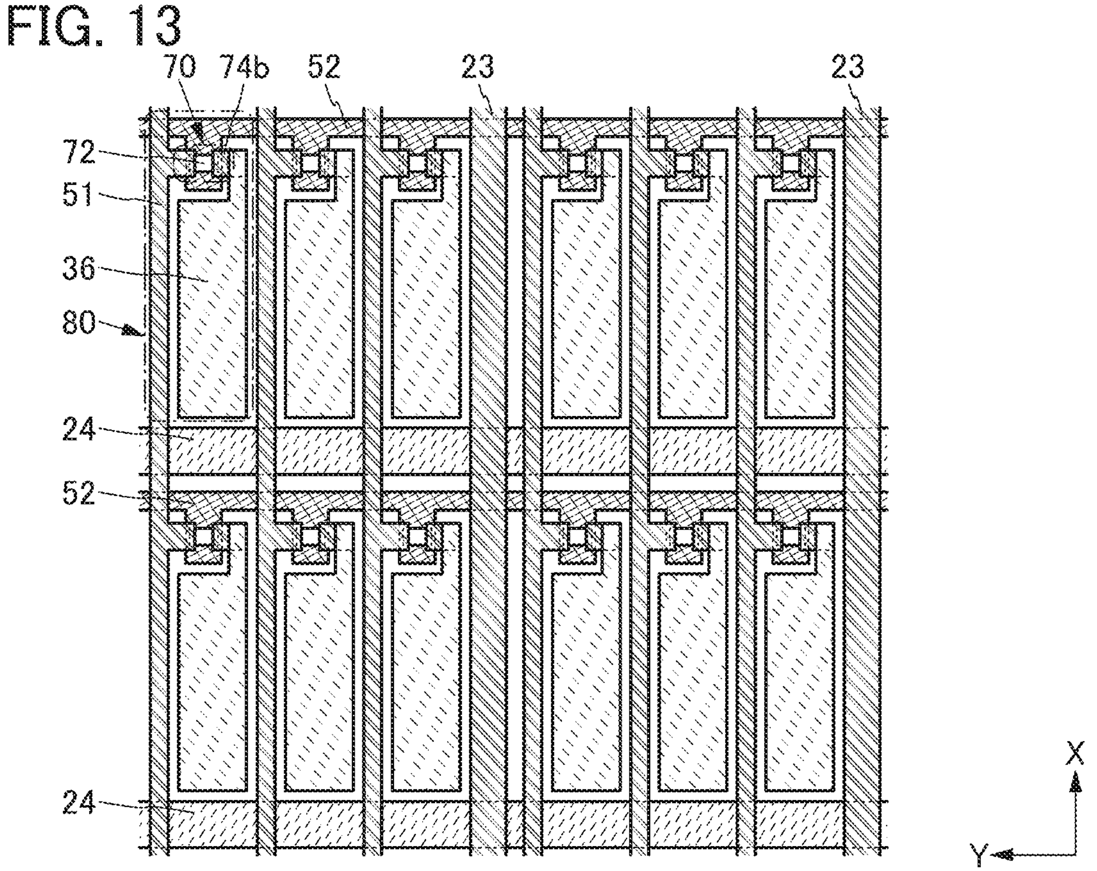
FIG. 13 shows a structure example of a touch panel module of an embodiment.

FIG. 13 illustrates an example where the wiring 24 is formed by processing a conductive film different from the scan line 52 unlike the structure illustrated in FIG. 8.

The wiring 24 in FIG. 13 is provided in a position closer to the substrate 21 side than the wiring 23 and the signal line 51 are. However, one embodiment of the present invention is not limited thereto, and the wiring 24 may be provided over an insulating layer different from the signal line 51, the scan line 52, the wiring 23, and the like. Furthermore, the wiring 24 may be formed by processing the same conductive film as the pixel electrode 36.

Structure Example 3-2

Figures 14A, 14B:
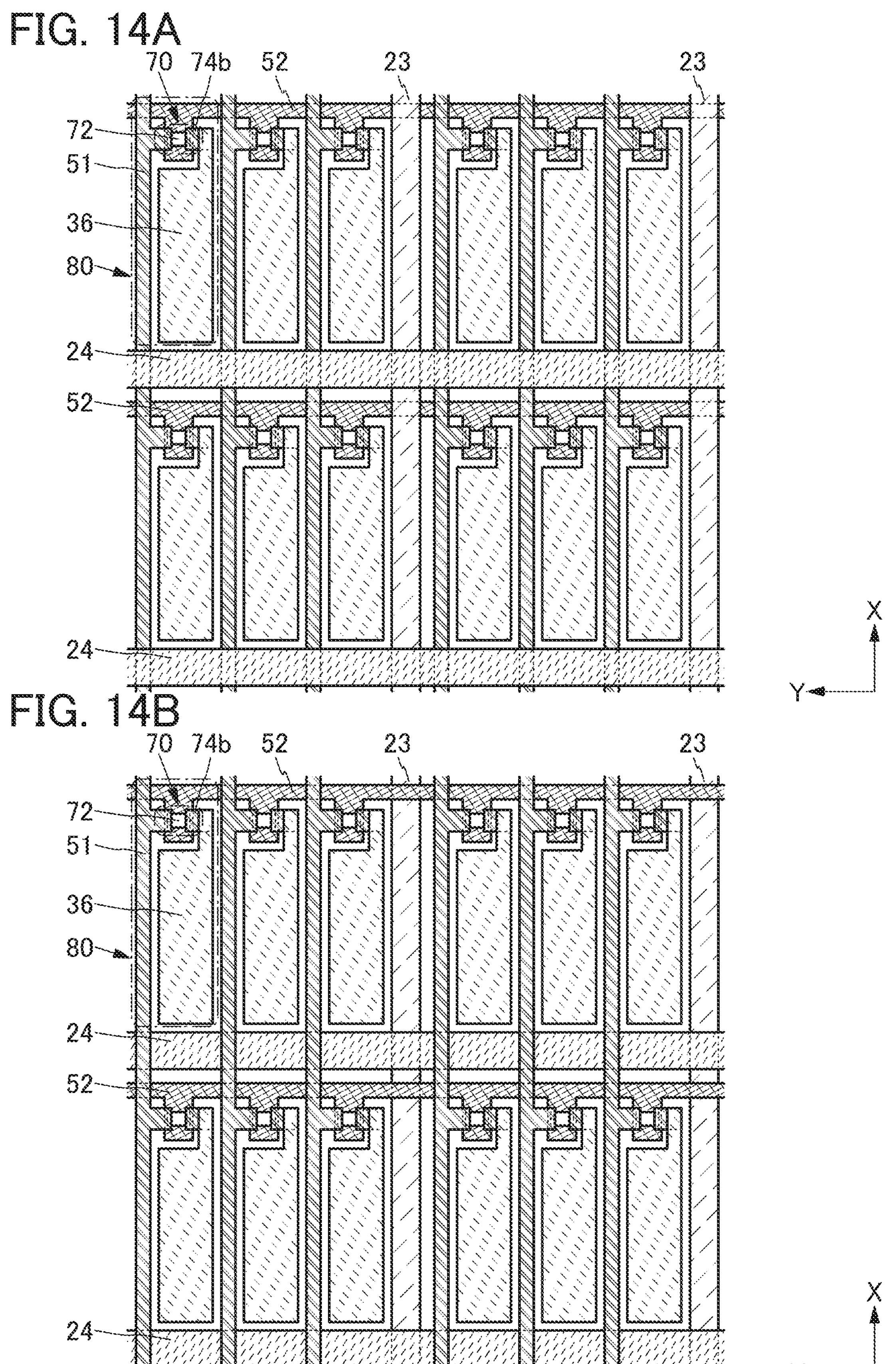
FIGS. 14A and 14B each show a structure example of a touch panel module of an embodiment.

FIG. 14A illustrates an example where the wiring 23, the wiring 24, the signal line 51, and the scan line 52 are formed by processing respective conductive films. Here, the wiring 23, the wiring 24, the signal line 51, and the scan line 52 may be provided over respective insulating layers.

In the example in FIG. 14A, the wiring 24 is positioned at least above the wiring 23, the signal line 51, and the scan line 52, and the wiring 23 is positioned at least above the scan line 52.

FIG. 14B illustrates an example where the wiring 24 is positioned at least below the signal line 51, and the wiring 23 is positioned at least below the wiring 24 and the scan line 52.

Note that the positions of the wiring 23, the wiring 24, the signal line 51, and the scan line 52 in the height direction are not limited thereto, and a variety of stack structures can be employed.

Although not illustrated here, in each of the structures illustrated in FIGS. 14A and 14B, the wiring 23 and the signal line 51 may be provided to at least partly overlap with each other, or the wiring 24 and the scan line 52 may be provided to at least partly overlap with each other.

Structure Example 3-3

Figures 15A, 15B:
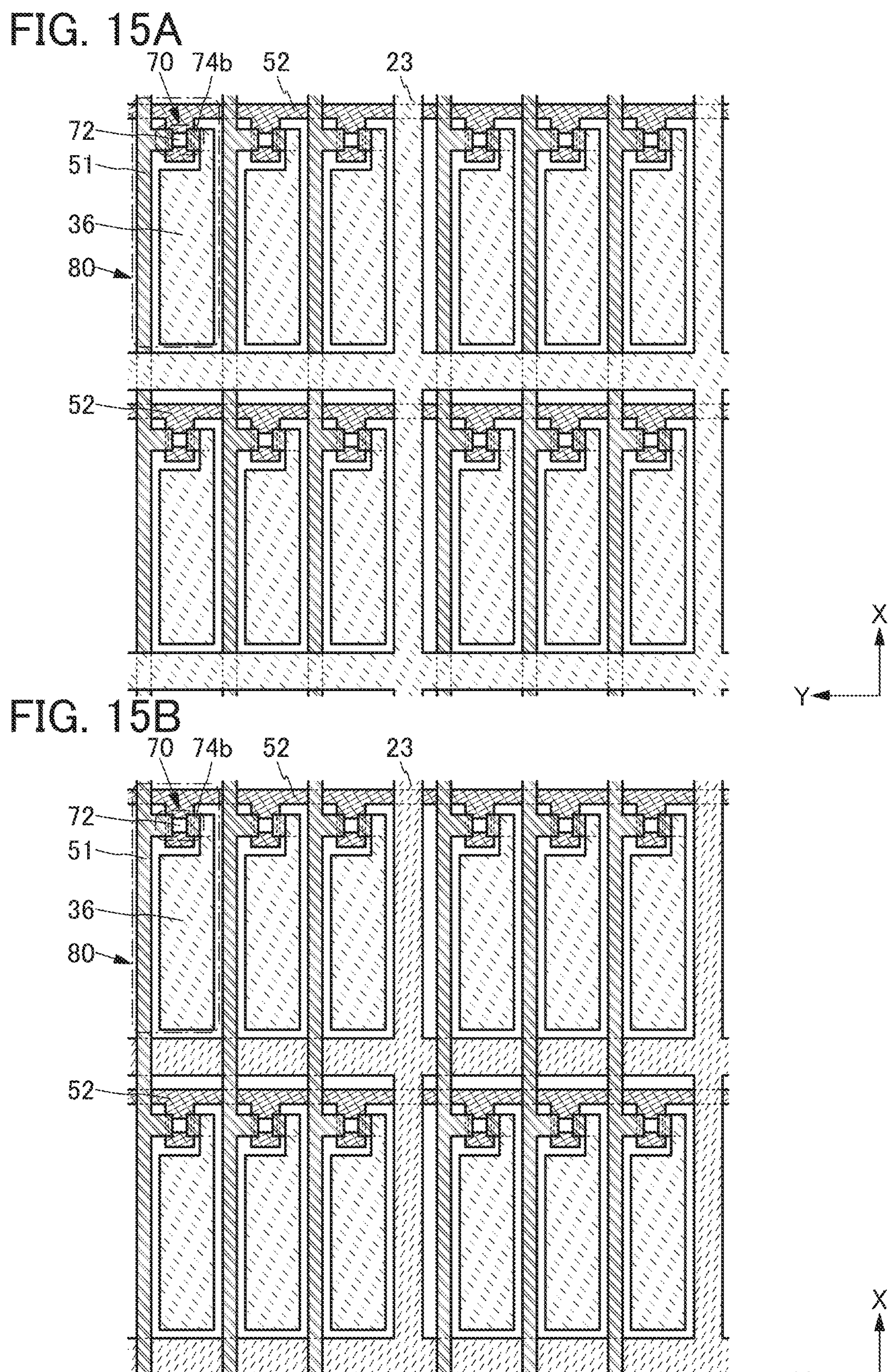
FIGS. 15A and 15B each show a structure example of a touch panel module of an embodiment.

FIG. 15A illustrates an example where the wiring 23 having a mesh shape is formed by processing the same conductive film as the pixel electrode 36.

FIG. 15B illustrates an example where the wiring 23 having a mesh shape is formed using a conductive film different from the signal line 51, the scan line 52, and the pixel electrode 36. In the example in FIG. 15B, the wiring 23 is positioned at least above the scan line 52 and at least below the signal line 51.

Note that the position of the wiring 23 in the height direction is not limited thereto, and the wiring 23 may be provided over an insulating layer different from the signal line 51, the scan line 52, and the pixel electrode 36. The wiring 23 may be positioned below or above the signal line 51, the scan line 52, and the pixel electrode 36 or between two of the signal line 51, the scan line 52, and the pixel electrode 36.

Although the wiring 23 is described here, the wiring 24 (the conductive layers 26*a* and 26*b* and the conductive layer 26) can have a similar structure.

The above is the description of Structure Example 1 of Wiring.

Structure Example of Pixel

Specific examples of a pixel which is provided in the display portion 32 and includes a liquid crystal element will be described with reference to drawings. [Structure Example 1 of Pixel]

Figure 16:
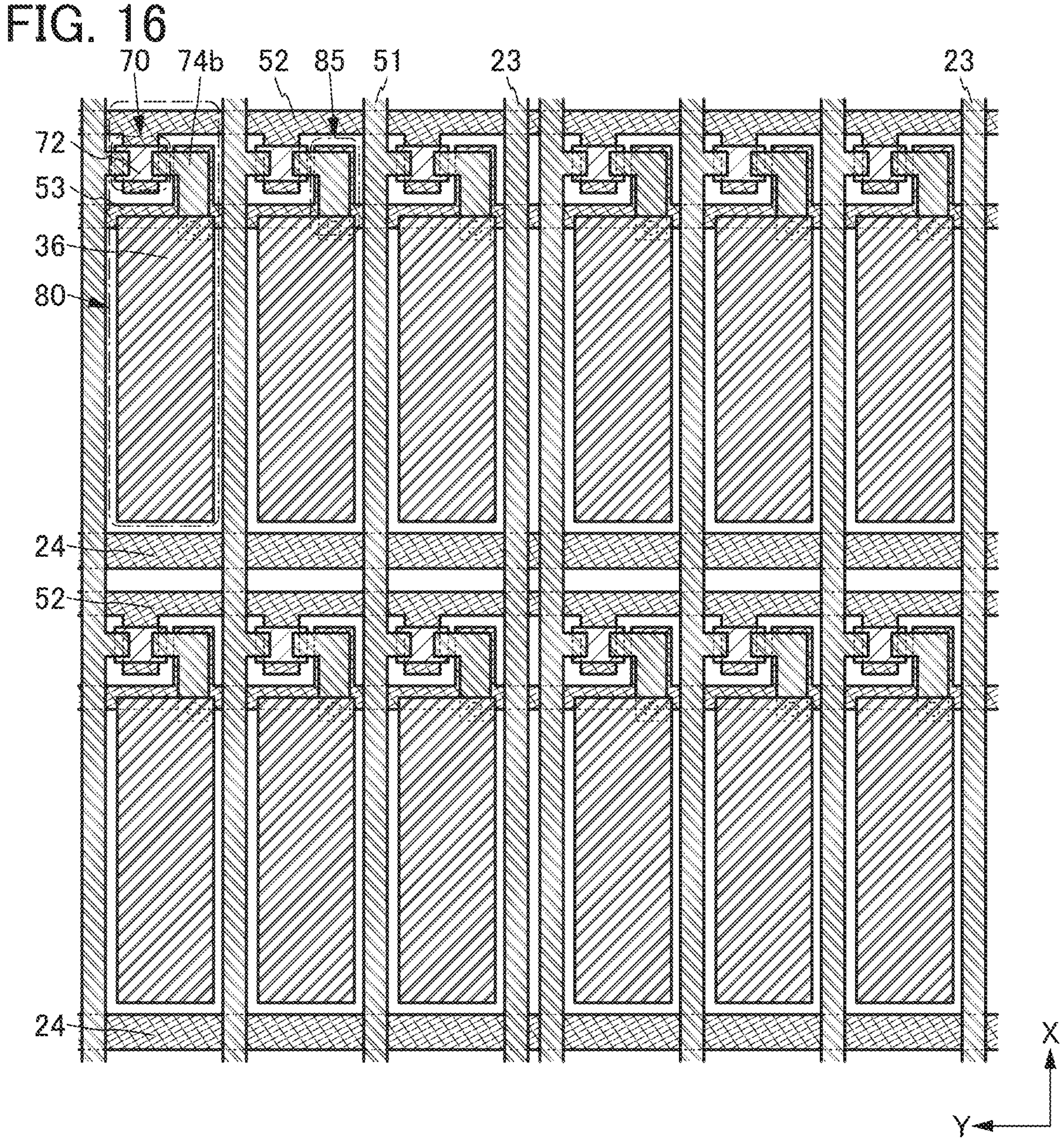
FIG. 16 shows a structure example of a touch panel module of an embodiment.

FIG. 16 illustrates a structure example of the pixel circuit 80 applicable to a liquid crystal element using a VA mode.

The pixel circuit 80 in FIG. 16 includes the transistor 70, a capacitor 85, the pixel electrode 36, and the like. The pixel circuit 80 is connected to a capacitor line 53 in addition to the signal line 51 and the scan line 52.

Part of the capacitor line 53 functions as one electrode of the capacitor 85 in the pixel circuit 80. The capacitor line 53 can be supplied with a fixed potential such as a common potential, a ground potential, or a reference potential, for example, and may be supplied with a pulse potential or the like depending on a driving method.

In the example in FIG. 16, the capacitor 85 includes part of the conductive layer 74*b*, part of the capacitor line 53, and an insulating layer (not illustrated) positioned therebetween.

In the example in FIG. 16, the capacitor line 53 is provided to extend in a direction (the Y direction) parallel to the scan line 52. One embodiment of the present invention is not limited thereto, and the capacitor line 53 may be provided to extend in a direction (the X direction) parallel to the signal line 51 or may be provided to extend in both directions in a grid pattern.

In the example in FIG. 16, the capacitor line 53 is formed by processing the same conductive film as the scan line 52; however, the capacitor line 53 may be formed by processing the same conductive film as the signal line 51, the pixel electrode 36, or the like, or by processing a conductive film different from them.

In FIG. 16, the wiring 23 and the wiring 24 each have the structure described in Structure Example 1-1. Specifically, the wiring 23 extending in the X direction is formed by processing the same conductive film as the signal line 51 and the wiring 24 extending in the Y direction is formed by processing the same conductive film as the scan line 52. Note that the structures of the wirings 23 and 24 can be replaced with the above-described structures.

Structure Example 2 of Pixel

Figure 17:
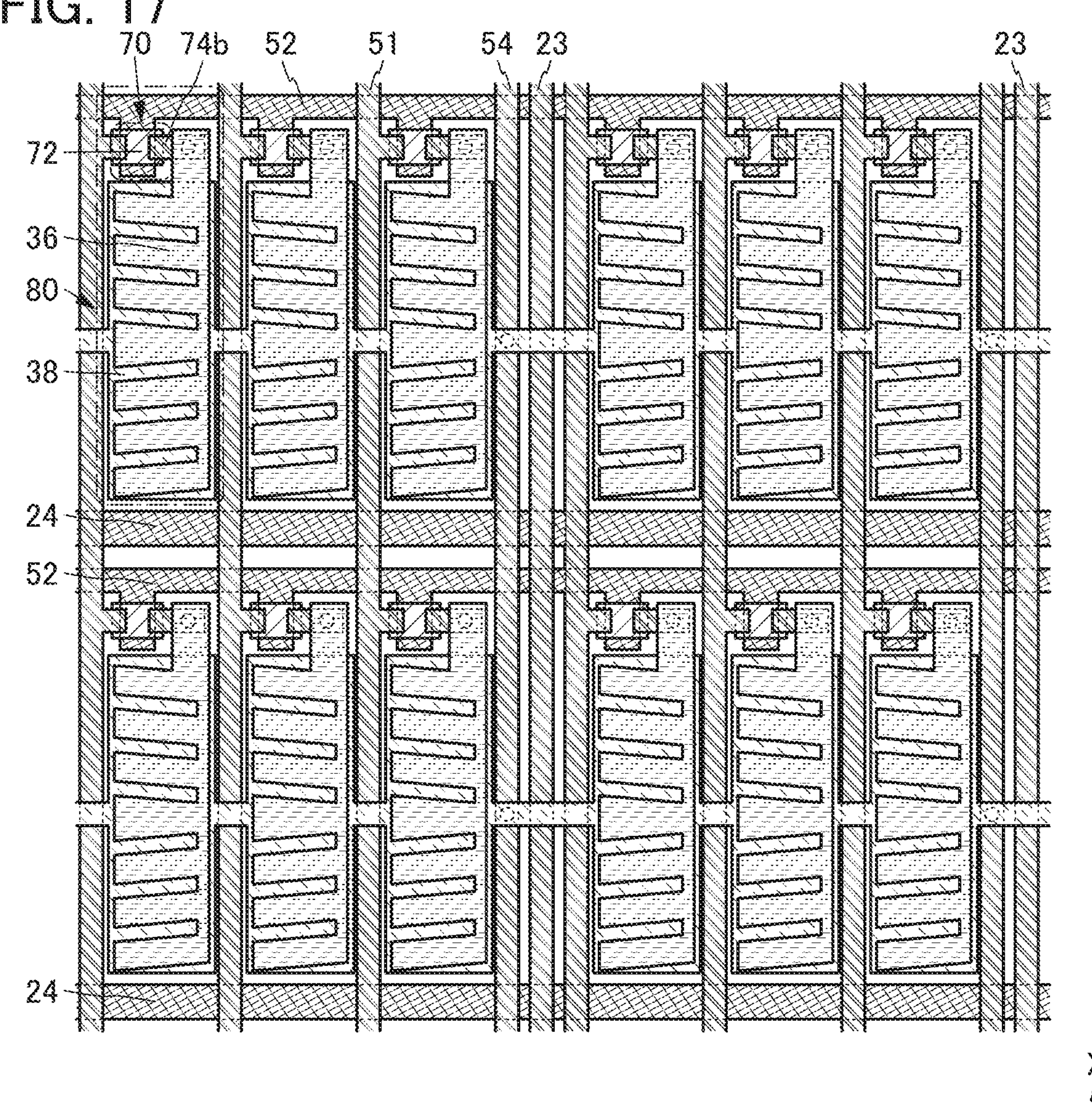
FIG. 17 shows a structure example of a touch panel module of an embodiment.

FIG. 17 illustrates a structure example of the pixel circuit 80 applicable to a liquid crystal element using an FFS mode.

The pixel circuit 80 in FIG. 17 includes the transistor 70, the pixel electrode 36, and the common electrode 38. The pixel circuit 80 is connected to the signal line 51, the scan line 52, and a common wiring 54.

The common wiring 54 is a wiring supplied with a potential supplied to the common electrode 38. The common wiring 54 can be supplied with a fixed potential such as a common potential, a ground potential, or a reference potential, for example, and may be supplied with a pulse potential or the like depending on a driving method.

In the pixel circuit 80, the common electrode 38 is provided to overlap with the pixel electrode 36. The pixel electrode 36 has a comb-like top surface shape. The common electrode 38 is provided to overlap with at least a region between two adjacent projected portions of the pixel electrode 36.

As illustrated in FIG. 17, a side of the projected portion of the pixel electrode 36 is preferably oblique to the X direction or the Y direction. In FIG. 17, the obliquely projected portions of the pixel electrode 36 are arranged symmetrically with respect to the Y direction. In the pixel electrode 36, two kinds of portions projected symmetrically with respect to the X direction or the Y direction are preferably provided in such a manner. The use of the pixel electrode 36 having such a structure can expand the viewing angle of the display portion 32. Furthermore, in the pixel circuit 80, a capacitor can be formed using the pixel electrode 36, the common electrode 38, and an insulating layer (not illustrated) positioned therebetween. Thus, a space for a capacitor line or a capacitor is unnecessary, which easily leads to an increase in aperture ratio or resolution.

The common electrodes 38 extend in the Y direction. Furthermore, the common electrodes 38 are electrically connected to the common wirings 54 extending parallel to each other in the X direction. Consequently, the common electrodes 38 in the plurality of pixel circuits 80 adjacent in the Y direction and the plurality of pixel circuits 80 adjacent in the X direction can be electrically connected to each other.

It is preferable that the width of the common electrode 38 in the X direction be small in a portion where the common electrode 38 and the signal line 51 overlap with each other as illustrated in FIG. 17 because parasitic capacitance between the common electrode 38 and the signal line 51 can be reduced.

Although the example where the pixel electrode 36 having a comb-like top surface shape is positioned above the common electrode 38 is described here, their positions can be reversed. In that case, the common electrode 38 has a comb-like top surface shape and the pixel electrode 36 is provided to overlap with a region between two projected portions of the common electrode 38.

In the example in FIG. 17, the common wiring 54 is formed by processing the same conductive film as the signal line 51; however, the common wiring 54 may be formed by processing the same conductive film as the scan line 52, the common electrode 38, the pixel electrode 36, or the like, or by processing a conductive film different from them.

In FIG. 17, the wiring 23 and the wiring 24 each have the structure described in Structure Example 1-1. Specifically, the wiring 23 extending in the X direction is formed by processing the same conductive film as the signal line 51 and the wiring 24 extending in the Y direction is formed by processing the same conductive film as the scan line 52. Note that the structures of the wirings 23 and 24 can be replaced with the above-described structures.

Modification Example

Other structure examples which can be applied to the pixel circuit 80 will be described below.

Figure 18A:
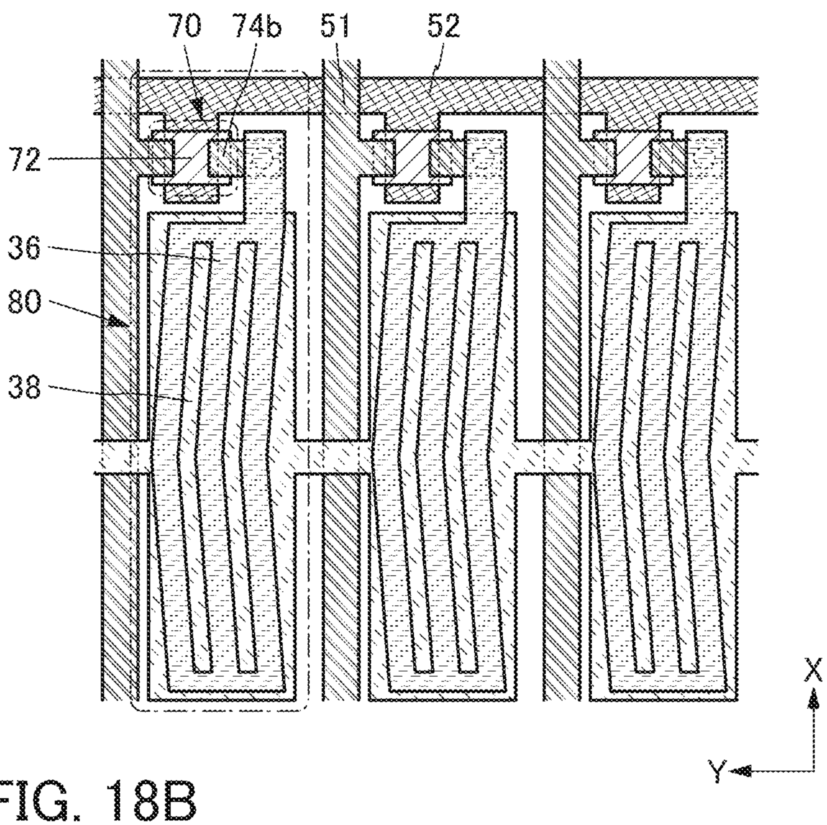
FIGS. 18A and 18B each show a structure example of a pixel of an embodiment.

FIG. 18A is different from FIG. 17 mainly in the shape of the pixel electrode 36. The pixel electrode 36 has a top surface shape including one or more openings (slits).

In that case, as illustrated in FIG. 18A, the shape of the slit of the pixel electrode 36 is preferably a V-shape in which part of a rectangle is bent, not a rectangle. Thus, the viewing angle of the display portion 32 can be expanded.

As in FIG. 17, FIG. 18A illustrates an example where the width of part of the common electrode 38 is reduced so that an area where the common electrode 38 and the signal line 51 intersect each other between the adjacent pixel circuits 80 is reduced. Such a structure can reduce the parasitic capacitance of the signal line 51.

Figure 18B:
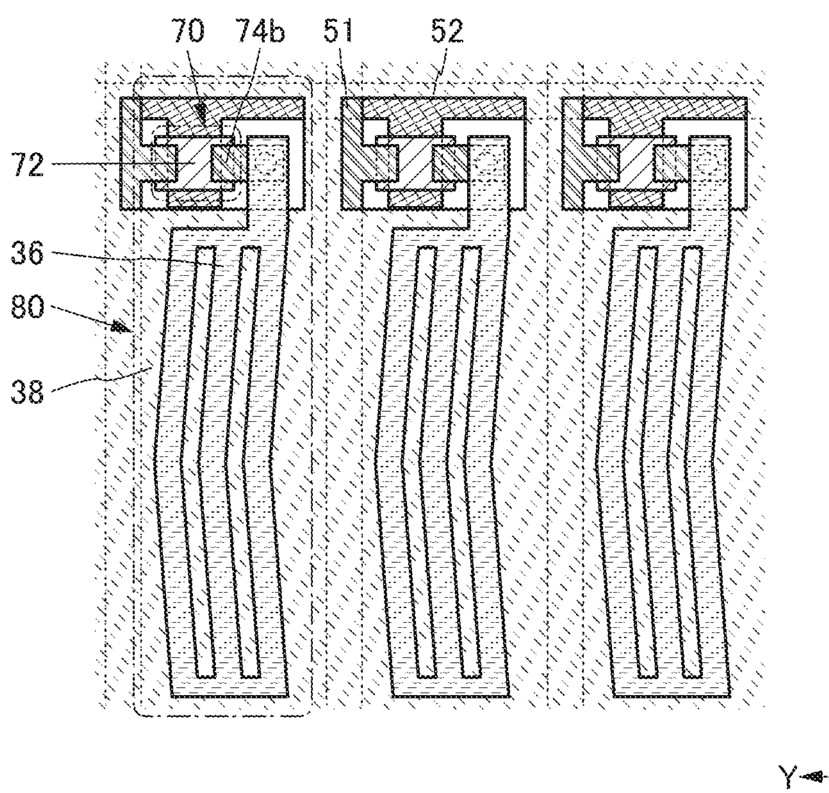

FIG. 18B illustrates an example where the common electrode 38 has a shape different from that in FIG. 18A. The common electrode 38 includes an opening overlapping with the transistor 70 and a contact portion between the conductive layer 74*b* and the pixel electrode 36. In FIG. 18B, one opening is provided for each pixel circuit. The common electrode 38 is provided to extend in the X direction and the Y direction. The common electrode 38 includes a region overlapping with part of the signal line 51 and a region overlapping with part of the scan line 52. Such a structure can reduce electrical resistance of the common electrode 38 in the X direction and the Y direction.

Figure 19:
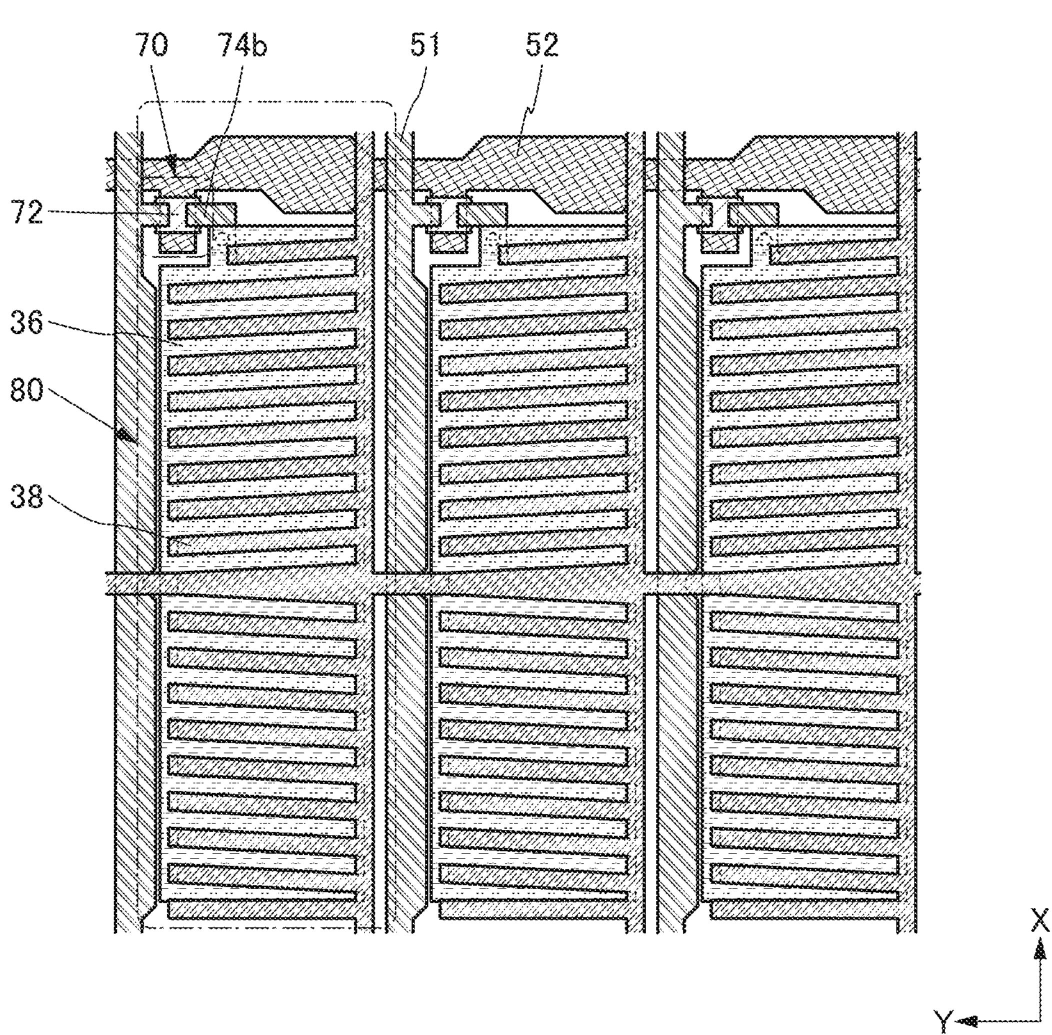
FIG. 19 shows a structure example of a pixel of an embodiment.

FIG. 19 illustrates an example where the common electrode 38 is positioned above the pixel electrode 36. The pixel electrode 36 positioned in a lower portion also has a comb-like top surface shape. The pixel electrode 36 and the common electrode 38 are arranged to engage with each other in a plan view.

In the example in FIG. 19, a side of a projected portion of the pixel electrode 36 and a side of a projected portion of the common electrode 38 are substantially aligned with each other in a plan view. One embodiment of the present invention is not limited thereto, and the pixel electrode 36 and the common electrode 38 may be provided so that the two projected portions partly overlap with each other in a plan view. Alternatively, the pixel electrode 36 and the common electrode 38 may be provided so that the two projected portions are apart from each other in a plan view.

As illustrated in FIG. 19, the signal line 51 has a top surface shape having a portion of which has a small width so that the width of a portion overlapping with the scan line 52, the common electrode 38, and the like is small and the other portion of which has a large width. With such a structure, the resistance of the signal line 51 itself can be reduced while parasitic capacitance between the signal line 51 and another wiring or between the signal line 51 and another electrode is reduced. The scan line 52 also has a top surface shape having a partly small width so that an area overlapping with the signal line 51 is small.

FIG. 20 illustrates an example where two pixel circuits 80 are provided in each of the X direction and the Y direction. In FIG. 20, the pixel circuits 80 are provided symmetrically with respect to the X direction and the Y direction, and accordingly, one unit including four pixel circuits 80 is formed.

In FIG. 20, the common electrode 38 includes a portion extending in the X direction and a portion extending in the Y direction. In FIG. 19, a portion where the common electrodes 38 included in the pixel circuits 80 adjacent in the Y direction are connected to each other and a portion where the common electrodes 38 included in the pixel circuits 80 adjacent in the X direction are connected to each other is provided for each sub-pixel. In contrast, in FIG. 20, a portion which connects the common electrodes 38 included in the pixel circuits 80 adjacent in the Y direction extends in the X direction and is provided between the two pixel circuits 80 adjacent in the Y direction. Furthermore, a portion which connects the common electrodes 38 included in the pixel circuits 80 adjacent in the X direction extends in the Y direction and is provided between the two pixel circuits 80 adjacent in the X direction. Thus, the area of the portions where the common electrodes 38 included in the adjacent pixel circuits 80 are connected to each other can be reduced, so that the aperture ratio or the resolution can be increased.

The above is the description of Structure Example of Pixel.

Structure Example 2 of Wiring

A specific structure example of a wiring in the case where an organic EL element is used for the display portion 32 is described below. Note that in the following diagrams, a layer, a wiring, and the like formed by processing the same conductive film are shown with the same hatching pattern for simplicity. Note that portions similar to those described in Structure Example 1 of Wiring are not described in some cases.

Structure Example 4-1

Figure 21:
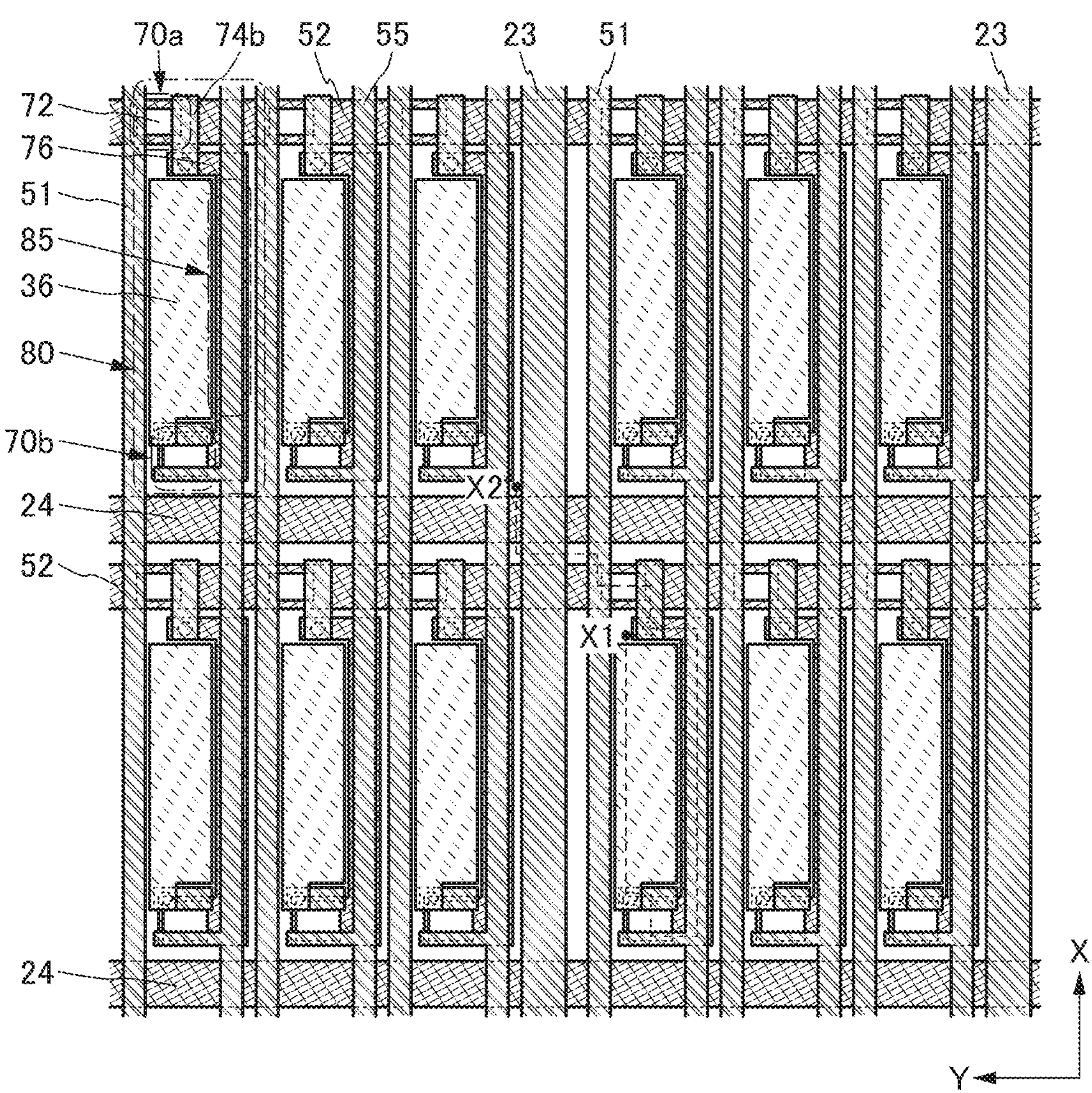
FIG. 21 shows a structure example of a touch panel module of an embodiment.

FIG. 21 illustrates an example of arrangement (layout) of the signal line 51, the scan line 52, a power supply line 55, the wiring 23, the wiring 24, the pixel electrode 36, and the like in the display portion 32.

The signal line 51 and the wiring 23 are parallel in the X direction. The scan line 52 and the wiring 24 are parallel in the Y direction. The signal line 51 and the wiring 23 are formed by processing the same conductive film, and the scan line 52 and the wiring 24 are formed by processing the same conductive film. Thus, the wiring 23 and the wiring 24 can be formed without an increase in the number of steps.

The power supply line 55 has a function of supplying a potential or a signal to one electrode of the capacitor 85 of the pixel circuit 80. An example where the power supply line 55 is parallel to the signal line 51 is shown here. Note that the power supply line 55 may be parallel to the scan line 52. In that case, when the power supply line 55 is formed by processing the same conductive film as the scan line 52, the power supply line 55 and the signal line 51 can intersect each other and the power supply line 55 and the wiring 23 can intersect each other without any special contrivance.

The pixel circuit 80 in FIG. 21 includes a transistor 70*a*, a transistor 70*b*, the capacitor 85, and the pixel electrode 36. The pixel circuits 80 are arranged in the X direction and the Y direction in a matrix. The pixel circuit 80 corresponds to one sub-pixel included in the display portion 32.

In the pixel circuit 80, part of the scan line 52 functions as a gate electrode of the transistor 70*a*. Part of the signal line 51 functions as one of a source electrode and a drain electrode of the transistor 70*a*. As illustrated in FIG. 21, the semiconductor layer 72 is provided to overlap with part of the scan line 52, and the signal line 51 is provided to overlap with part of the semiconductor layer 72. Furthermore, the conductive layer 74*b* functioning as the other of the source electrode and the drain electrode of the transistor 70*a* is provided on a side opposite to the signal line 51 of the semiconductor layer 72. The conductive layer 74*b* is electrically connected to the conductive layer 76. A portion of the conductive layer 76 functions as a gate electrode of the transistor 70*b*. The conductive layer 76 and the power supply line 55 are provided to overlap with each other so that the capacitor 85 is formed. In other words, another portion of the conductive layer 76 functions as one electrode of the capacitor 85. A portion of the power supply line 55 functions as the other electrode of the capacitor 85 and another portion of the power supply line 55 functions as one of a source and a drain of the transistor 70*b*. The other of the source and the drain of the transistor 70*b* is electrically connected to the pixel electrode 36.

Structure Example 4-2

Figures 22A, 22B:
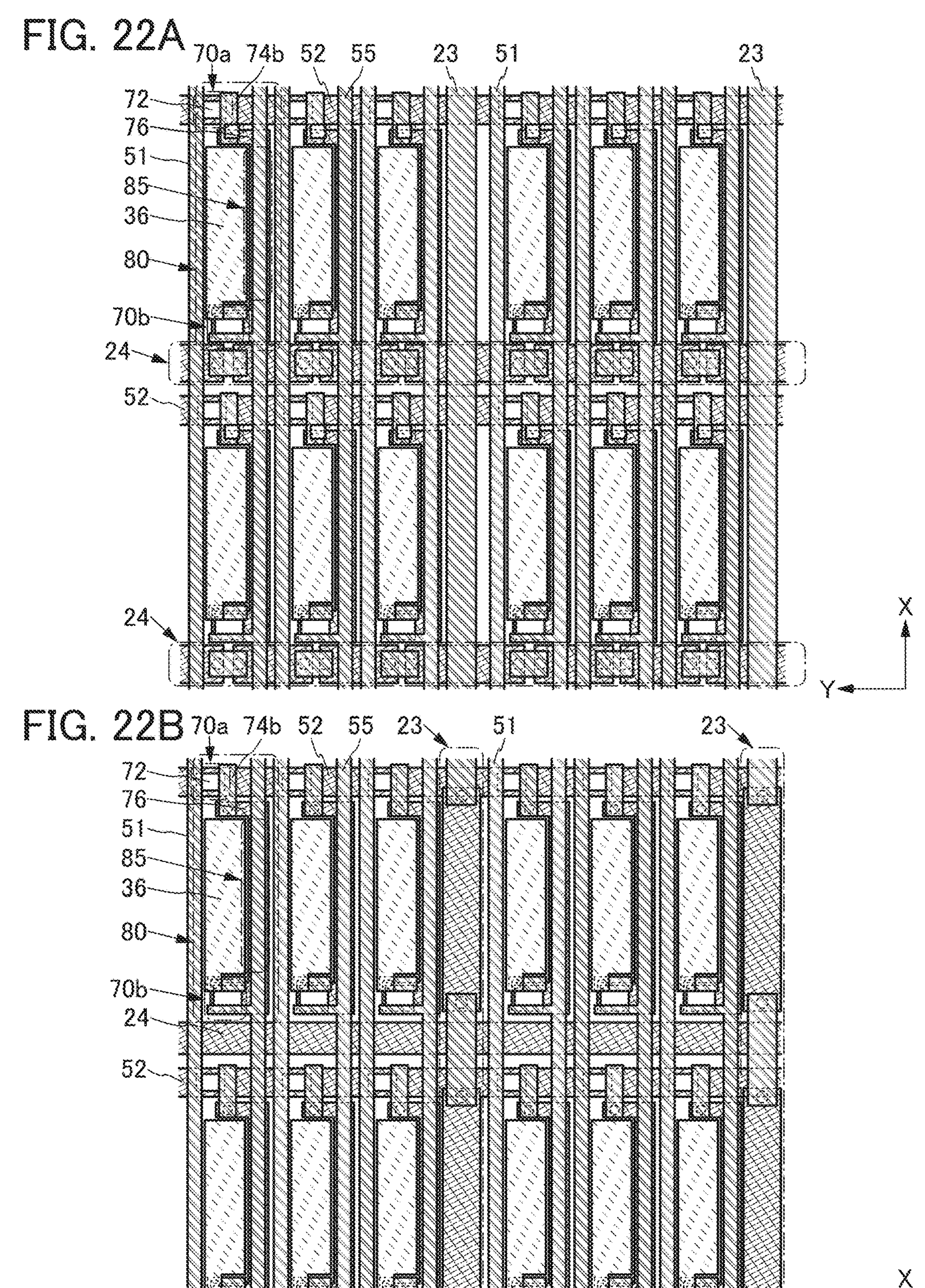
FIGS. 22A and 22B each show a structure example of a touch panel module of an embodiment.

FIG. 22A illustrates an example where the structure of the wiring 24 is different from that in FIG. 21. The wiring 24 in FIG. 22A has a structure in which a portion formed by processing the same conductive film as the signal line 51 and a portion formed by processing the same conductive film as the scan line 52 are alternately arranged as in Structure Example 1-2. The two types of portions overlap with each other in regions and are electrically connected to each other through openings in an insulating layer positioned therebetween in the regions.

Each of the portions of the wiring 24 that are formed by processing the same conductive film as the scan line 52 intersects at least one of the signal line 51, the power supply line 55, and the wiring 23.

Structure Example 4-3

FIG. 22B illustrates an example where the structure of the wiring 23 is different from that in FIG. 21. The wiring 23 in FIG. 22B has a structure in which a portion formed by processing the same conductive film as the signal line 51 and a portion formed by processing the same conductive film as the scan line 52 are alternately arranged as in Structure Example 1-3. The two types of portions overlap with each other in regions and are electrically connected to each other through openings in an insulating layer positioned therebetween in the regions.

Structure Example 5-1

Figure 23:
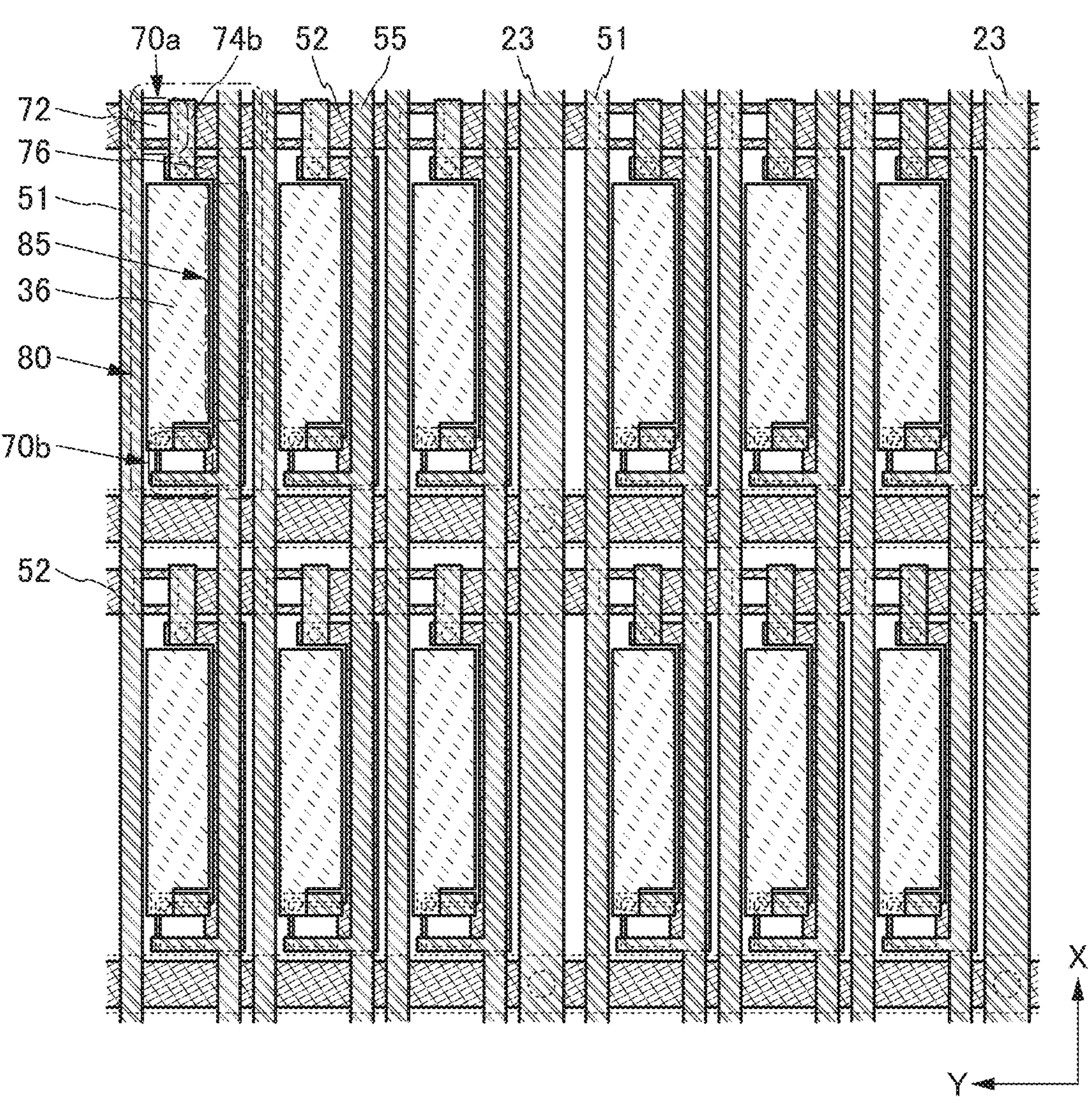
FIG. 23 shows a structure example of a touch panel module of an embodiment.

FIG. 23 illustrates an example where the wiring 23 includes both of portions parallel in the X direction and portions parallel in the Y direction as in Structure Example 2-1. Although the wiring 23 is used for the description here, the wiring 24, the conductive layer 26, the conductive layer 26*a*, the conductive layer 26*b*, and the like can have similar shapes.

Structure Example 5-2

Figures 24A, 24B:
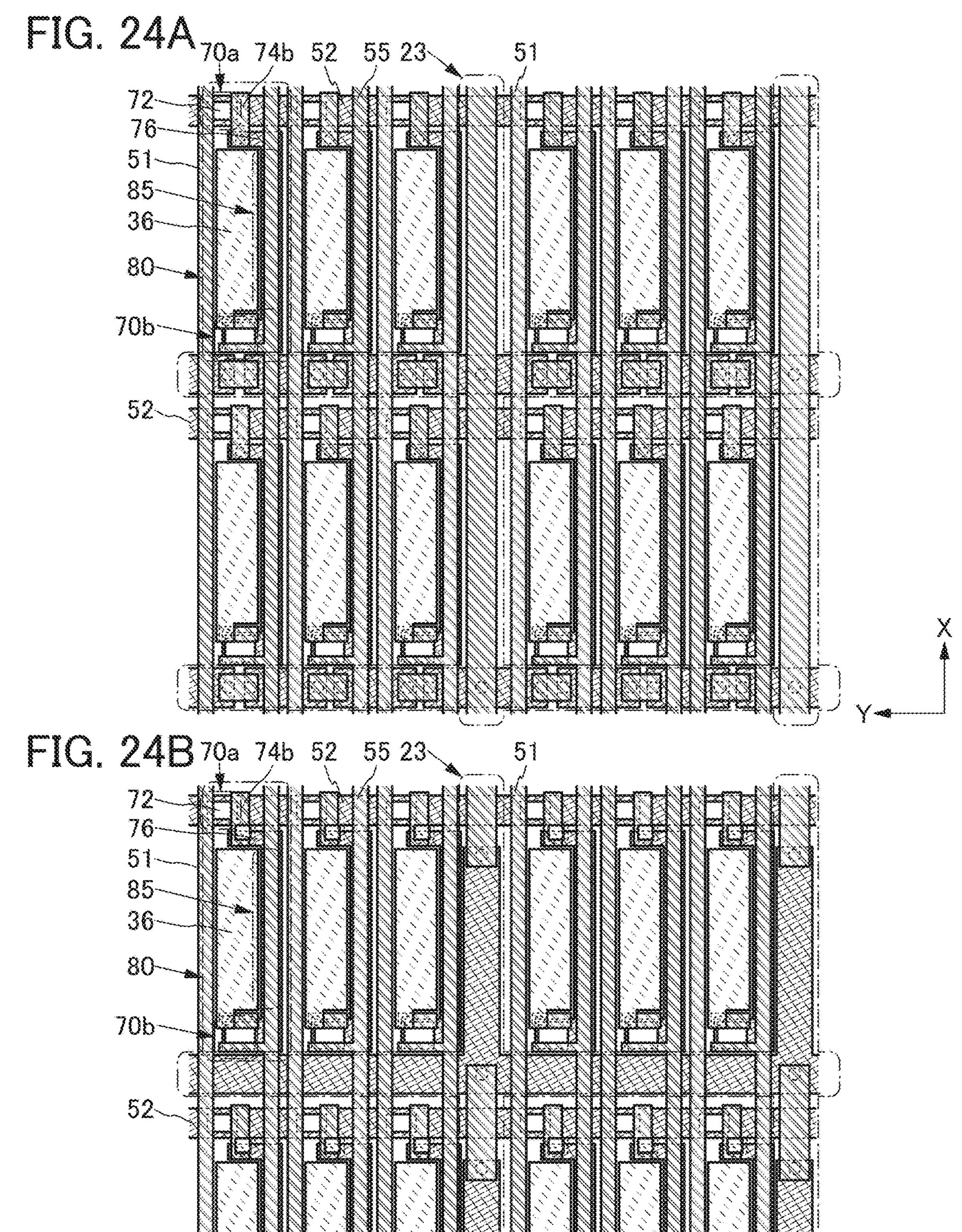
FIGS. 24A and 24B each show a structure example of a touch panel module of an embodiment.

FIG. 24A illustrates an example where the structure of the wiring 23 is different from that in FIG. 23. In the structure in FIG. 24A, portions parallel in the X direction in the wiring 23 are formed by processing the same conductive film as the signal line 51 as in Structure Example 2-2. Meanwhile, portions parallel in the Y direction in the wiring 23 have a structure in which a portion (conductive layer) obtained by processing the same conductive film as the signal line 51 and a portion (conductive layer) obtained by processing the same conductive film as the scan line 52 are alternately arranged. In the portions parallel in the Y direction, the two types of different conductive layers overlap with each other in regions and are electrically connected to each other through openings in an insulating layer positioned therebetween in the regions.

In the portions of the wiring 23 which are parallel in the Y direction, the portions obtained by processing the same conductive film as the scan line 52 intersect at least one of the signal line 51 and the power supply line 55.

Structure Example 5-3

FIG. 24B illustrates an example where the structure of the wiring 23 is different from those in FIG. 23 and FIG. 24A. In the structure in FIG. 24B, portions parallel in the Y direction in the wiring 23 are formed by processing the same conductive film as the scan line 52 as in Structure Example 2-3. Meanwhile, portions parallel in the X direction in the wiring 23 have a structure in which a portion (conductive layer) obtained by processing the same conductive film as the scan line 52 and a portion (conductive layer) obtained by processing the same conductive film as the signal line 51 are alternately arranged. In the portions parallel in the X direction, the two different conductive layers overlap with each other in regions and are electrically connected to each other through openings in an insulating layer positioned therebetween in the regions.

Structure Example 6-1

Although the example where the wiring 23 and the wiring 24 are formed by processing the same conductive films as the signal line 51 and the scan line 52 is described above, one or both of the wirings 23 and 24 may be formed by processing a conductive film different from the signal line 51 and the scan line 52 as in Structure Example 3-1 or the like. FIG. 25A and FIG. 25B each illustrate an example where the wiring 23 is formed by processing a conductive film different from the signal line 51 unlike the structure illustrated in FIG. 21.

Figure 26:
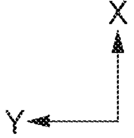
FIG. 26 shows a structure example of a touch panel module of an embodiment.

FIG. 26 illustrates an example where the wiring 24 is formed by processing a conductive film different from the scan line 52 unlike the structure illustrated in FIG. 21.

Structure Example 6-2

Figures 27A, 27B:
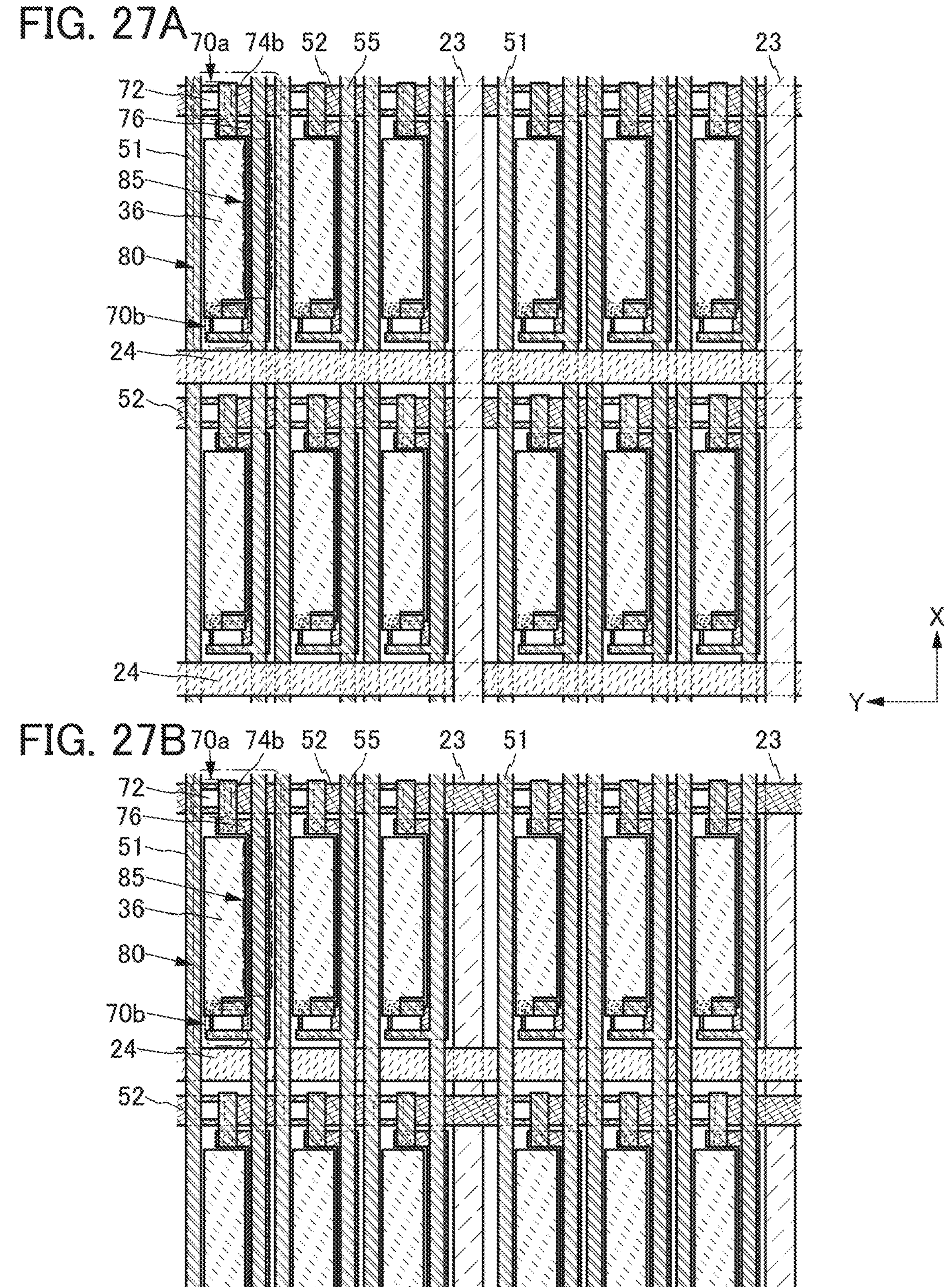
FIGS. 27A and 27B each show a structure example of a touch panel module of an embodiment.

FIG. 27A illustrates an example where the wiring 23, the wiring 24, the signal line 51, and the scan line 52 are formed by processing respective conductive films as in Structure Example 3-2. Here, the wiring 23, the wiring 24, the signal line 51, and the scan line 52 may be provided over respective insulating layers.

In the example in FIG. 27A, the wiring 24 is positioned at least above the wiring 23, the signal line 51, and the scan line 52, and the wiring 23 is positioned at least above the scan line 52.

FIG. 27B illustrates an example where the wiring 24 is positioned at least below the signal line 51, and the wiring 23 is positioned at least below the wiring 24 and the scan line 52.

Structure Example 6-3

Figures 28A, 28B:
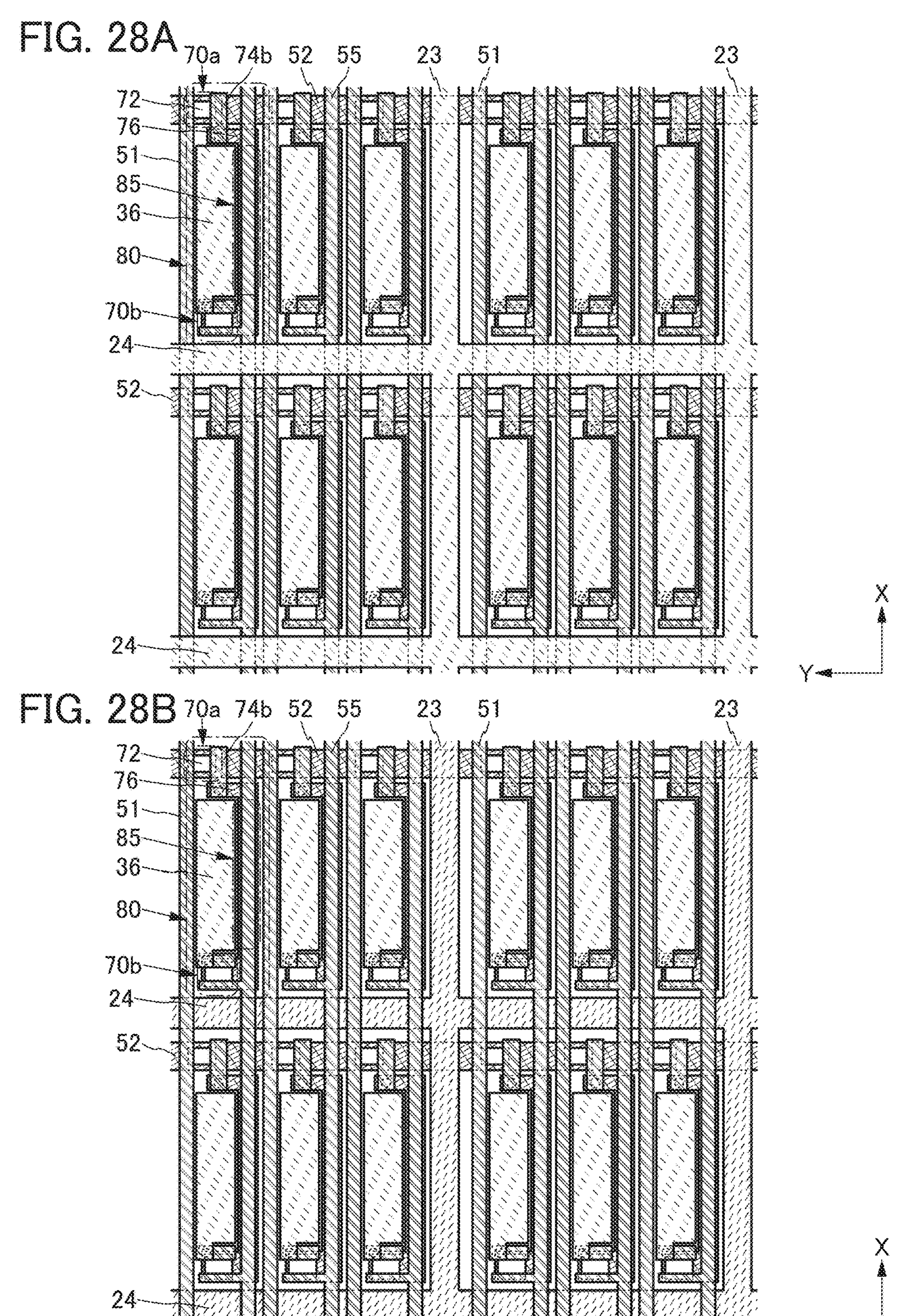
FIGS. 28A and 28B each show a structure example of a touch panel module of an embodiment.

FIG. 28A illustrates an example where the wiring 23 having a mesh shape is formed by processing the same conductive film as the pixel electrode 36 as in Structure Example 3-3. FIG. 28B illustrates an example where the wiring 23 having a mesh shape is formed using a conductive film different from the signal line 51, the scan line 52, and the pixel electrode 36. In the example in FIG. 28B, the wiring 23 is positioned at least above the scan line 52 and at least below the signal line 51.

The above is the description of Structure Example 2 of Wiring.

Configuration Example of Circuit

Figure 29:
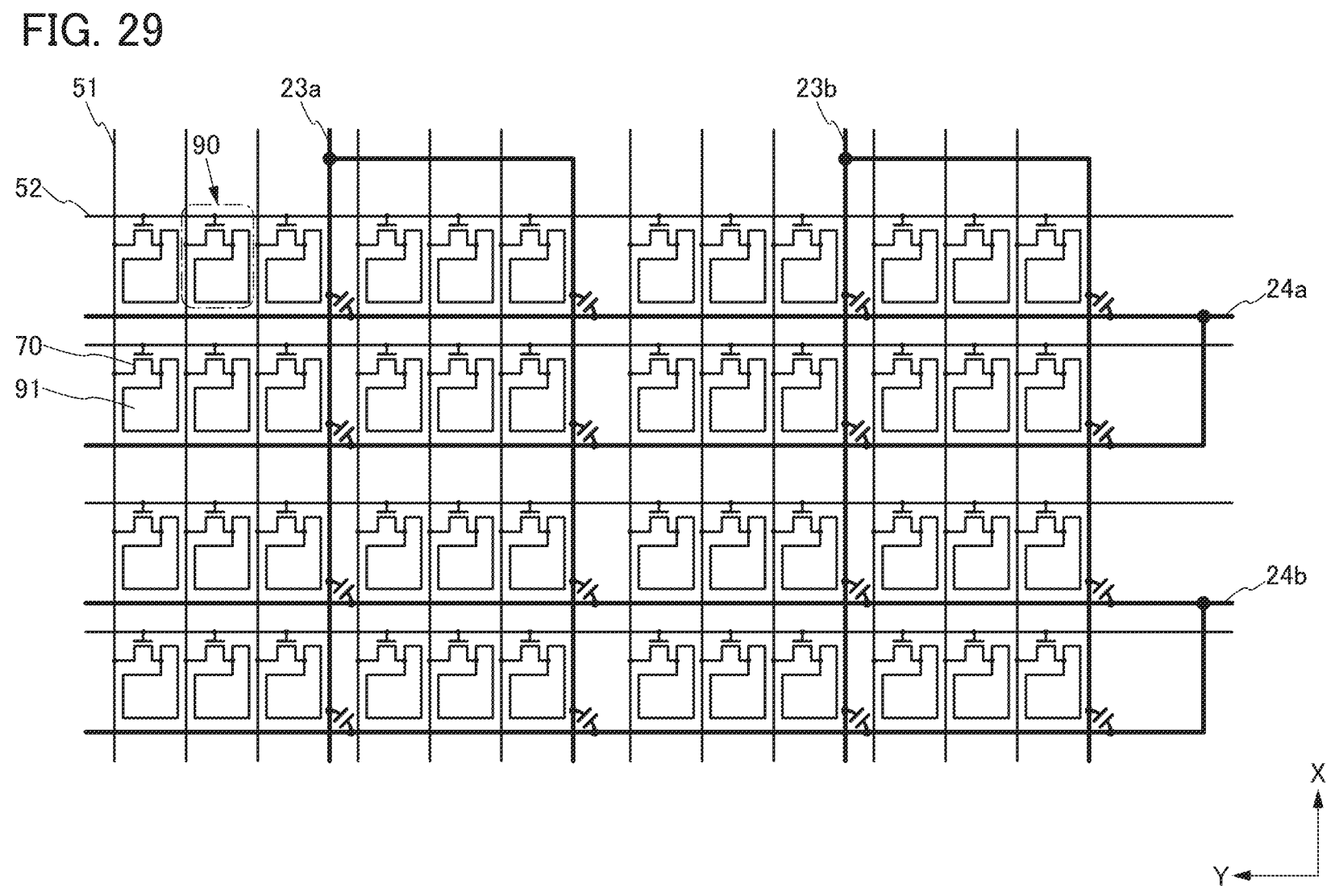

FIG. 29 illustrates an example of a circuit diagram of a touch panel of one embodiment of the present invention. In FIG. 29, part of a display portion in which two kinds of wirings included in a touch sensor are each provided in a stripe form is illustrated. The example in FIG. 29 corresponds to the examples in FIGS. 6A and 6B and the like.

Pixels 90 arranged in a matrix each include the transistor 70 and a circuit 91. The circuit 91 includes at least one display element. A variety of display elements can be applied to the display element. Typically, the above-described liquid crystal element 60 or the light-emitting element 40 is preferably used.

A wiring 23*a* and a wiring 23*b* each include a plurality of portions extending in a direction parallel to the signal line 51 (the X direction). Furthermore, a wiring 24*a* and a wiring 24*b* include a plurality of portions extending in a direction parallel to the scan line 52 (the Y direction). The wiring 23*a*, the wiring 23*b*, the wiring 24*a*, and the wiring 24*b* have the plurality of portions electrically connected to each other in a region outside the display portion. Note that in the following description, the wiring 23*a* and the wiring 23*b* are collectively referred to as the wiring 23 and the wiring 24*a* and the wiring 24*b* are collectively referred to as the wiring 24 in some cases.

As illustrated in FIG. 29, the wiring 23 and the wiring 24 form capacitors. In other words, the capacitors are arranged in a matrix to form a touch sensor. The touch sensor can sense an object by utilizing a change in capacitance of the capacitor due to the approach of the object. The capacitance includes, for example, a first capacitance component of a portion where the wiring 23 and the wiring 24 overlap with each other and a second capacitance component formed when the wiring 23 and the wiring 24 are provided close to each other. The second capacitance component is mainly changed owing to the approach of the object.

An example where four wirings (the wiring 23*a*, the wiring 23*b*, the wiring 24*a*, and the wiring 24*b*) are provided is shown here for simplicity. The wirings extending in the X direction (the wiring 23*a* and the wiring 23*b*) each have two portions parallel in the X direction and the wirings extending in the Y direction (the wiring 24*a* and the wiring 24*b*) each have two portions parallel in the Y direction; however, one embodiment of the present invention is not limited thereto, and three or more portions parallel in the X direction or three or more portions parallel in the Y direction may be provided. The number of pixels 90 provided between two linear portions of one wiring is not limited to the example in FIG. 29 as long as at least one pixel 90 is provided.

Figure 30:
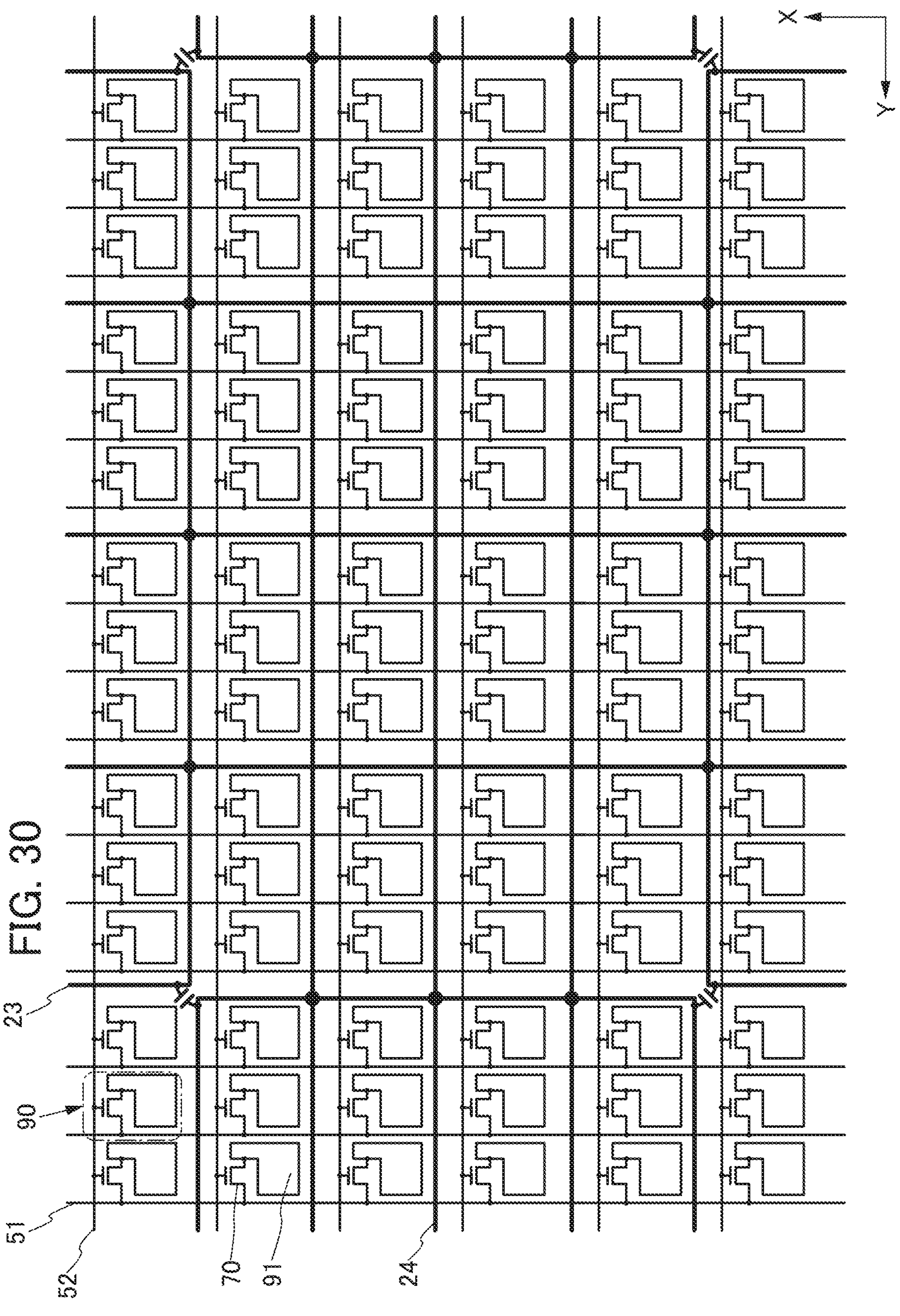
FIG. 30 shows a configuration example of a circuit of an embodiment.

In FIG. 30, part of a display portion in which two kinds of wirings included in a touch sensor are each have a mesh shape is illustrated. The example in FIG. 30 corresponds to the examples in FIGS. 7A and 7B and the like. FIG. 30 illustrates an intersection of the wiring 23 and the wiring 24 which each have a mesh shape.

Also in the example in FIG. 30, the wiring 23 and the wiring 24 form capacitors. Detection can be performed by utilizing a change in capacitance of the capacitor.

The above is the description of Configuration Example of Circuit.

Cross-Sectional Structure Example 3

A specific cross-sectional structure example of a touch panel module of one embodiment of the present invention in which a liquid crystal element is applied to a display element is described below.

Cross-Sectional Structure Example 3-1

Figure 31:
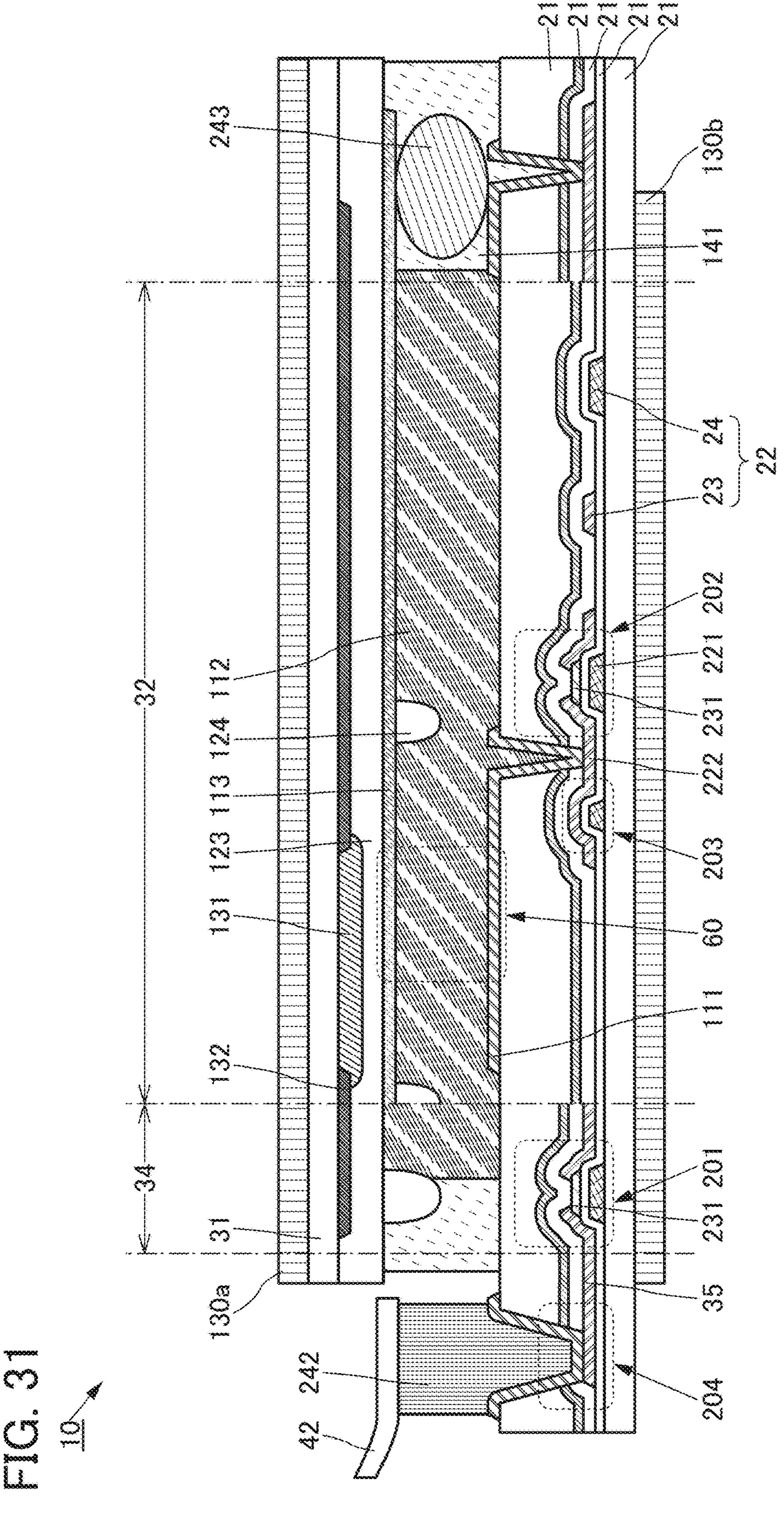
FIG. 31 shows a structure example of a touch panel module of an embodiment.

FIG. 31 is a schematic cross-sectional view of the touch panel module 10. FIG. 31 illustrates an example of cross sections of a region including the FPC 42, a region including the circuit 34, a region including the display portion 32, and the like in FIG. 1A.

The substrate 21 and the substrate 31 are attached to each other with an adhesive layer 141. A region surrounded by the substrate 21, the substrate 31, and the adhesive layer 141 is filled with a liquid crystal 112. A polarizing plate 130*a* is provided on an outer surface of the substrate 31. A polarizing plate 130*b* is provided on an outer surface of the substrate 21.

Although not illustrated, a backlight can be provided outside the polarizing plate 130*a* or the polarizing plate 130*b*.

A touch sensor 22 including the wiring 23 and the wiring 24, a pixel electrode 111 of the liquid crystal element 60, a transistor 201, a transistor 202, a capacitor 203, a connection portion 204, the wiring 35, and the like are provided over the substrate 21. For example, the transistor 201 corresponds to the transistor 70 described above.

A coloring layer 131, a light-blocking layer 132, an insulating layer 123, a common electrode 113 of the liquid crystal element 60, a spacer 124, and the like are provided over the substrate 31.

Insulating layers such as an insulating layer 211, an insulating layer 212, an insulating layer 213, and an insulating layer 214 are provided over the substrate 21. A portion of the insulating layer 211 functions as a gate insulating layer of each transistor, and another portion thereof functions as a dielectric of the capacitor 203. The insulating layer 212, the insulating layer 213, and the insulating layer 214 are provided to cover each transistor, the capacitor 203, and the like. The insulating layer 214 functions as a planarization layer. Note that an example where the three insulating layers, the insulating layers 212, 213, and 214, are provided to cover the transistors and the like is described here; however, one embodiment of the present invention is not limited to this example, and four or more insulating layers, a single insulating layer, or two insulating layers may be provided. The insulating layer 214 functioning as a planarization layer is not necessarily provided when not needed.

The transistor 201 and the transistor 202 each include a conductive layer 221 part of which functions as a gate, conductive layers 222 part of which functions as a source electrode and a drain electrode, and a semiconductor layer 231. Here, a plurality of layers obtained by processing the same conductive film are shown with the same hatching pattern.

In the transistor 202, one of the pair of conductive layers 222 which is not electrically connected to the pixel electrode 111 functions as part of a signal line. The conductive layer 221 functioning as a gate electrode of the transistor 202 also functions as part of a scan line.

FIG. 31 illustrates an example where the wiring 23 is formed by processing the same conductive film as the conductive layer 222 and the wiring 24 is formed by processing the same conductive film as the conductive layer 221.

FIG. 31 illustrates a cross section of one sub-pixel as an example of the display portion 32. The sub-pixel includes, for example, the transistor 202, the capacitor 203, the liquid crystal element 60, and the coloring layer 131. For example, the coloring layers 131 are selectively formed so that a sub-pixel exhibiting a red color, a sub-pixel exhibiting a green color, and a sub-pixel exhibiting a blue color are arranged; thus, full-color display can be achieved. Here, the pixel circuit (sub-pixel circuit) includes the transistor 202, the capacitor 203, the pixel electrode 111, a wiring, and the like.

FIG. 31 illustrates an example of the circuit 34 in which the transistor 201 is provided.

Although the transistors 201 and 202 each include one gate electrode in FIG. 31, the semiconductor layer 231 where a channel is formed may be provided between two gate electrodes. Such a structure enables control of threshold voltages of transistors. In that case, the two gate electrodes may be connected to each other and supplied with the same signal to operate the transistors. Such transistors can have higher field-effect mobility and thus have higher on-state current than other transistors. Consequently, a circuit capable of high-speed operation can be obtained. Furthermore, the area occupied by a circuit portion can be reduced. The use of the transistor having high on-state current can reduce signal delay in wirings and can reduce display unevenness even in a display panel or a touch panel in which the number of wirings is increased because of increase in size or resolution.

Note that the transistor included in the circuit 34 and the transistor included in the display portion 32 may have the same structure. A plurality of transistors included in the circuit 34 may have the same structure or different structures. A plurality of transistors included in the display portion 32 may have the same structure or different structures.

A material through which impurities such as water or hydrogen do not easily diffuse is preferably used for at least one of the insulating layers 212 and 213 which cover the transistors. That is, the insulating layer 212 or the insulating layer 213 can function as a barrier film. Such a structure can effectively suppress diffusion of the impurities into the transistors from the outside, and a highly reliable touch panel can be provided.

The pixel electrode 111 is provided over the insulating layer 214. The pixel electrode 111 is electrically connected to one of a source and a drain of the transistor 202 through an opening formed in the insulating layer 214, the insulating layer 213, the insulating layer 212, and the like. The pixel electrode 111 is also electrically connected to one electrode of the capacitor 203.

The insulating layer 123 is provided on the substrate 31 side to cover the coloring layer 131 and the light-blocking layer 132. The insulating layer 123 may have a function of a planarization film. The insulating layer 123 enables the common electrode 113 to have an almost flat surface, resulting in a uniform alignment state of the liquid crystal 112.

In FIG. 31, the liquid crystal element 60 includes the pixel electrode 111, part of the common electrode 113, and the liquid crystal 112 sandwiched therebetween.

Alignment films for controlling alignment of the liquid crystal 112 may be provided on surfaces of the pixel electrode 111, the common electrode 113, the insulating layer 214, and the like which are in contact with the liquid crystal 112.

In the structure of FIG. 31, the wirings 23 and 24 are provided not to overlap with the liquid crystal element 60. Furthermore, it is preferable that the wirings 23 and 24 be provided to overlap with the light-blocking layer 132.

In the liquid crystal element 60, the pixel electrode 111 and the common electrode 113 each have a function of transmitting visible light. By having such a structure, the liquid crystal element 60 can be a transmissive liquid crystal element. For example, in the case where a backlight is provided on the substrate 31 side, light from the backlight which is polarized by the polarizing plate **130*a* passes through the substrate 31, the common electrode 113, the liquid crystal 112, the pixel electrode 111, and the substrate 21, and then reaches the polarizing plate 130*b*. In this case, alignment of the liquid crystal 112 is controlled with a voltage that is applied between the pixel electrode 111 and the common electrode 113, and thus optical modulation of light can be controlled. That is, the intensity of light emitted through the polarizing plate 130*b* can be controlled. Light other than one in a particular wavelength region of the incident light is absorbed by the coloring layer 131**, and thus, emitted light is red light, for example.

As the polarizing plate **130*b*, a linear polarizing plate or a circularly polarizing plate can be used. An example of a circularly polarizing plate is a stack including a linear polarizing plate and a quarter-wave retardation plate. In particular, as illustrated in FIG. 31, in the case where the wiring 23 and the wiring 24 included in the touch sensor are provided in a position closer to the substrate 21 side than the light-blocking layer 132 is, external light is reflected by the wirings and the reflected light is visually recognized in some cases. In this case, reflection can be suppressed with a circularly polarizing plate used as the polarizing plate 130*b***.

In the case where a circularly polarizing plate is used as the polarizing plate **130*b*, a circularly polarizing plate may be also used as the polarizing plate 130*a* and a general linear polarizing plate may be used. The cell gap, alignment, driving voltage, and the like of the liquid crystal element used as the liquid crystal element 60 are controlled depending on the kinds of polarizing plates used as the polarizing plates 130***a* and 130*b* so that desirable contrast is obtained.

The liquid crystal element 60 can use a variety of modes given in Cross-sectional Structure Example 1.

The common electrode 113 is electrically connected to a conductive layer provided on the substrate 21 through a connector 243 in a portion close to an end portion of the substrate 31. Thus, a potential or a signal can be supplied from an FPC or an IC provided on the substrate 21 side to the common electrode 113.

As the connector 243, a conductive particle can be used, for example. As the conductive particle, a particle of an organic resin, silica, or the like coated with a metal material can be used. It is preferable to use nickel or gold as the metal material because contact resistance can be decreased. It is also preferable to use a particle coated with layers of two or more kinds of metal materials, such as a particle coated with nickel and further with gold. As the connector 243, a material capable of elastic deformation or plastic deformation is preferably used. As illustrated in FIG. 31, the conductive particle has a shape that is vertically crushed in some cases. With the crushed shape, the contact area between the connector 243 and a conductive layer electrically connected to the connector 243 can be increased, thereby reducing contact resistance and suppressing the generation of problems such as disconnection.

The connector 243 is preferably provided so as to be covered with the adhesive layer 141. For example, a paste or the like for forming the adhesive layer 141 may be applied, and then, the connector 243 may be provided. A structure in which the connector 243 is provided in a portion provided with the adhesive layer 141 can be applied to, for example, a structure in which the adhesive layer 141 is provided in the peripheral region, e.g., a display device with a solid sealing structure or a display device with a hollow sealing structure.

The connection portion 204 is provided in a region near an end portion of the substrate 21. The connection portion 204 is electrically connected to the FPC 42 through a connection layer 242. In the structure in FIG. 31, the connection portion 204 is formed by stacking part of the wiring 35 and a conductive layer obtained by processing the same conductive film as the pixel electrode 111.

The above is the description of Cross-sectional Structure Example 3-1.

Cross-Sectional Structure Example 3-2

A cross-sectional structure example of the touch panel module 10 that includes a liquid crystal element having a mode different from that in Cross-sectional Structure Example 3-1 is described below. Note that descriptions of the portions already described are omitted and different portions are described below.

Figure 32:
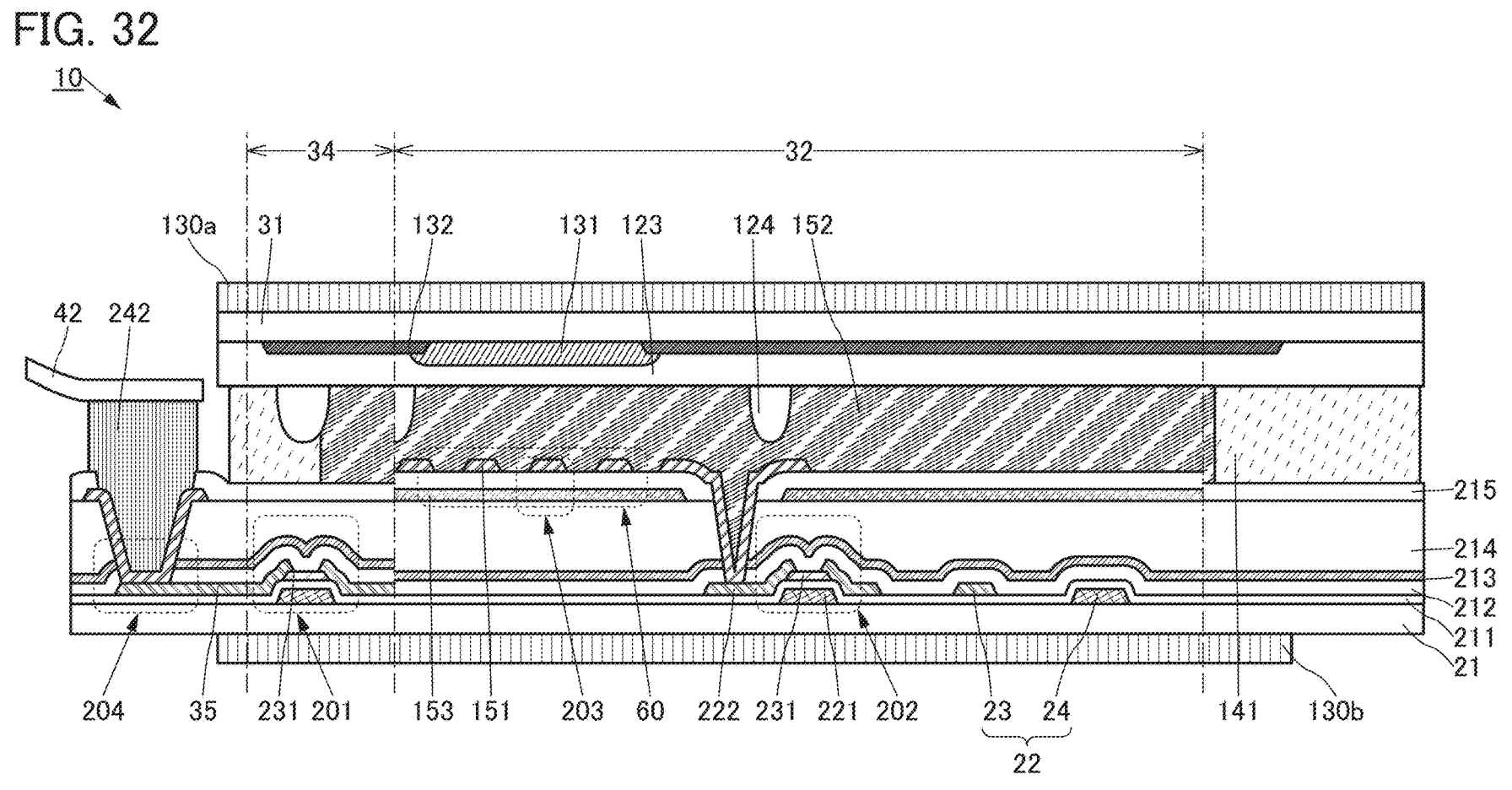

FIG. 32 illustrates an example where the liquid crystal element 60 is a liquid crystal element using an FFS mode. The liquid crystal element 60 includes a pixel electrode 151, a liquid crystal 152, and a common electrode 153.

The common electrode 153 is provided over the insulating layer 214. The insulating layer 215 is provided to cover the common electrode 153, and the pixel electrode 151 is provided over the insulating layer 215. The pixel electrode 151 is electrically connected to one of a source and a drain of the transistor 202 through an opening provided in the insulating layers 212 to 215.

The pixel electrode 151 has a comb-like top surface shape or a top surface shape with a slit. The common electrode 153 is provided to overlap with the pixel electrode 151. There is a portion where the pixel electrode 151 is not provided over the common electrode 153 in a region overlapping with the coloring layer 131 and the like.

Figure 33:
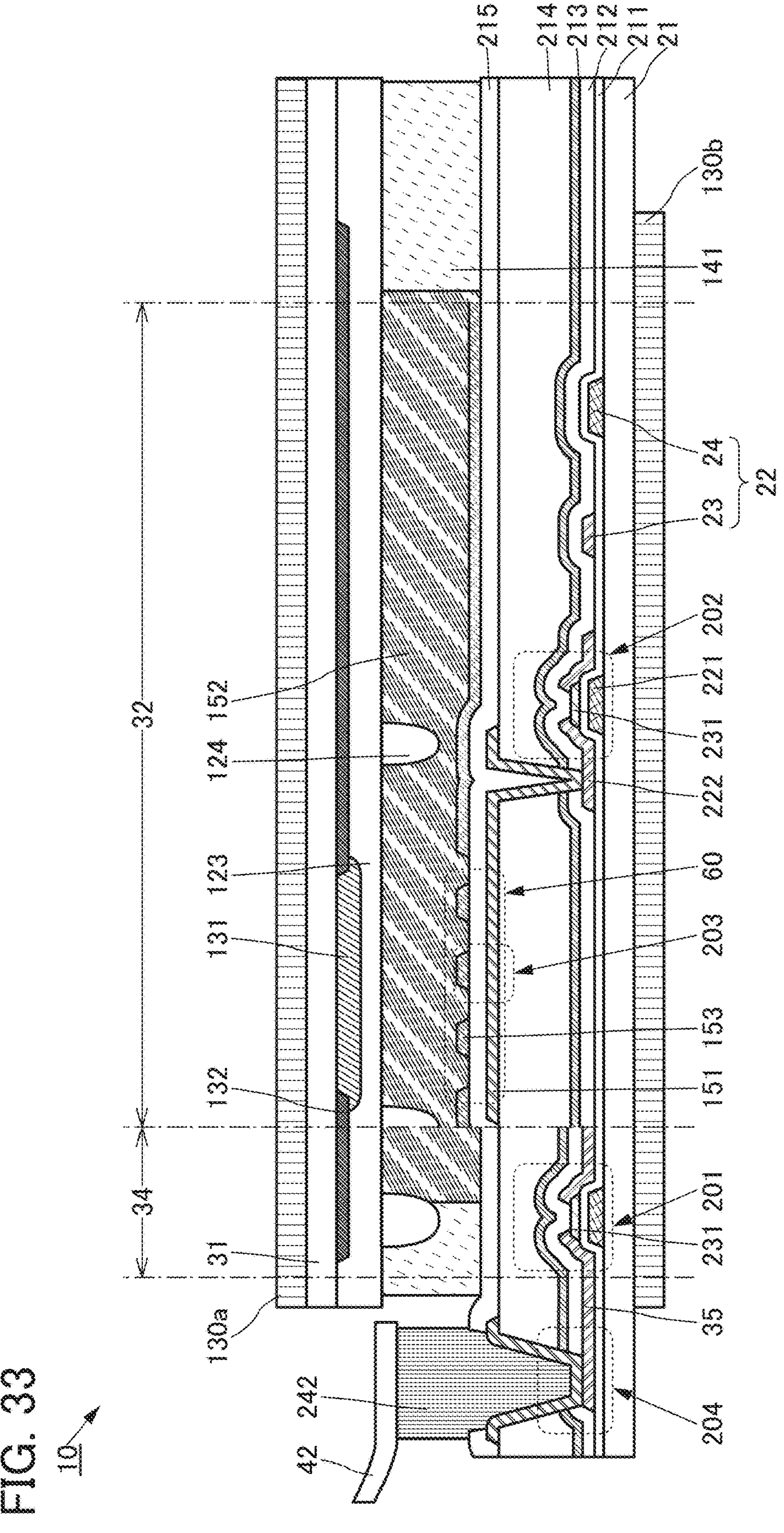
FIG. 33 shows a structure example of a touch panel module of an embodiment.

FIG. 32 illustrates an example where the pixel electrode 151 having a comb-like top surface shape or a top surface shape with a slit is provided above the insulating layer 215 and the common electrode 153 is provided below the insulating layer 215. As illustrated in FIG. 33, the common electrode 153 may be formed above the insulating layer 215 and the pixel electrode 151 may be formed below the insulating layer 215. In that case, the pixel electrode 151 below the insulating layer 215 may be electrically connected to one of a source and a drain of the transistor 202. The common electrode 153 above the insulating layer 215 may have a comb-like top surface shape or a top surface shape with a slit.

In FIG. 32, the pixel electrode 151 and the common electrode 153 are stacked with the insulating layer 215 positioned therebetween to form the capacitor 203. Therefore, another capacitor is not necessarily provided, and thus the aperture ratio of the pixel can be increased.

With the use of a conductive material that transmits visible light for the common electrode 153, a transmissive liquid crystal element can be obtained. When both of the pixel electrode 151 and the common electrode 153 are formed using a conductive material that transmits visible light, the aperture ratio can be further increased, which is preferable.

In the case where the liquid crystal element 60 is a reflective liquid crystal element, one or both of the pixel electrode 151 and the common electrode 153 may be formed using a material that reflects visible light. When both of them are formed using a material that reflects visible light, the aperture ratio can be increased. The common electrode 153 may be formed using a material that reflects visible light and the pixel electrode 151 may be formed using a material that transmits visible light.

Alternatively, the pixel electrode 151 may be formed using a material that reflects visible light and the common electrode 153 may be formed using a material that transmits visible light to form a semi-transmissive liquid crystal element. In that case, a reflective mode in which light reflected by the pixel electrode 151 is used and a transmissive mode in which light from a backlight which passes through a slit in the pixel electrode 151 can be switched.

Alternatively, in the case of employing a horizontal electric field mode, a liquid crystal exhibiting a blue phase for which an alignment film is unnecessary may be used. A blue phase is one of liquid crystal phases, which is generated just before a cholesteric phase changes into an isotropic phase while the temperature of cholesteric liquid crystal is increased. Since the blue phase appears only in a narrow temperature range, a liquid crystal composition in which several weight percent or more of a chiral material is mixed is used for the liquid crystal layer in order to improve the temperature range. The liquid crystal composition which includes liquid crystal exhibiting a blue phase and a chiral material has a short response time and optical isotropy. In addition, the liquid crystal composition which includes liquid crystal exhibiting a blue phase and a chiral material does not need alignment treatment and has a small viewing angle dependence. An alignment film does not need to be provided and rubbing treatment is thus not necessary; accordingly, electrostatic discharge damage caused by the rubbing treatment can be prevented and defects and damage of the liquid crystal display device in the manufacturing process can be reduced.

Cross-Sectional Structure Example 3-3

A cross-sectional structure example of the touch panel module 10 including a liquid crystal element having a mode different from those in Cross-sectional Structure Examples 3-1 and 3-2 is described below. Note that descriptions of the portions already described are omitted and different portions are described below.

Figure 34:
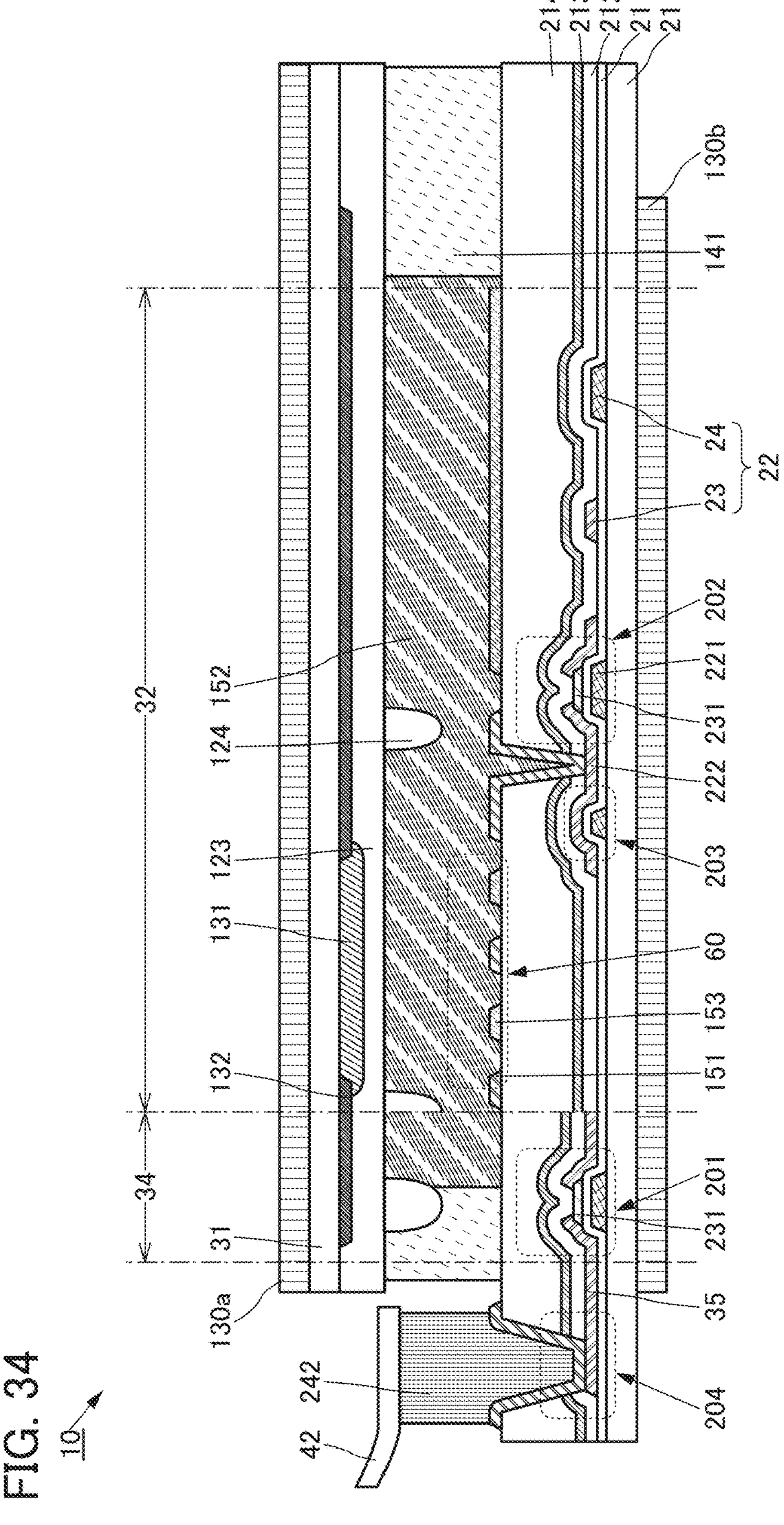
FIG. 34 shows a structure example of a touch panel module of an embodiment.

FIG. 34 illustrates an example where the liquid crystal element 60 is a liquid crystal element using an IPS mode. The liquid crystal element 60 includes the pixel electrode 151, the liquid crystal 152, and the common electrode 153.

The pixel electrode 151 and the common electrode 153 are provided over the insulating layer 214. The pixel electrode 151 and the common electrode 153 each have a comb-like top surface shape and are provided to engage with each other. The pixel electrode 151 and the common electrode 153 are preferably formed by processing the same conductive film. In FIG. 34, the pixel electrode 151 and the common electrode 153 are shown with different hatching patterns for clarity.

The above is the description of Cross-sectional Structure Example 3.

Cross-Sectional Structure Example 4

A specific cross-sectional structure example of a touch panel module of one embodiment of the present invention in which an organic EL element is applied to a display element is described below. Note that portions similar to those described above are not described in some cases.

Cross-Sectional Structure Example 4-1

Figure 35:
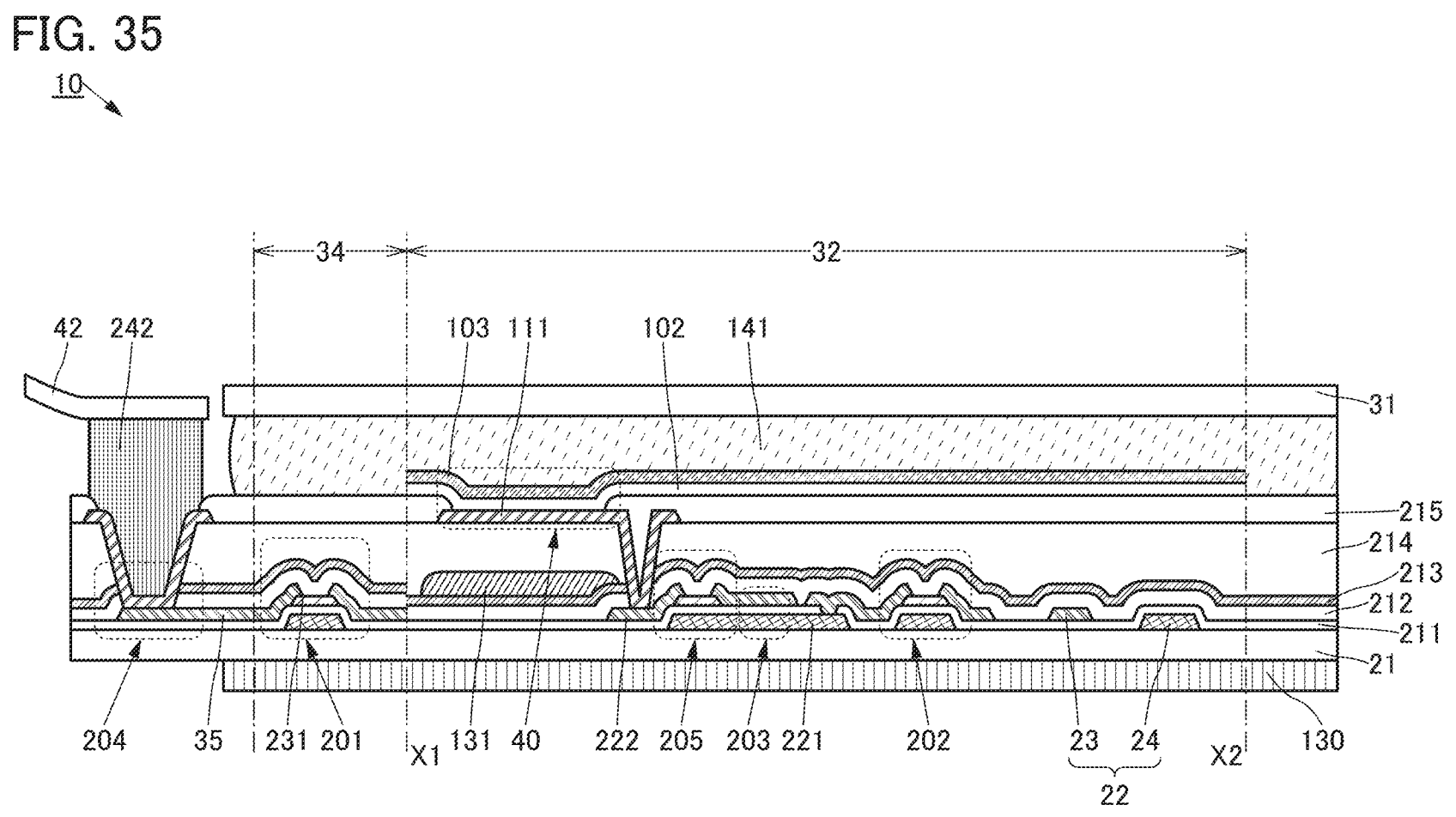

FIG. 35 is a schematic cross-sectional view of the touch panel module 10. FIG. 35 illustrates an example of cross sections of a region including the FPC 42, a region including the circuit 34, a region including the display portion 32, and the like in FIG. 1A. The display portion 32 in FIG. 35 illustrates an example of a cross section taken along line X1-X2 in FIG. 21.

The substrate 21 and the substrate 31 are attached to each other with the adhesive layer 141. Part of the adhesive layer 141 has a function of sealing the light-emitting element 40. The polarizing plate 130 is preferably provided on an outer surface of the substrate 21.

The touch sensor 22 including the wiring 23 and the wiring 24, the light-emitting element 40, the transistor 201, the transistor 202, a transistor 205, the capacitor 203, the connection portion 204, the coloring layer 131, the wiring 35, and the like are provided over the substrate 21. The light-emitting element 40 has a stacked structure of the pixel electrode 111, an EL layer 102, and a common electrode 103. The light-emitting element 40 is a bottom-emission light-emitting element in which light is emitted to the substrate 21 side.

Insulating layers such as the insulating layer 211, the insulating layer 212, the insulating layer 213, the insulating layer 214, and the insulating layer 215 are provided over the substrate 21. A portion of the insulating layer 211 functions as a gate insulating layer of each transistor, and another portion thereof functions as a dielectric of the capacitor 203. The insulating layer 212, the insulating layer 213, and the insulating layer 214 are provided to cover each transistor, the capacitor 203, and the like. The insulating layer 214 functions as a planarization layer. Note that an example where the three insulating layers, the insulating layers 212, 213, and 214, are provided to cover the transistors and the like is described here; however, one embodiment of the present invention is not limited to this example, and four or more insulating layers, a single insulating layer, or two insulating layers may be provided. The insulating layer 214 functioning as a planarization layer is not necessarily provided when not needed. The insulating layer 215 is provided to cover an end portion of the pixel electrode 111, a contact portion which electrically connects the pixel electrode 111 and the transistor 205, and the like. The insulating layer 215 functions as a planarization layer.

The transistor 201, the transistor 202, and the transistor 205 each include the conductive layer 221 part of which functions as a gate, the conductive layer 222 part of which functions as a source electrode and a drain electrode, and the semiconductor layer 231. Here, a plurality of layers obtained by processing the same conductive film are shown with the same hatching pattern.

In the example in FIG. 35, the capacitor 203 includes part of the conductive layer 221 functioning as a gate electrode of the transistor 205, part of the insulating layer 211, and part of the conductive layer 222 functioning as a source electrode and a drain electrode of the transistor 205.

In the transistor 202, one of the pair of conductive layers 222 which is not electrically connected to the capacitor 203 functions as part of a signal line. The conductive layer 221 functioning as a gate electrode of the transistor 202 also functions as part of a scan line.

FIG. 35 illustrates an example where the wiring 23 is formed by processing the same conductive film as the conductive layer 222 and the wiring 24 is formed by processing the same conductive film as the conductive layer 221.

FIG. 35 illustrates a cross section of one sub-pixel as an example of the display portion 32. The sub-pixel includes, for example, the transistor 202, the capacitor 203, the transistor 205, the light-emitting element 40, and the coloring layer 131. For example, the coloring layers 131 are selectively formed so that a sub-pixel exhibiting a red color, a sub-pixel exhibiting a green color, and a sub-pixel exhibiting a blue color are arranged; thus, full-color display can be achieved. Here, the pixel circuit (sub-pixel circuit) includes the transistor 202, the capacitor 203, the transistor 205, the pixel electrode 111, a wiring, and the like.

Although the transistors 201, 202, and 205 each include one gate electrode in FIG. 35, the semiconductor layer 231 where a channel is formed may be provided between two gate electrodes.

The pixel electrode 111 is provided over the insulating layer 214. The pixel electrode 111 is electrically connected to one of a source and a drain of the transistor 205 through an opening formed in the insulating layer 214, the insulating layer 213, the insulating layer 212, and the like. The other of the source and the drain of the transistor 205 is electrically connected to the capacitor 203.

The coloring layer 131 is provided over the insulating layer 213. The coloring layer 131 is provided to overlap with the light-emitting element 40. The insulating layer 214 functioning as a planarization layer is provided to cover the coloring layer 131. The coloring layer 131 is preferably covered with the insulating layer 214 because a surface of the pixel electrode 111 can be almost flat.

In the light-emitting element 40, the pixel electrode 111 has a function of transmitting visible light and the common electrode 103 has a function of reflecting visible light. With such a structure, a bottom-emission light-emitting element in which light is emitted to the substrate 21 side which supports the light-emitting element 40 can be provided. Note that both of the pixel electrode 111 and the common electrode 103 have a function of transmitting visible light to obtain a dual-emission light-emitting element.

In FIG. 35, a light-emitting element exhibiting a white color can be preferably used as the light-emitting element 40. Thus, the light-emitting elements 40 do not need to be separately fabricated in respective sub-pixels; accordingly, an extremely high definition touch panel can be provided. In that case, when light from the light-emitting element 40 passes through the coloring layer 131, light out of a specific wavelength range is absorbed by the coloring layer 131. Consequently, red light is extracted, for example.

As the polarizing plate 130, a circularly polarizing plate is preferably used. In the case where the substrate 21 side functions as the display surface side as illustrated in FIG. 35, particularly, the wiring 23 and the wiring 24 included in the touch sensor reflect external light and the reflected light is visually recognized in some cases. In this case, reflection can be suppressed with a circularly polarizing plate used as the polarizing plate 130.

Figure 36:
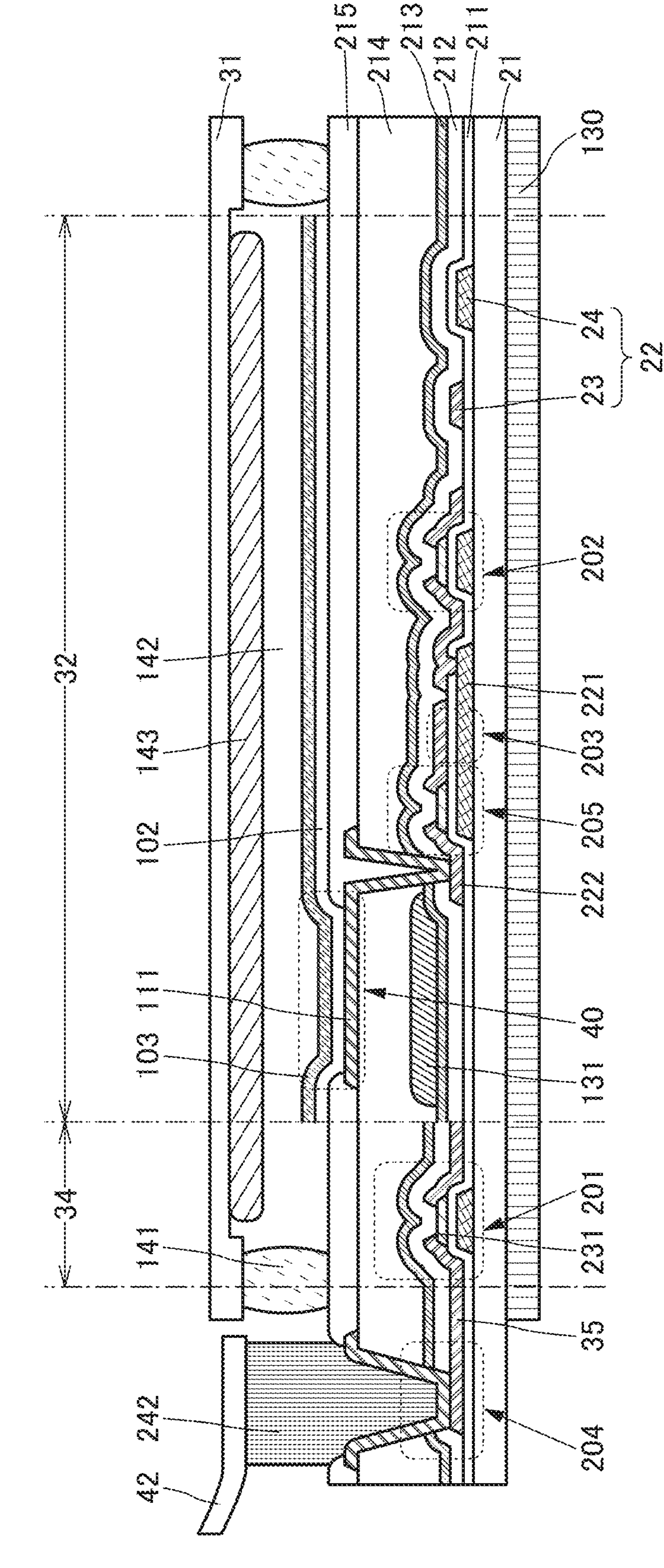
FIG. 36 shows a structure example of a touch panel module of an embodiment.

FIG. 36 illustrates a cross-sectional structure example of the touch panel module 10 with a hollow sealing structure.

In the example in FIG. 36, the adhesive layer 141 does not cover the light-emitting element 40 and is provided in a peripheral portion of the substrate 31. There is a space 142 between the common electrode 103 and the substrate 31.

The space 142 may be filled with air, preferably an inert gas such as a rare gas or a nitrogen gas. When the space 142 in a steady state is under reduced pressure relative to the atmospheric pressure, the following phenomenon can be prevented: the space 142 expands depending on the usage environment (e.g., pressure or temperature) and thus the substrate 31 or the substrate 21 expands. Meanwhile, when the space 142 is under positive pressure relative to the atmospheric pressure, impurities such as moisture can be prevented from being diffused from the substrate 31, the substrate 21, the adhesive layer 141, or a gap therebetween into the space 142.

In the example in FIG. 36, a dry agent 143 is provided between the substrate 31 and the common electrode 103. In that case, when the thickness of at least a portion of the substrate 31 which overlaps with the display portion 32 is smaller than that of a peripheral portion, the dry agent 143 can be provided without an increase in thickness of the touch panel module 10.

As the drying agent 143, for example, a substance which adsorbs moisture by chemical adsorption, such as an oxide of an alkaline earth metal (e.g., a calcium oxide or a barium oxide), can be used. Alternatively, a substance that adsorbs moisture by physical adsorption, such as zeolite or silica gel, may be used.

The above is the description of Cross-sectional Structure Example 4-1.

Cross-Sectional Structure Example 4-2

Figure 37:
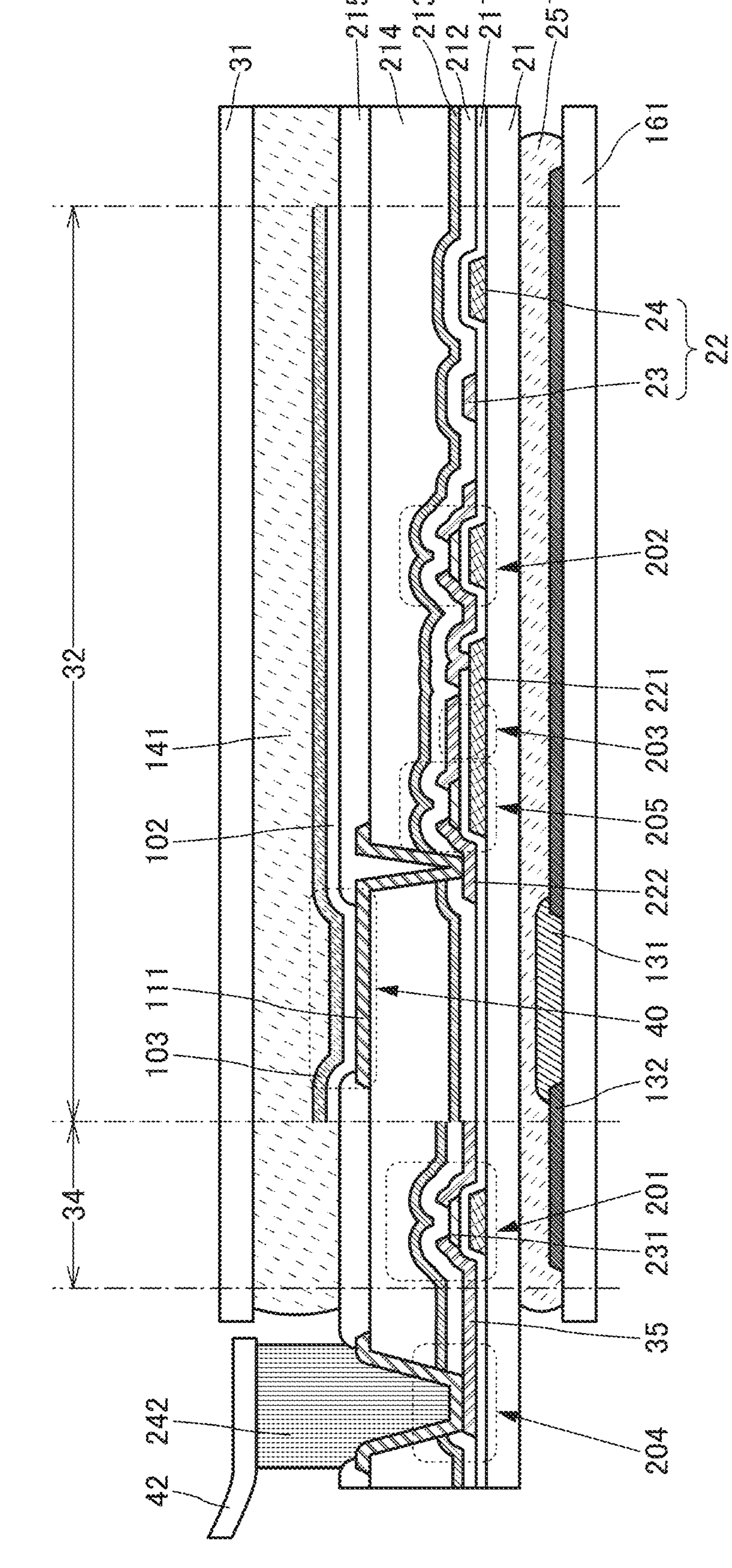
FIG. 37 shows a structure example of a touch panel module of an embodiment.

FIG. 37 illustrates an example where the coloring layer 131 is formed over a different substrate.

In FIG. 37, the coloring layer 131 and the light-blocking layer 132 are formed over a substrate 161. The substrate 161 is attached to the substrate 21 with an adhesive layer 251.

The coloring layer 131 is provided to overlap with at least the light-emitting element 40. The light-blocking layer 132 is provided to overlap with the wiring 23, the wiring 24, the transistor 202, the transistor 205, the capacitor 203, the transistor 201, and the like.

The light-blocking layer 132 has a function of blocking visible light.

Such a structure can suppress reflection of external light by the wiring 23, the wiring 24, or the like and improve contrast even when the substrate 21 side functions as the display surface side.

In that case, the substrate 161 can also be used as a protective substrate for protecting the substrate 21 and the like. In that case, a protective layer (such as a ceramic coat) is preferably provided over the substrate. The protective layer can be formed using an inorganic insulating material such as silicon oxide, aluminum oxide, yttrium oxide, or yttria-stabilized zirconia (YSZ). Alternatively, tempered glass may be used for the substrate. The tempered glass which can be used here is one that has been subjected to physical or chemical treatment by an ion exchange method, a thermal tempering method, or the like and has a surface to which compressive stress has been added.

Figure 38:
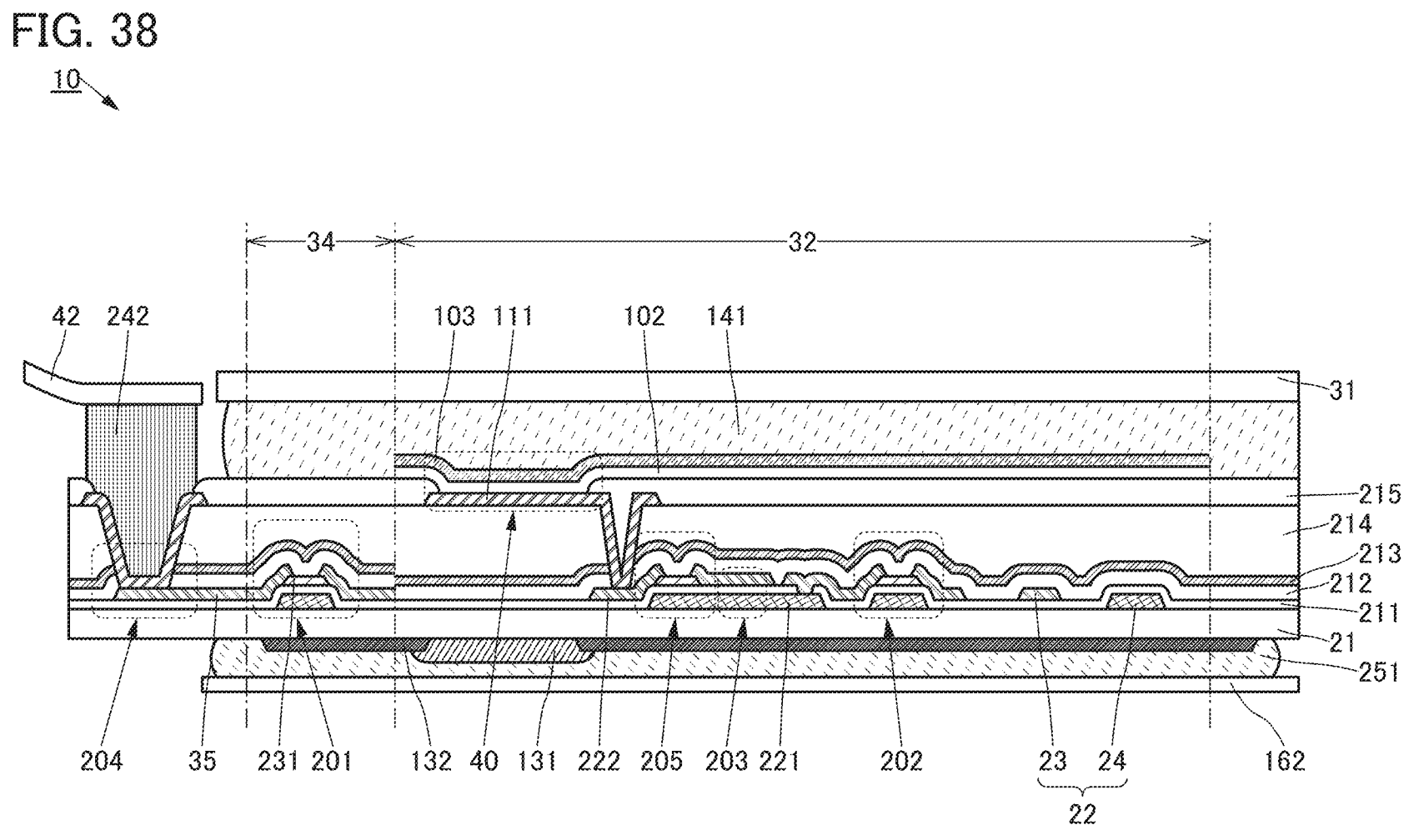

FIG. 38 illustrates an example where the coloring layer 131 and the light-blocking layer 132 are formed on a surface of the substrate 21 opposite to a surface over which the wiring 23 and the like are formed.

In this case, a substrate 162 may be provided with the adhesive layer 251 to protect the coloring layer 131 and the light-blocking layer 132.

Cross-Sectional Structure Example 4-3

Figure 39:
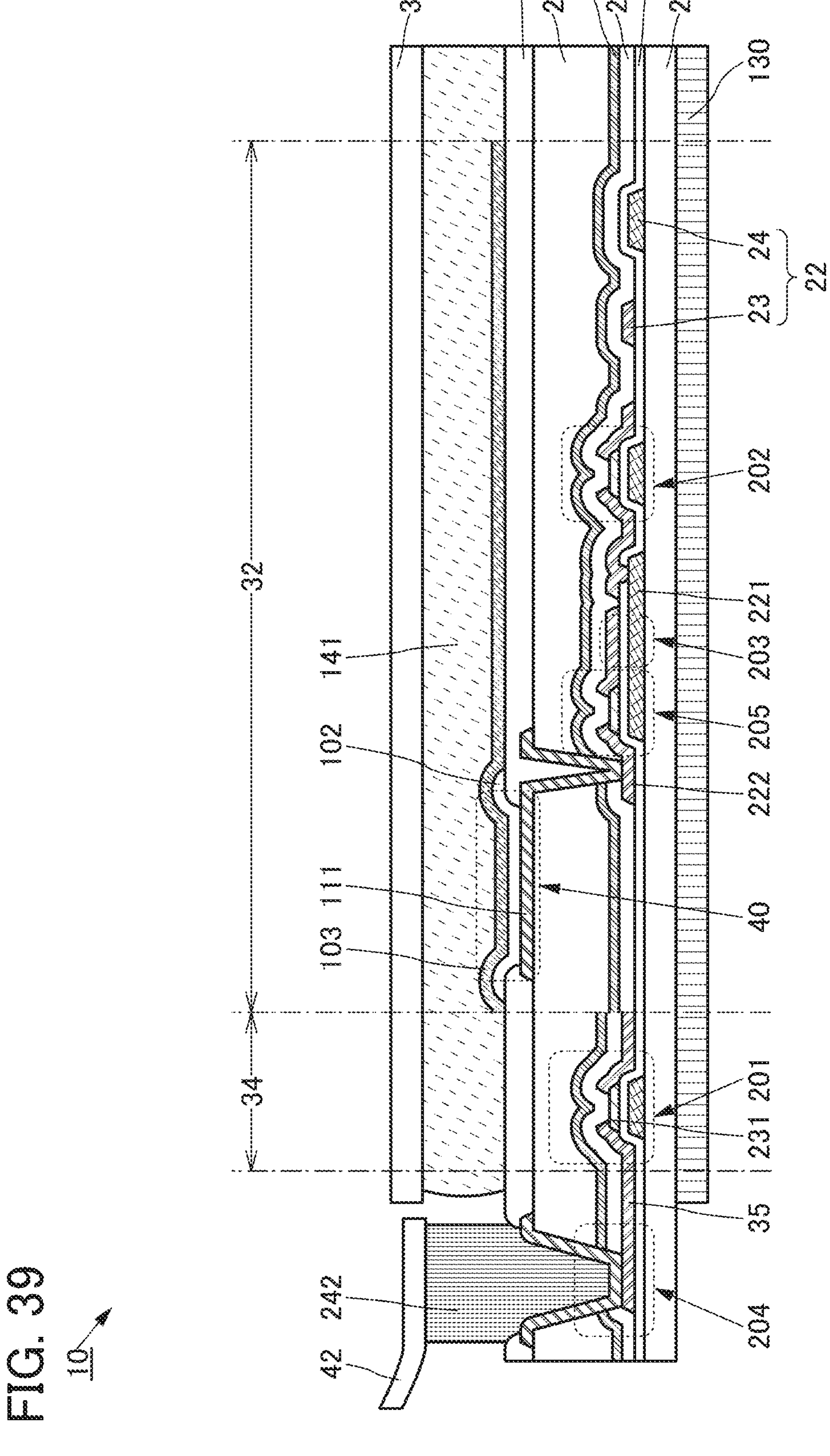
FIG. 39 shows a structure example of a touch panel module of an embodiment.

FIG. 39 illustrates an example of a cross-sectional structure in which the light-emitting elements 40 are fabricated in respective sub-pixels.

Whereas the EL layers 102 in FIG. 35 and the like are uniformly provided, the EL layer 102 in FIG. 39 has an island-shaped top surface.

Since the EL layers 102 can be formed in respective sub-pixels in the example in FIG. 39, the light-emitting element 40 in one sub-pixel can exhibit a color different from that exhibited by a light-emitting element in an adjacent sub-pixel. Consequently, full-color display can be performed without the coloring layer 131.

Cross-Sectional Structure Example 4-4

Figure 40:
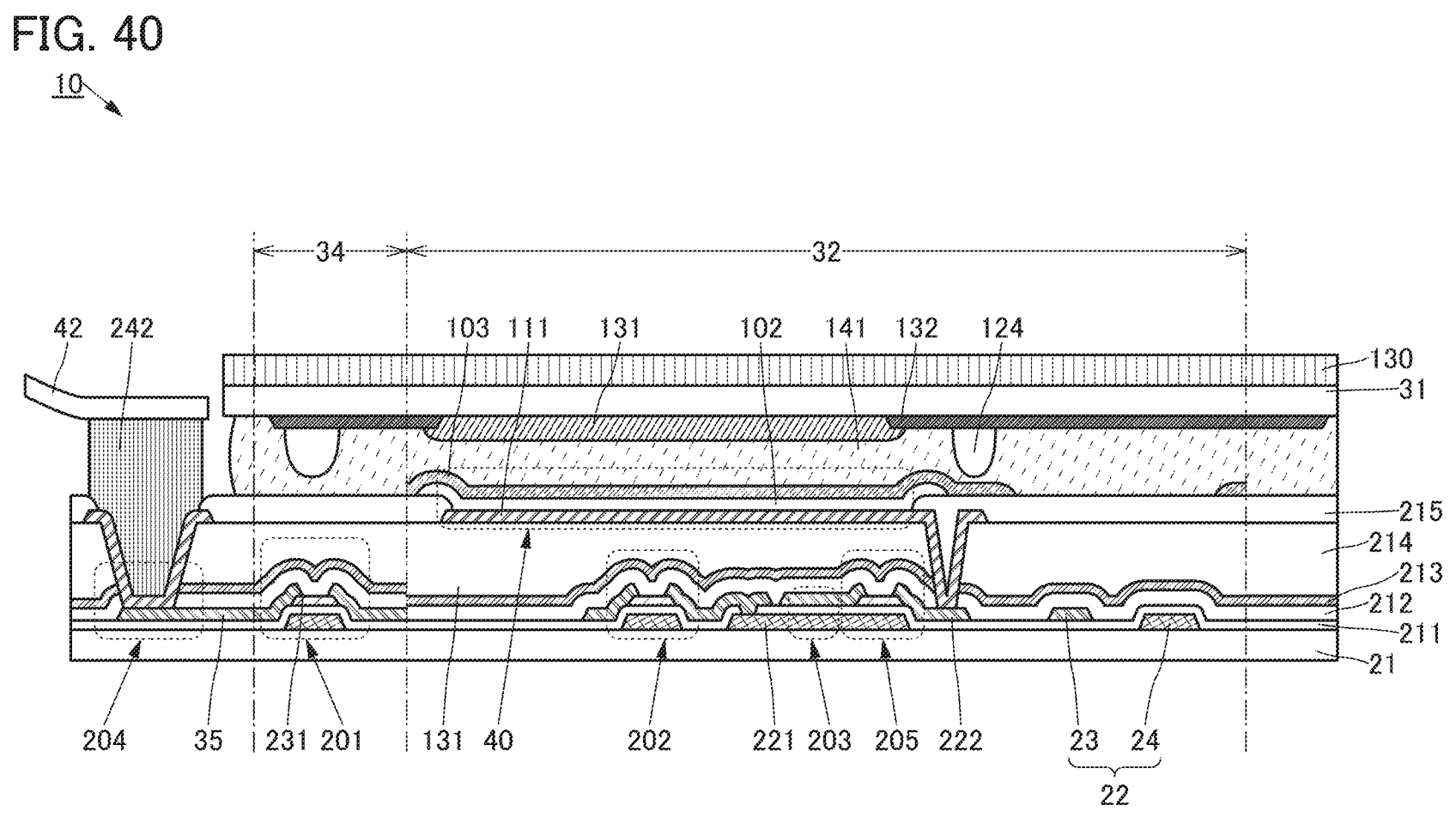

FIG. 40 illustrates an example of a top-emission light-emitting element.

The light-emitting element 40 in FIG. 40 emits light to the substrate 31 side. Therefore, the substrate 31 side functions both as the display surface side and as the touch surface side. The polarizing plate 130 is positioned on an outer surface of the substrate 31.

The pixel electrode 111 of the light-emitting element 40 has a function of reflecting visible light. The common electrode 103 has a function of blocking visible light. The substrate 31 is provided with the coloring layer 131, the light-blocking layer 132, and the like.

In the example in FIG. 40, the spacer 124 is provided on the substrate 31 side. The spacer 124 has a function of adjusting the distance between the substrate 21 and the substrate 31. There is a gap between the spacer 124 and the common electrode 103 or the insulating layer 215 in FIG. 40; however, the spacer 124 may be in contact with the common electrode 103 or the insulating layer 215. Although the spacer 124 is provided on the substrate 31 side in the structure described here, the spacer 124 may be provided on the substrate 21 side (e.g., over the insulating layer 215). Alternatively, a particulate spacer may be used instead of the spacer 124. Although a material such as silica can be used for the particulate spacer, an elastic material such as an organic resin or rubber is preferably used. In some cases, the particulate spacer may be vertically crushed.

In the case where the light-emitting element 40 has a top-emission structure as illustrated in FIG. 40, the pixel electrode 111 can be provided to cover the transistor 202, the transistor 205, the capacitor 203, and the like. Thus, the aperture ratio of the pixel can be preferably increased.

In the example in FIG. 40, the common electrode 103 includes an opening. The opening is provided to overlap with the wiring 23 and the wiring 24. In this manner, even in the case where the substrate 31 side functions as the touch surface, a region where a conductive layer which could be supplied with a predetermined potential is not positioned is preferably provided between the touch surface and the wiring 23 or the wiring 24. Thus, a change in capacitance between the wiring 23 and the wiring 24 can be increased by operation such as touch because an electric field from the wiring 23 or the wiring 24 is not blocked by the conductive layer, and accordingly, detection sensitivity can be increased.

In that case, a region where the EL layer 102 is not provided is preferably provided in a position overlapping with the wiring 23 and the wiring 24. In addition, when the EL layer 102 is provided so that an end portion of the EL layer 102 is also covered with the common electrode 103, the EL layer 102 is not exposed, so that high reliability can be achieved.

Furthermore, in the case where the light-blocking layer 132 including a plurality of openings is uniformly provided across the display portion 32, the light-blocking layer 132 preferably has an insulating property. When the light-blocking layer 132 overlapping with the wiring 23 or the wiring 24 has an insulating property, an electric field from the wiring 23 or the wiring 24 is prevented from being blocked by the light-blocking layer 132, so that detection sensitivity can be increased.

Modification Example

Figure 41:
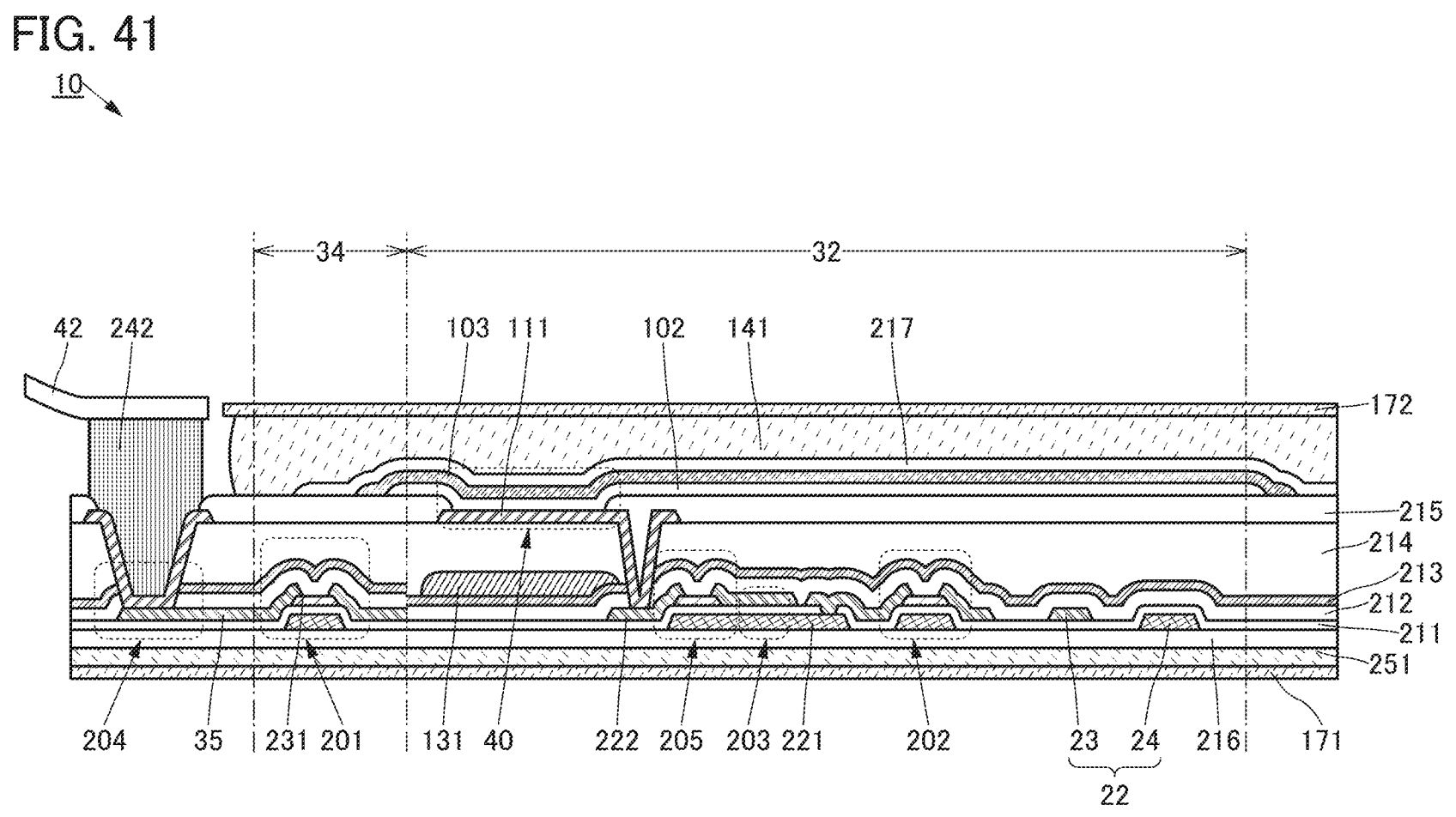

FIG. 41 illustrates a cross-sectional structure example of the touch panel module 10 in which a substrate 171 and a substrate 172 which have flexibility are used as a pair of substrates. Part of a display surface of the touch panel module 10 in FIG. 41 is bendable.

In FIG. 41, the substrate 171, the adhesive layer 251, and an insulating layer 216 are provided instead of the substrate 21. Furthermore, the substrate 172 is provided instead of the substrate 31.

The conductive layer 221 and the insulating layer 211 are provided on one surface of the insulating layer 216. The substrate 171 is attached to the opposite surface of the insulating layer 216 with the adhesive layer 251.

The substrate 171 and the substrate 172 can each be formed using a flexible material. Note that the substrate 171 and the substrate 172 may each have a function of a protective layer for protecting a surface of the touch panel module 10. The substrate 171 and the substrate 172 do not necessarily have a function of supporting the transistors, the light-emitting element, a wiring, or the like.

The insulating layer 216 preferably has a function of suppressing diffusion of impurities such as water or hydrogen.

In the example in FIG. 41, the insulating layer 217 is provided to cover the common electrode 103. The insulating layer 217 has a function of suppressing diffusion of impurities such as water into the common electrode 103, the EL layer 102, or the like.

It is particularly preferable that the common electrode 103 be provided to cover an end portion of the EL layer 102 and the insulating layer 217 be provided to cover an end portion of the common electrode 103 as illustrated in FIG. 41. Thus, diffusion of impurities into the common electrode 103 or the EL layer 102 can be more effectively suppressed.

The touch panel module 10 in FIG. 41 has a structure in which each transistor and the light-emitting element 40 are sandwiched between the insulating layer 216 and the insulating layer 217. Thus, even in the case where the substrate 171, the substrate 172, the adhesive layer 251, the adhesive layer 141, or the like is formed using a material through which impurities such as water or hydrogen are easily diffused, the insulating layer 216 and the insulating layer 217 positioned further inward (closer to each transistor or the light-emitting element 40) than these components can suppress impurity diffusion, so that reliability can be increased.

Figure 42:
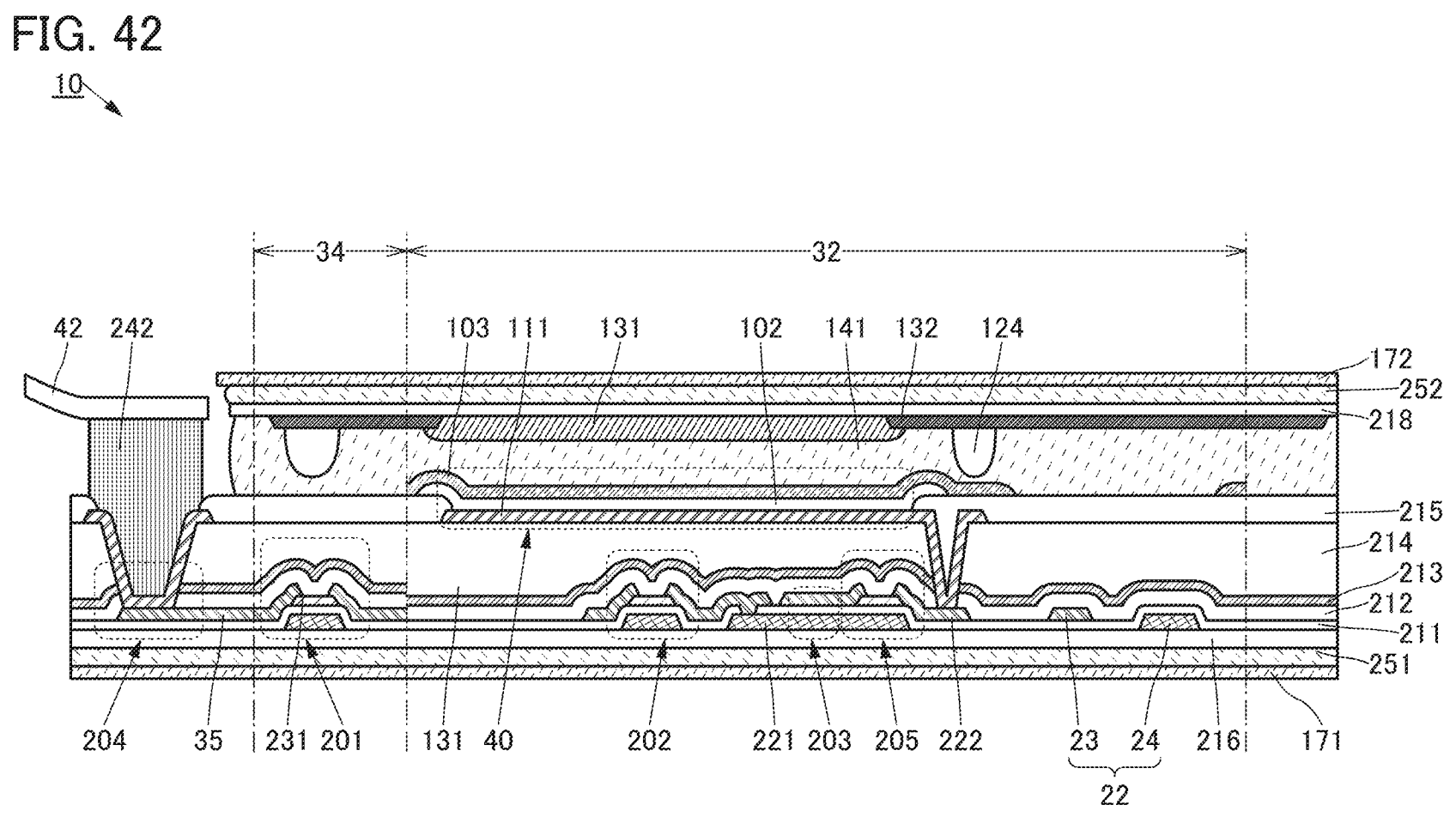

FIG. 42 illustrates an example where a top-emission light-emitting element is used as the light-emitting element 40. In FIG. 42, an insulating layer 218, an adhesive layer 252, and the substrate 172 are provided instead of the substrate 31 in FIG. 40. The substrate 171, the adhesive layer 251, and the insulating layer 216 are provided instead of the substrate 21.

The coloring layer 131, the light-blocking layer 132, the spacer 124, and the like are provided on one surface of the insulating layer 218. The substrate 172 is attached to the opposite surface of the insulating layer 218 with the adhesive layer 252.

A material through which impurities such as water do not easily diffuse is preferably used for the insulating layer 218 as in the case of the insulating layer 216.

By providing the light-emitting element 40, each transistor, and the like between the insulating layers 216 and 217 functioning as barrier layers in such a manner, the touch panel module 10 can have high reliability.

The above is the description of Modification Example.

Example of Manufacturing Method

Here, a method for manufacturing a flexible touch panel is described.

For convenience, a structure including a pixel and a circuit, a structure including an optical member such as a color filter, a structure including an electrode or a wiring of a touch sensor, or the like is referred to as an element layer. An element layer includes a display element, for example, and may include a wiring electrically connected to a display element or an element such as a transistor used in a pixel or a circuit in addition to the display element.

Here, a support body (e.g., the substrate 171 or the substrate 172 in FIG. 41 and FIG. 42) with an insulating surface where an element layer is formed is referred to as a substrate.

As a method for forming an element layer over a flexible substrate provided with an insulating surface, there are a method in which an element layer is formed directly over a substrate, and a method in which an element layer is formed over a supporting base material that is different from the substrate and then the element layer is separated from the supporting base material and transferred to the substrate.

In the case where a material of the substrate can withstand heating temperature in a process for forming the element layer, it is preferable that the element layer be formed directly over the substrate, in which case a manufacturing process can be simplified. At this time, the element layer is preferably formed in a state where the substrate is fixed to a supporting base material, in which case transfer thereof in an apparatus and between apparatuses can be easy.

In the case of employing the method in which the element layer is formed over the supporting base material and then transferred to the substrate, first, a separation layer and an insulating layer are stacked over the supporting base material, and then the element layer is formed over the insulating layer. Next, the element layer is separated from the supporting base material and then transferred to the substrate. At this time, selected is a material with which separation at an interface between the supporting base material and the separation layer, at an interface between the separation layer and the insulating layer, or in the separation layer occurs.

For example, it is preferable that a stacked layer of a layer including a high-melting-point metal material, such as tungsten, and a layer including an oxide of the metal material be used as the separation layer, and a stacked layer of a plurality of layers, such as a silicon nitride layer, a silicon oxynitride layer, and a silicon nitride oxide layer be used as the insulating layer over the separation layer. The use of the high-melting-point metal material is preferable because the degree of freedom of the process for forming the element layer can be increased.

The separation may be performed by application of mechanical power, by etching of the separation layer, by dripping of a liquid into part of the separation interface to penetrate the entire separation interface, or the like. Alternatively, separation may be performed by heating the separation interface by utilizing a difference in thermal expansion coefficient.

The separation layer is not necessarily provided in the case where separation can occur at an interface between the supporting base material and the insulating layer. For example, glass and an organic resin such as polyimide can be used as the supporting base material and the insulating layer, respectively. In that case, a separation trigger may be formed by locally heating part of the organic resin with laser light or the like, or by physically cutting part of or making a hole through the organic resin with a sharp tool, for example, so that separation may be performed at an interface between the glass and the insulating layer. Alternatively, a metal layer may be provided between the supporting base material and the insulating layer formed of an organic resin, and separation may be performed at the interface between the metal layer and the insulating layer formed of an organic resin by heating the metal layer by feeding current to the metal layer. A layer of a light-absorbing material (e.g., a metal, a semiconductor, or an insulator) may be provided between the supporting base material and the insulating layer formed of an organic resin and locally heated with laser light or the like to form a separation trigger. In these methods, the insulating layer formed of an organic resin can be used as a substrate.

In the structure shown in FIG. 41, for example, a first separation layer and the insulating layer 216 are formed in this order over a first supporting base material, and then components in a layer over the first separation layer and the insulating layer 216 are formed. Next, the first supporting base material and the substrate 172 are attached to each other with the adhesive layer 141. After that, separation at an interface between the first separation layer and the insulating layer 216 is conducted so that the first supporting base material and the first separation layer are removed, and then the substrate 171 is attached to the insulating layer 216 with the adhesive layer 251.

In the structure shown in FIG. 42, for example, a first separation layer and the insulating layer 216 are formed in this order over a first supporting base material, and then components in a layer over the first separation layer and the insulating layer 216 are formed. Separately, a second separation layer and the insulating layer 218 are formed in this order over a second supporting base material, and then components in a layer over the second separation layer and the insulating layer 218 are formed. Next, the first supporting base material and the second supporting base material are attached to each other with the adhesive layer 141. After that, separation at an interface between the second separation layer and the insulating layer 218 is conducted so that the second supporting base material and the second separation layer are removed, and then the substrate 172 is attached to the insulating layer 218 with the adhesive layer 252. Furthermore, separation at an interface between the first separation layer and the insulating layer 216 is conducted so that the first supporting base material and the first separation layer are removed, and then the substrate 171 is attached to the insulating layer 216 with the adhesive layer 251. Note that either side may be subjected to separation and attachment first.

The above is the description of a manufacturing method of a flexible touch panel.

[Components]

The above components are described below.

[Substrate]

A substrate having a flat surface can be used as the substrate included in the touch panel. The substrate on the side from which light from the display element is extracted is formed using a material that transmits the light. For example, a material such as glass, quartz, ceramics, sapphire, or an organic resin can be used.

The weight and thickness of the touch panel can be decreased by using a thin substrate. A flexible touch panel can be obtained by using a substrate that is thin enough to have flexibility.

As the glass, for example, non-alkali glass, barium borosilicate glass, aluminoborosilicate glass, or the like can be used.

Since the substrate through which light emission is not extracted does not need to have a light-transmitting property, a metal substrate or the like can be used in addition to the above-mentioned substrates. A metal material and an alloy material, which have high thermal conductivity, are preferable because they can easily conduct heat to the whole substrate and accordingly can prevent a local temperature rise in the touch panel. To obtain flexibility and bendability, the thickness of a metal substrate is preferably greater than or equal to 10 μm and less than or equal to 200 μm, more preferably greater than or equal to 20 μm and less than or equal to 50 μm.

Although there is no particular limitation on a material of a metal substrate, it is favorable to use, for example, a metal such as aluminum, copper, and nickel, an aluminum alloy, or an alloy such as stainless steel.

It is preferable to use a substrate subjected to insulation treatment, e.g., a metal substrate whose surface is oxidized or provided with an insulating film. An insulating film may be formed by, for example, a coating method such as a spin-coating method and a dipping method, an electrodeposition method, an evaporation method, or a sputtering method. An oxide film may be formed over the substrate surface by a known method such as an anodic oxidation method, exposing to or heating in an oxygen atmosphere, or the like.

Examples of a material that has flexibility and transmits visible light include flexible glass, polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, a polyvinyl chloride resin, and a polytetrafluoroethylene (PTFE). It is particularly preferable to use a material with a low thermal expansion coefficient, for example, a material with a thermal expansion coefficient lower than or equal to $30\times10^{-6}$/K, such as a polyamide imide resin, a polyimide resin, or PET. A substrate in which a fibrous body is impregnated with a resin (also referred to as prepreg) or a substrate whose thermal expansion coefficient is reduced by mixing an inorganic filler with an organic resin can also be used. A substrate using such a material is lightweight, and thus a touch panel using this substrate can also be lightweight.

In the case where a fibrous body is included in the above material, a high-strength fiber of an organic compound or an inorganic compound is used as the fibrous body. The high-strength fiber is specifically a fiber with a high tensile elastic modulus or a fiber with a high Young's modulus. Typical examples thereof include a polyvinyl alcohol based fiber, a polyester based fiber, a polyamide based fiber, a polyethylene based fiber, an aramid based fiber, a polyparaphenylene benzobisoxazole fiber, a glass fiber, and a carbon fiber. As the glass fiber, glass fiber using E glass, S glass, D glass, Q glass, or the like can be used. These fibers may be used in a state of a woven fabric or a nonwoven fabric, and a structure body in which this fibrous body is impregnated with a resin and the resin is cured may be used as the flexible substrate. The structure body including the fibrous body and the resin is preferably used as the flexible substrate, in which case the reliability against bending or breaking due to local pressure can be increased.

A hard coat layer (e.g., a silicon nitride layer) by which a touch panel surface is protected from damage, a layer (e.g., an aramid resin layer) that can disperse pressure, or the like may be stacked over the flexible substrate. Furthermore, to suppress a decrease in lifetime of the display element due to moisture and the like, an insulating film with low water permeability may be stacked over the flexible substrate. For example, an inorganic insulating material such as silicon nitride, silicon oxynitride, aluminum oxide, or aluminum nitride can be used.

The substrate may be formed by stacking a plurality of layers. When a glass layer is used, a barrier property against water and oxygen can be improved and thus a highly reliable touch panel can be provided. Alternatively, glass, metal, or the like that is thin enough to have flexibility can be used as the substrate. Alternatively, a composite material where glass and a resin material are attached to each other may be used.

A substrate in which a glass layer, an adhesive layer, and an organic resin layer are stacked from the side closer to the display element can be used, for example. The thickness of the glass layer is greater than or equal to 20 μm and less than or equal to 200 μm, preferably greater than or equal to 25 μm and less than or equal to 100 μm. With such a thickness, the glass layer can have both a high barrier property against water and oxygen and high flexibility. The thickness of the organic resin layer is greater than or equal to 10 μm and less than or equal to 200 μm, preferably greater than or equal to 20 μm and less than or equal to 50 μm. Providing such an organic resin layer, occurrence of a crack or a break in the glass layer can be suppressed and mechanical strength can be improved. With the substrate that includes such a composite material of a glass material and an organic resin, a highly reliable flexible touch panel can be provided.

[Transistor]

The transistor includes a conductive layer functioning as the gate electrode, the semiconductor layer, a conductive layer functioning as the source electrode, a conductive layer functioning as the drain electrode, and an insulating layer functioning as the gate insulating layer. In the above, a bottom-gate transistor is used.

Note that there is no particular limitation on the structure of the transistor included in the touch panel of one embodiment of the present invention. For example, a planar transistor, a staggered transistor, or an inverted staggered transistor may be used. A top-gate transistor or a bottom-gate transistor may be used. Gate electrodes may be provided above and below a channel.

There is no particular limitation on the crystallinity of a semiconductor material used for the transistors, and an amorphous semiconductor or a semiconductor having crystallinity (a microcrystalline semiconductor, a polycrystalline semiconductor, a single-crystal semiconductor, or a semiconductor partly including crystal regions) may be used. It is preferable that a semiconductor having crystallinity be used, in which case deterioration of the transistor characteristics can be suppressed.

As a semiconductor material for the semiconductor layer of the transistor, an element of Group 14 (e.g., silicon or germanium), a compound semiconductor, or an oxide semiconductor can be used, for example. Typically, a semiconductor containing silicon, a semiconductor containing gallium arsenide, an oxide semiconductor containing indium, or the like can be used.

In particular, an oxide semiconductor having a wider band gap than silicon is preferably used. A semiconductor material having a wider band gap and a lower carrier density than silicon is preferably used because off-state leakage current of the transistor can be reduced.

As the semiconductor layer, it is particularly preferable to use an oxide semiconductor film (also referred to as CAAC-OS (a c-axis aligned crystalline oxide semiconductor or a c-axis aligned and a-b-plane anchored crystalline oxide semiconductor)) including a plurality of crystal parts whose c-axes are aligned substantially perpendicular to a surface on which the semiconductor layer is formed or the top surface of the semiconductor layer and in which a grain boundary is not observed between adjacent crystal parts.

There is no grain boundary in such an oxide semiconductor; therefore, generation of a crack in an oxide semiconductor film which is caused by stress when a display panel is bent is prevented. Therefore, such an oxide semiconductor can be preferably used for a flexible touch panel which is used in a bent state, or the like.

Moreover, the use of such an oxide semiconductor with crystallinity for the semiconductor layer makes it possible to provide a highly reliable transistor in which a change in the electrical characteristics is suppressed.

A transistor with an oxide semiconductor whose band gap is larger than the band gap of silicon can hold charges stored in a capacitor that is series-connected to the transistor for a long time, owing to the low off-state current of the transistor. When such a transistor is used for a pixel, operation of a driver circuit can be stopped while a gray scale of each pixel is maintained. As a result, a display device with extremely low power consumption can be obtained.

The semiconductor layer preferably includes, for example, a film represented by an In-M-Zn oxide that contains at least indium, zinc, and M (a metal such as aluminum, titanium, gallium, germanium, yttrium, zirconium, lanthanum, cerium, tin, neodymium, or hafnium). In order to reduce variations in electrical characteristics of the transistor including the oxide semiconductor, the oxide semiconductor preferably contains a stabilizer in addition to indium, zinc, and M.

Examples of the stabilizer, including metals that can be used as M, are gallium, tin, hafnium, aluminum, and zirconium. As another stabilizer, lanthanoid such as lanthanum, cerium, praseodymium, neodymium, samarium, europium, gadolinium, terbium, dysprosium, holmium, erbium, thulium, ytterbium, or lutetium can be given.

As an oxide semiconductor included in the semiconductor layer, any of the following can be used, for example: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

Note that here, for example, an "In—Ga—Zn-based oxide" means an oxide containing In, Ga, and Zn as its main components, and there is no limitation on the ratio of In:Ga:Zn. The In—Ga—Zn-based oxide may contain another metal element in addition to In, Ga, and Zn.

The semiconductor layer and the conductive layer may include the same metal elements contained in the above oxides. The use of the same metal elements for the semiconductor layer and the conductive layer can reduce the manufacturing cost. For example, when metal oxide targets with the same metal composition are used, the manufacturing cost can be reduced, and the same etching gas or the same etchant can be used in processing the semiconductor layer and the conductive layer. Note that even when the semiconductor layer and the conductive layer include the same metal elements, they have different compositions in some cases. For example, a metal element in a film is released during the manufacturing process of the transistor and the capacitor, which might result in different metal compositions.

In the case where the semiconductor layer is an In-M-Zn oxide, when Zn and O are eliminated from consideration, the proportions of In and M when the summation of In and M is assumed to be 100 atomic % are preferably as follows: the atomic percentage of In is higher than 25 atomic % and the atomic percentage of M is lower than 75 atomic %, more preferably, the atomic percentage of In is higher than 34 atomic % and the atomic percentage of M is lower than 66 atomic %.

The energy gap of the semiconductor layer is 2 eV or more, preferably 2.5 eV or more, more preferably 3 eV or more. With the use of an oxide semiconductor having such a wide energy gap, the off-state current of the transistor can be reduced.

The thickness of the semiconductor layer is greater than or equal to 3 nm and less than or equal to 200 nm, preferably greater than or equal to 3 nm and less than or equal to 100 nm, more preferably greater than or equal to 3 nm and less than or equal to 50 nm.

In the case where the semiconductor layer contains an In-M-Zn oxide, it is preferable that the atomic ratio of metal elements of a sputtering target used for forming a film of the In-M-Zn oxide satisfy In≥M and Zn≥M. As the atomic ratio of metal elements of such a sputtering target, In:M:Zn=1:1:1, In:M:Zn=1:1:1.2, In:M:Zn=3:1:2, and In:M:Zn=4:2:3 are preferable. Note that the atomic ratio of metal elements in the formed semiconductor layer varies from the above atomic ratio of metal elements of the sputtering target within a range of ±40% as an error.

An oxide semiconductor film with low carrier density is used as the semiconductor layer. For example, the semiconductor layer is an oxide semiconductor film whose carrier density is lower than or equal to $1\times10^{17}/cm^3$, preferably lower than or equal to $1\times10^{15}/cm^3$, more preferably lower than or equal to $1\times10^{13}/cm^3$, still more preferably lower than or equal to $1\times10^{11}/cm^3$. Such an oxide semiconductor is referred to as a highly purified intrinsic or substantially highly purified intrinsic oxide semiconductor. The oxide semiconductor has low impurity concentration and a low density of defect states and can thus be referred to as an oxide semiconductor having stable characteristics.

Note that, without limitation to those described above, a material with an appropriate composition may be used depending on required semiconductor characteristics and electrical characteristics (e.g., field-effect mobility and threshold voltage) of a transistor. To obtain the required semiconductor characteristics of the transistor, it is preferable that the carrier density, the impurity concentration, the defect density, the atomic ratio between a metal element and oxygen, the interatomic distance, the density, and the like of the semiconductor layer be set to appropriate values.

When silicon or carbon that is one of elements belonging to Group 14 is contained in the semiconductor layer, oxygen vacancies are increased in the semiconductor layer, and the semiconductor layer becomes n-type. Thus, the concentration of silicon or carbon (measured by secondary ion mass spectrometry) in the semiconductor layer is lower than or equal to $2\times10^{18}$ atoms/cm$^3$, preferably lower than or equal to $2\times10^{17}$ atoms/cm$^3$.

Alkali metal and alkaline earth metal might generate carriers when bonded to an oxide semiconductor, in which case the off-state current of the transistor might be increased. Therefore, the concentration of alkali metal or alkaline earth metal of the semiconductor layer, which is measured by secondary ion mass spectrometry, is lower than or equal to $1\times10^{18}$ atoms/cm$^3$, preferably lower than or equal to $2\times10^{16}$ atoms/cm$^3$.

When nitrogen is contained in the semiconductor layer, electrons serving as carriers are generated and the carrier density increases, so that the semiconductor layer easily becomes n-type. Thus, a transistor including an oxide semiconductor which contains nitrogen is likely to be normally on. For example, the concentration of nitrogen which is measured by secondary ion mass spectrometry is preferably set to lower than or equal to $5\times10^{18}$ atoms/cm$^3$.

The semiconductor layer may have a non-single-crystal structure, for example. The non-single-crystal structure includes CAAC-OS, a polycrystalline structure, a microcrystalline structure, or an amorphous structure, for example. Among the non-single-crystal structures, an amorphous structure has the highest density of defect states, whereas CAAC-OS has the lowest density of defect states.

The semiconductor layer may have an amorphous structure, for example. An oxide semiconductor film having an amorphous structure has disordered atomic arrangement and no crystalline component, for example. Alternatively, an oxide film having an amorphous structure has, for example, an absolutely amorphous structure and no crystal part.

Note that the semiconductor layer may be a mixed film including two or more of the following: a region having an amorphous structure, a region having a microcrystalline structure, a region having a polycrystalline structure, a region of CAAC-OS, and a region having a single-crystal structure. The mixed film has, for example, a single-layer structure or a stacked-layer structure including two or more of the above regions in some cases.

Alternatively, silicon is preferably used as a semiconductor in which a channel of a transistor is formed. Although amorphous silicon may be used as silicon, silicon having crystallinity is particularly preferable. For example, microcrystalline silicon, polycrystalline silicon, single-crystal silicon, or the like is preferably used. In particular, polycrystalline silicon can be formed at a lower temperature than single-crystal silicon and has higher field effect mobility and higher reliability than amorphous silicon. When such a polycrystalline semiconductor is used for a pixel, the aperture ratio of the pixel can be improved. Even in the case of a high-definition display panel, a gate driver circuit and a source driver circuit can be formed over a substrate over which the pixels are formed, and the number of components of an electronic device can be reduced.

The bottom-gate transistor described in this embodiment is preferable because the number of manufacturing steps can be reduced. When amorphous silicon, which can be formed at a lower temperature than polycrystalline silicon, is used for the semiconductor layer, materials with low heat resistance can be used for a wiring, an electrode, or a substrate below the semiconductor layer, so that the range of choices of materials can be widened. For example, an extremely large glass substrate can be favorably used. Meanwhile, the top-gate transistor described in this embodiment is preferable because an impurity region is easily formed in a self-aligned manner and variation in characteristics can be reduced. In that case, the use of polycrystalline silicon, single-crystal silicon, or the like is particularly preferable.

[Conductive Layer]

As a gate, a source, and a drain of a transistor, and a wiring or an electrode included in a touch panel, any of metals such as aluminum, titanium, chromium, nickel, copper, yttrium, zirconium, molybdenum, silver, tantalum, and tungsten, or an alloy containing any of these metals as its main component can be used. A single-layer structure or multi-layer structure including a film containing any of these materials can be used. For example, the following structures can be given: a single-layer structure of an aluminum film containing silicon, a two-layer structure in which an aluminum film is stacked over a titanium film, a two-layer structure in which an aluminum film is stacked over a tungsten film, a two-layer structure in which a copper film is stacked over a copper-magnesium-aluminum alloy film, a two-layer structure in which a copper film is stacked over a titanium film, a two-layer structure in which a copper film is stacked over a tungsten film, a three-layer structure in which a titanium film or a titanium nitride film, an aluminum film or a copper film, and a titanium film or a titanium nitride film are stacked in this order, and a three-layer structure in which a molybdenum film or a molybdenum nitride film, an aluminum film or a copper film, and a molybdenum film or a molybdenum nitride film are stacked in this order. Note that a transparent conductive material such as indium oxide, tin oxide, or zinc oxide may be used. Copper containing manganese is preferably used because controllability of a shape by etching is increased.

As a light-transmitting conductive material, a conductive oxide such as indium oxide, indium tin oxide, indium zinc oxide, zinc oxide, or zinc oxide to which gallium is added, or graphene can be used. Alternatively, a metal material such as gold, silver, platinum, magnesium, nickel, tungsten, chromium, molybdenum, iron, cobalt, copper, palladium, or titanium, or an alloy material containing any of these metal materials can be used. Alternatively, a nitride of the metal material (e.g., titanium nitride) or the like may be used. In the case of using the metal material or the alloy material (or the nitride thereof), the thickness is set small enough to be able to transmit light. Alternatively, a stack of any of the above materials can be used as the conductive layer. For example, a stacked film of indium tin oxide and an alloy of silver and magnesium is preferably used because the conductivity can be increased. They can also be used for conductive layers such as a variety of wirings and electrodes included in a touch panel, and an electrode (e.g., a pixel electrode or a common electrode) included in a display element.

[Insulating Layer]

Examples of an insulating material that can be used for the insulating layers, the overcoat, the spacer, and the like include a resin such as acrylic or epoxy resin, a resin having a siloxane bond, and an inorganic insulating material such as silicon oxide, silicon oxynitride, silicon nitride oxide, silicon nitride, or aluminum oxide.

The light-emitting element is preferably provided between a pair of insulating films with low water permeability, in which case impurities such as water can be prevented from entering the light-emitting element. Thus, a decrease in device reliability can be prevented.

As an insulating film with low water permeability, a film containing nitrogen and silicon (e.g., a silicon nitride film or a silicon nitride oxide film), a film containing nitrogen and aluminum (e.g., an aluminum nitride film), or the like can be used. Alternatively, a silicon oxide film, a silicon oxynitride film, an aluminum oxide film, or the like can be used.

For example, the water vapor transmittance of the insulating film with low water permeability is lower than or equal to $1\times10^{-5}$ [g/m$^2$·day], preferably lower than or equal to $1\times10^{-6}$ [g/m$^2$·day], further preferably lower than or equal to $1\times10^{-7}$ [g/m$^2$·day], still further preferably lower than or equal to $1\times10^{-8}$ [g/m$^2$·day].

[Light-Emitting Element]

As the light-emitting element, a self-luminous element can be used, and an element whose luminance is controlled by current or voltage is included in the category of the light-emitting element. For example, a light-emitting diode (LED), an organic EL element, an inorganic EL element, or the like can be used.

The light-emitting element may be a top emission, bottom emission, or dual emission light-emitting element. A conductive film that transmits visible light is used as the electrode through which light is extracted. A conductive film that reflects visible light is preferably used as the electrode through which light is not extracted.

The EL layer includes at least a light-emitting layer. In addition to the light-emitting layer, the EL layer may further include one or more layers containing any of a substance with a high hole-injection property, a substance with a high hole-transport property, a hole-blocking material, a substance with a high electron-transport property, a substance with a high electron-injection property, a substance with a bipolar property (a substance with a high electron- and hole-transport property), and the like.

Either a low molecular compound or a high molecular compound can be used for the EL layer, and an inorganic compound may also be used. The layers included in the EL layer can be formed by any of the following methods: an evaporation method (including a vacuum evaporation method), a transfer method, a printing method, an inkjet method, a coating method, and the like.

When a voltage higher than the threshold voltage of the light-emitting element is applied between the anode and the cathode, holes are injected to the EL layer from the anode side and electrons are injected to the EL layer from the cathode side. The injected electrons and holes are recombined in the EL layer, so that a light-emitting substance contained in the EL layer emits light.

In the case where a light-emitting element emitting white light is used as the light-emitting element, the EL layer preferably contains two or more kinds of light-emitting substances. For example, light-emitting substances are selected so that two or more light-emitting substances emit complementary colors to obtain white light emission. Specifically, it is preferable to contain two or more light-emitting substances selected from light-emitting substances emitting light of red (R), green (G), blue (B), yellow (Y), orange (O), and the like and light-emitting substances emitting light containing two or more of spectral components of R, G, and B. The light-emitting element preferably emits light with a spectrum having two or more peaks in the wavelength range of a visible light region (e.g., 350 nm to 750 nm). An emission spectrum of a material emitting light having a peak in the wavelength range of a yellow light preferably includes spectral components also in the wavelength range of a green light and a red light.

A light-emitting layer containing a light-emitting material emitting light of one color and a light-emitting layer containing a light-emitting material emitting light of another color are preferably stacked in the EL layer. For example, the plurality of light-emitting layers in the EL layer may be stacked in contact with each other or may be stacked with a region not including any light-emitting material therebetween. For example, between a fluorescent layer and a phosphorescent layer, a region containing the same material as one in the fluorescent layer or phosphorescent layer (for example, a host material or an assist material) and no light-emitting element may be provided. This facilitates the manufacture of the light-emitting element and reduces the drive voltage.

The light-emitting element may be a single element including one EL layer or a tandem element in which a plurality of EL layers are stacked with a charge generation layer therebetween.

The conductive film that transmits visible light can be formed using, for example, indium oxide, indium tin oxide, indium zinc oxide, zinc oxide, or zinc oxide to which gallium is added. Alternatively, a film of a metal material such as gold, silver, platinum, magnesium, nickel, tungsten, chromium, molybdenum, iron, cobalt, copper, palladium, or titanium; an alloy containing any of these metal materials; or a nitride of any of these metal materials (e.g., titanium nitride) can be used when formed thin so as to have a light-transmitting property. Alternatively, a stack of any of the above materials can be used as the conductive layer. For example, a stacked film of indium tin oxide and an alloy of silver and magnesium is preferably used, in which case conductivity can be increased. Further alternatively, graphene or the like may be used.

For the conductive film that reflects visible light, for example, a metal material, such as aluminum, gold, platinum, silver, nickel, tungsten, chromium, molybdenum, iron, cobalt, copper, or palladium or an alloy including any of these metal materials can be used. Lanthanum, neodymium, germanium, or the like may be added to the metal material or the alloy. Alternatively, an alloy containing aluminum (an aluminum alloy) such as an alloy of aluminum and titanium, an alloy of aluminum and nickel, or an alloy of aluminum and neodymium may be used. Alternatively, an alloy containing silver such as an alloy of silver and copper, an alloy of silver and palladium, or an alloy of silver and magnesium may be used. An alloy of silver and copper is preferable because of its high heat resistance. Furthermore, when a metal film or a metal oxide film is stacked in contact with an aluminum film or an aluminum alloy film, oxidation of the aluminum alloy film can be suppressed. Examples of a material for the metal film or the metal oxide film are titanium, titanium oxide, and the like. Alternatively, the conductive film having a property of transmitting visible light and a film containing any of the above metal materials may be stacked. For example, a stack of silver and indium tin oxide, a stack of an alloy of silver and magnesium and indium tin oxide, or the like can be used.

The electrodes may be formed separately by an evaporation method or a sputtering method. Alternatively, a discharging method such as an inkjet method, a printing method such as a screen printing method, or a plating method may be used.

[Adhesive Layer]

As the adhesive layer, a variety of curable adhesives such as a reactive curable adhesive, a thermosetting adhesive, an anaerobic adhesive, and a photo curable adhesive such as an ultraviolet curable adhesive can be used. Examples of these adhesives include an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin. In particular, a material with low moisture permeability, such as an epoxy resin, is preferred. Alternatively, a two-component-mixture-type resin may be used. Further alternatively, an adhesive sheet or the like may be used.

Furthermore, the resin may include a drying agent. For example, a substance that adsorbs water by chemical adsorption, such as oxide of an alkaline earth metal (e.g., calcium oxide or barium oxide), can be used. Alternatively, a substance that adsorbs water by physical adsorption, such as zeolite or silica gel, may be used. The drying agent is preferably included because it can prevent impurities such as water from entering the element, thereby improving the reliability of the display panel.

In addition, it is preferable to mix a filler with a high refractive index or light-scattering member into the resin, in which case light extraction efficiency can be enhanced. For example, titanium oxide, barium oxide, zeolite, zirconium, or the like can be used.

[Connection Layer]

As the connection layers, an anisotropic conductive film (ACF), an anisotropic conductive paste (ACP), or the like can be used.

[Coloring Layer]

As examples of a material that can be used for the coloring layers, a metal material, a resin material, and a resin material containing a pigment or dye can be given.

[Light-Blocking Layer]

As examples of a material that can be used for the light-blocking layer, carbon black, a metal oxide, and a composite oxide containing a solid solution of a plurality of metal oxides can be given. Stacked films containing the material of the coloring layer can also be used for the light-blocking layer. For example, a stacked-layer structure of a film containing a material of a coloring layer which transmits light of a certain color and a film containing a material of a coloring layer which transmits light of another color can be employed. It is preferable that the coloring layer and the light-blocking layer be formed using the same material because the same manufacturing apparatus can be used and the process can be simplified.

The above is the description of each of the components.

At least part of this embodiment can be implemented in combination with any of the other embodiments described in this specification as appropriate.

Embodiment 2

In this embodiment, an example of a driving method of an input device (touch sensor) which can be applied to the touch panel module of one embodiment of the present invention will be described.

Figures 43A, 43B:
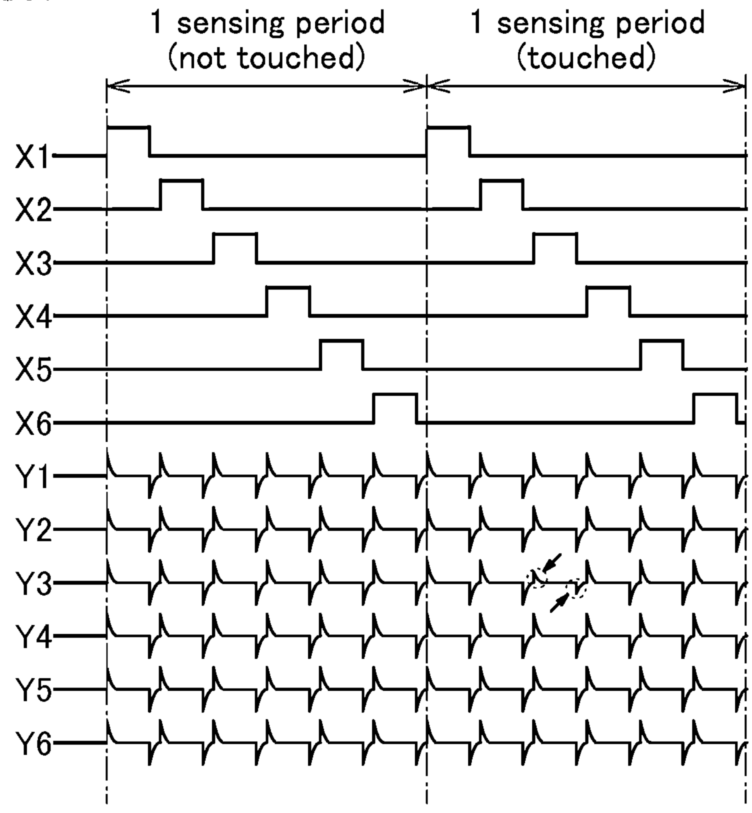
FIGS. 43A and 43B are a circuit diagram and a timing chart of a touch sensor of an embodiment.

FIG. 43A is a block diagram illustrating the structure of a mutual capacitive touch sensor. FIG. 43A illustrates a pulse voltage output circuit 601 and a current sensing circuit 602. Note that in FIG. 43A, six wirings X1 to X6 represent electrodes 621 to which a pulse voltage is applied, and six wirings Y1 to Y6 represent electrodes 622 that sense changes in current. The number of such electrodes is not limited to those illustrated in this example. FIG. 43A also illustrates a capacitor 603 that is formed with the electrodes 621 and 622 overlapping with each other or being provided close to each other. Note that functional replacement between the electrodes 621 and 622 is possible.

For example, the wiring 23 described in Embodiment 1 corresponds to one of the electrode 621 and the electrode 622, and the wiring 24 described in Embodiment 1 corresponds to the other of the electrode 621 and the electrode 622.

The pulse voltage output circuit 601 is, for example, a circuit for sequentially inputting a pulse voltage to the wirings X1 to X6. The current sensing circuit 602 is a circuit for sensing current flowing through each of the wirings Y1-Y6, for example.

By application of a pulse voltage to one of the wirings X1 to X6, an electric field is generated between the electrodes 621 and 622 of the capacitor 603, and current flows through the electrode 622. Part of the electric field generated between the electrodes is blocked when an object such a finger or a stylus contacts or approaches the device, so that the electric field intensity between the electrodes is changed. Consequently, the amount of current flowing through the electrode 622 is changed.

For example, in the case where there is no approach or no contact of an object, the amount of current flowing in each of the wirings Y1-Y6 depends on the amount of capacitance of the capacitor 603. In the case where part of an electric field is blocked by the approach or contact of an object, a decrease in the amount of current flowing in the wirings Y1-Y6 is sensed. The approach or contact of an object can be sensed by utilizing this change.

Sensing by the current sensing circuit 602 may be performed using an integral value (time integral value) of current flowing in a wiring. In that case, sensing may be performed with an integrator circuit or the like, for example. Alternatively, the peak current value may be sensed. In that case, for example, current may be converted into voltage, and the peak voltage value may be sensed.

FIG. 43B is an example of a timing chart illustrating input and output waveforms in the mutual capacitive touch sensor in FIG. 43A. In FIG. 43B, sensing in each row and each column is performed in one sensing period. FIG. 43B shows a period when the contact or approach of an object is not sensed (when the touch sensor is not touched) and a period when the contact or approach of an object is sensed (when the touch sensor is touched). Here, the wirings Y1-Y6 each show a waveform of a voltage corresponding to the amount of current to be sensed.

As shown in FIG. 43B, the wirings X1-X6 are sequentially supplied with a pulse voltage. Accordingly, current flows in the wirings Y1-Y6. When the touch sensor is not touched, substantially the same current flows in the wirings Y1-Y6 in accordance with a change in voltages of the wirings X1-X6; thus, the wirings Y1-Y6 have similar output waveforms. Meanwhile, when the touch sensor is touched, current flowing in a wiring in a position which an object contacts or approaches among the wirings Y1-Y6 is reduced; thus, the output waveforms are changed as shown in FIG. 43B.

FIG. 43B illustrates an example where an object contacts or approaches the intersection of the wiring X3 and the wiring Y3 or the vicinity thereof.

A change in current due to block of an electric field generated between a pair of electrodes is sensed in this manner in a mutual capacitive touch sensor, so that positional information of an object can be obtained. When the detection sensitivity is high, the coordinates of the object can be determined even when the object is far from a detection surface (e.g., a surface of the touch panel).

By driving a touch panel by a method in which a display period of a display portion and a sensing period of a touch sensor do not overlap with each other, the detection sensitivity of the touch sensor can be increased. For example, a display period and a sensing period may be separately provided in one display frame period. In that case, two or more sensing periods are preferably provided in one frame period. When the frequency of sensing is increased, the detection sensitivity can be increased.

It is preferable that, as an example, the pulse voltage output circuit 601 and the current sensing circuit 602 be formed in one IC chip. For example, the IC is preferably mounted on a touch panel or a substrate in a housing of an electronic device. In the case where the touch panel has flexibility, parasitic capacitance might be increased in a bent portion of the touch panel, and the influence of noise might be increased. In view of this, it is preferable to use an IC to which a driving method less influenced by noise is applied. For example, it is preferable to use an IC to which a driving method capable of increasing a signal-noise ratio (S/N ratio) is applied.

At least part of this embodiment can be implemented in combination with any of the other embodiments described in this specification as appropriate.

Embodiment 3

In this embodiment, an example of a transistor which can be used as the transistor 70, the transistor 70*a*, the transistor 70*b*, the transistor 201, the transistor 202, and the like described in the above embodiments will be described with reference to drawings.

The touch panel module 10 of one embodiment of the present invention can be fabricated by using a transistor with any of various transistors, such as a bottom-gate transistor or a top-gate transistor. Therefore, a material for a semiconductor layer or the structure of a transistor can be easily changed depending on the existing production line.

[Bottom-Gate Transistor]

FIG. 44A1 is a cross-sectional view of a transistor 810 that is a channel-protective transistor, which is a type of bottom-gate transistor. In FIG. 44A1, the transistor 810 is formed over a substrate 771. The transistor 810 includes an electrode 746 over the substrate 771 with an insulating layer 772 provided therebetween. The transistor 810 includes a semiconductor layer 742 over the electrode 746 with an insulating layer 726 provided therebetween. The electrode 746 can function as a gate electrode. The insulating layer 726 can function as a gate insulating layer.

The transistor 810 includes an insulating layer 741 over a channel formation region in the semiconductor layer 742. The transistor 810 includes an electrode 744*a* and an electrode 744*b* which are partly in contact with the semiconductor layer 742 and over the insulating layer 726. The electrode 744*a* can function as one of a source electrode and a drain electrode. The electrode 744*b* can function as the other of the source electrode and the drain electrode. Part of the electrode 744*a* and part of the electrode 744*b* are formed over the insulating layer 741.

The insulating layer 741 can function as a channel protective layer. With the insulating layer 741 provided over the channel formation region, the semiconductor layer 742 can be prevented from being exposed at the time of forming the electrodes 744*a* and 744*b*. Thus, the channel formation region in the semiconductor layer 742 can be prevented from being etched at the time of forming the electrodes 744*a* and 744*b*. In accordance with one embodiment of the present invention, a transistor with favorable electrical characteristics can be provided.

The transistor 810 includes an insulating layer 728 over the electrode 744*a*, the electrode 744*b*, and the insulating layer 741 and further includes an insulating layer 729 over the insulating layer 728.

The insulating layer 772 can be formed using a material and a method similar to those of insulating layers 722 and 705. Note that the insulating layer 772 may be formed of a stack of insulating layers. For example, the semiconductor layer 742 can be formed using a material and a method similar to those of the semiconductor layer 708. Note that the semiconductor layer 742 may be formed of a stack of semiconductor layers. For example, the electrode 746 can be formed using a material and a method similar to those of the electrode 706. Note that the electrode 746 may be formed of a stack of conductive layers. The insulating layer 726 can be formed using a material and a method similar to those of the insulating layer 707. Note that the insulating layer 726 may be formed of a stack of insulating layers. For example, the electrodes 744*a* and 744*b* can be formed using a material and a method similar to those of the electrode 714 or 715. Note that the electrodes 744*a* and 744*b* may be formed of a stack of conductive layers. For example, the insulating layer 741 can be formed using a material and a method similar to those of the insulating layer 726. Note that the insulating layer 741 may be formed of a stack of insulating layers. For example, the insulating layer 728 can be formed using a material and a method similar to those of the insulating layer 710. Note that the insulating layer 728 may be formed of a stack of insulating layers. For example, the insulating layer 729 can be formed using a material and a method similar to those of the insulating layer 711. Note that the insulating layer 729 may be formed of a stack of insulating layers.

The electrode, the semiconductor layer, the insulating layer, and the like used in the transistor disclosed in this embodiment can be formed using a material and a method disclosed in any of the other embodiments.

In the case where an oxide semiconductor is used for the semiconductor layer 742, a material capable of removing oxygen from part of the semiconductor layer 742 to generate oxygen vacancies is preferably used for regions of the electrodes 724*a* and 724*b* that are in contact with at least the semiconductor layer 742. The carrier concentration in the regions of the semiconductor layer 742 where oxygen vacancies are generated is increased, so that the regions become n-type regions ($n^+$ layers). Accordingly, the regions can function as a source region and a drain region. When an oxide semiconductor is used for the semiconductor layer 742, examples of the material capable of removing oxygen from the semiconductor layer 742 to generate oxygen vacancies include tungsten and titanium.

Formation of the source region and the drain region in the semiconductor layer 742 makes it possible to reduce contact resistance between the semiconductor layer 742 and each of the electrodes 724*a* and 724*b*. Accordingly, the electric characteristics of the transistor, such as the field-effect mobility and the threshold voltage, can be favorable.

In the case where a semiconductor such as silicon is used for the semiconductor layer 742, a layer that functions as an n-type semiconductor or a p-type semiconductor is preferably provided between the semiconductor layer 742 and the electrode 724*a* and between the semiconductor layer 742 and the electrode 724*b*. The layer that functions as an n-type semiconductor or a p-type semiconductor can function as the source region or the drain region in the transistor.

The insulating layer 729 is preferably formed using a material that can prevent or reduce diffusion of impurities into the transistor from the outside. The formation of the insulating layer 729 may also be omitted.

When an oxide semiconductor is used for the semiconductor layer 742, heat treatment may be performed before and/or after the insulating layer 729 is formed. The heat treatment can fill oxygen vacancies in the semiconductor layer 742 by diffusing oxygen contained in the insulating layer 729 or other insulating layers into the semiconductor layer 742. Alternatively, the insulating layer 729 may be formed while the heat treatment is performed, so that oxygen vacancies in the semiconductor layer 742 can be filled.

Note that a CVD method can be generally classified into a plasma enhanced CVD (PECVD) method using plasma, a thermal CVD (TCVD) method using heat, and the like. A CVD method can be further classified into a metal CVD (MCVD) method, a metal organic CVD (MOCVD) method, and the like according to a source gas to be used.

Furthermore, an evaporation method can be generally classified into a resistance heating evaporation method, an electron beam evaporation method, a molecular beam epitaxy (MBE) method, a pulsed laser deposition (PLD) method, an ion beam assisted deposition (IBAD) method, an atomic layer deposition (ALD) method, and the like.

By using a PECVD method, a high-quality film can be formed at a relatively low temperature. By using a deposition method that does not use plasma for deposition, such as an MOCVD method or an evaporation method, a film with few defects can be formed because damage is not easily caused on a surface on which the film is deposited.

A sputtering method is generally classified into a DC sputtering method, a magnetron sputtering method, an RF sputtering method, an ion beam sputtering method, an electron cyclotron resonance (ECR) sputtering method, a facing-target sputtering method, and the like.

In a facing-target sputtering method, plasma is confined between targets; thus, plasma damage to a substrate can be reduced. Furthermore, step coverage can be improved because the incident angle of a sputtered particle to a substrate can be made smaller depending on the inclination of a target.

A transistor 811 illustrated in FIG. 44A2 is different from the transistor 810 in that an electrode 723 that can function as a back gate electrode is provided over the insulating layer 729. The electrode 723 can be formed using a material and a method similar to those of the electrode 746.

In general, a back gate electrode is formed using a conductive layer and positioned so that a channel formation region of a semiconductor layer is positioned between a gate electrode and the back gate electrode. Thus, the back gate electrode can function in a manner similar to that of the gate electrode. The potential of the back gate electrode may be the same as that of the gate electrode or may be a ground (GND) potential or a predetermined potential. By changing the potential of the back gate electrode independently of the potential of the gate electrode, the threshold voltage of the transistor can be changed.

The electrode 746 and the electrode 723 can each function as a gate electrode. Thus, the insulating layers 726, 728, and 729 can each function as a gate insulating layer. The electrode 723 may also be provided between the insulating layers 728 and 729.

In the case where one of the electrode 746 and the electrode 723 is simply referred to as a "gate electrode", the other can be referred to as a "back gate electrode". For example, in the transistor 811, in the case where the electrode 723 is referred to as a "gate electrode", the electrode 746 is referred to as a "back gate electrode". In the case where the electrode 723 is used as a "gate electrode", the transistor 811 is a kind of top-gate transistor. Alternatively, one of the electrode 746 and the electrode 723 may be referred to as a "first gate electrode", and the other may be referred to as a "second gate electrode".

By providing the electrode 746 and the electrode 723 with the semiconductor layer 742 provided therebetween and setting the potentials of the electrode 746 and the electrode 723 to be the same, a region of the semiconductor layer 742 through which carriers flow is enlarged in the film thickness direction; thus, the number of transferred carriers is increased. As a result, the on-state current and field-effect mobility of the transistor 811 are increased.

Therefore, the transistor 811 has a high on-state current for its area. That is, the area of the transistor 811 can be small for a required on-state current. In accordance with one embodiment of the present invention, the area of a transistor can be reduced. Therefore, in accordance with one embodiment of the present invention, a semiconductor device having a high degree of integration can be provided.

The gate electrode and the back gate electrode are formed using conductive layers and thus each have a function of preventing an electric field generated outside the transistor from influencing the semiconductor layer in which the channel is formed (in particular, an electric field blocking function against static electricity and the like). When the back gate electrode is formed larger than the semiconductor layer such that the semiconductor layer is covered with the back gate electrode, the electric field blocking function can be enhanced.

Since the electrode 746 and the electrode 723 each have a function of blocking an electric field generated outside, electric charge of charged particles and the like generated on the insulating layer 772 side or above the electrode 723 do not influence the channel formation region in the semiconductor layer 742. Thus, degradation by a stress test (e.g., a negative gate bias temperature (−GBT) stress test in which negative electric charge is applied to a gate) can be reduced. Furthermore, a change in gate voltage (rising voltage) at which on-state current starts flowing depending on drain voltage can be reduced. Note that this effect is obtained when the electrodes 746 and 723 have the same potential or different potentials.

The BT stress test is one kind of acceleration test and can evaluate, in a short time, a change by long-term use (i.e., a change over time) in characteristics of a transistor. In particular, the amount of change in threshold voltage of a transistor before and after the BT stress test is an important indicator when examining the reliability of the transistor. As the change in the threshold voltage is smaller, the transistor has higher reliability.

By providing the electrodes 746 and 723 and setting the potentials of the electrodes 746 and 723 to be the same, the amount of change in threshold voltage is reduced. Accordingly, variations in electrical characteristics among a plurality of transistors are also reduced.

A transistor including a back gate electrode has a smaller change in threshold voltage before and after a positive GBT stress test, in which positive electric charge is applied to a gate, than a transistor including no back gate electrode.

When the back gate electrode is formed using a light-blocking conductive film, light can be prevented from entering the semiconductor layer from the back gate electrode side. Therefore, photodegradation of the semiconductor layer can be prevented, and deterioration in electrical characteristics of the transistor, such as a shift of the threshold voltage, can be prevented.

In accordance with one embodiment of the present invention, a transistor with high reliability can be provided. Moreover, a semiconductor device with high reliability can be provided.

FIG. 44B1 is a cross-sectional view of a channel-protective transistor 820 that is a type of bottom-gate transistor. The transistor 820 has substantially the same structure as the transistor 810 but is different from the transistor 810 in that the insulating layer 741 covers an end portion of the semiconductor layer 742. The semiconductor layer 742 is electrically connected to the electrode 744*a* through an opening formed by selectively removing part of the insulating layer 741 which overlaps with the semiconductor layer 742. The semiconductor layer 742 is electrically connected to the electrode 744*b* through another opening formed by selectively removing part of the insulating layer 741 which overlaps with the semiconductor layer 742. A region of the insulating layer 741 which overlaps with the channel formation region can function as a channel protective layer.

A transistor 821 illustrated in FIG. 44B2 is different from the transistor 820 in that the electrode 723 that can function as a back gate electrode is provided over the insulating layer 729.

With the insulating layer 729, the semiconductor layer 742 can be prevented from being exposed at the time of forming the electrodes 744*a* and 744*b*. Thus, the semiconductor layer 742 can be prevented from being reduced in thickness at the time of forming the electrodes 744*a* and 744*b*.

The length between the electrode 744*a* and the electrode 746 and the length between the electrode 744*b* and the electrode 746 in the transistors 820 and 821 are larger than those in the transistors 810 and 811. Thus, the parasitic capacitance generated between the electrode 744*a* and the electrode 746 can be reduced. Moreover, the parasitic capacitance generated between the electrode 744*b* and the electrode 746 can be reduced. In accordance with one embodiment of the present invention, a transistor with favorable electrical characteristics can be provided.

A transistor 825 illustrated in FIG. 44C1 is a channel-etched transistor that is a type of bottom-gate transistor. In the transistor 825, the electrodes 744*a* and 744*b* are formed without providing the insulating layer 729. Thus, part of the semiconductor layer 742 that is exposed at the time of forming the electrodes 744*a* and 744*b* is etched in some cases. However, since the insulating layer 729 is not provided, the productivity of the transistor can be increased.

A transistor 826 illustrated in FIG. 44C2 is different from the transistor 825 in that the electrode 723 which can function as a back gate electrode is provided over the insulating layer 729.

[Top-Gate Transistor]

FIG. 45A1 is a cross-sectional view of a transistor 830 that is a type of top-gate transistor. The transistor 830 includes the semiconductor layer 742 over the insulating layer 772, the electrodes 744*a* and 744*b* that are over the semiconductor layer 742 and the insulating layer 772 and in contact with part of the semiconductor layer 742, the insulating layer 726 over the semiconductor layer 742 and the electrodes 744*a* and 744*b*, and the electrode 746 over the insulating layer 726.

Since the electrode 746 overlaps with neither the electrode 744*a* nor the electrode 744*b* in the transistor 830, the parasitic capacitance generated between the electrodes 746 and 744*a* and the parasitic capacitance generated between the electrodes 746 and 744*b* can be reduced. After the formation of the electrode 746, an impurity 755 is introduced into the semiconductor layer 742 using the electrode 746 as a mask, so that an impurity region can be formed in the semiconductor layer 742 in a self-aligned manner (see FIG. 45A3). In accordance with one embodiment of the present invention, a transistor with favorable electrical characteristics can be provided.

The introduction of the impurity 755 can be performed with an ion implantation apparatus, an ion doping apparatus, or a plasma treatment apparatus.

As the impurity 755, for example, at least one kind of element of Group 13 elements and Group 15 elements can be used. In the case where an oxide semiconductor is used for the semiconductor layer 742, it is possible to use at least one kind of element of a rare gas, hydrogen, and nitrogen as the impurity 755.

A transistor 831 illustrated in FIG. 45A2 is different from the transistor 830 in that the electrode 723 and the insulating layer 727 are included. The transistor 831 includes the electrode 723 formed over the insulating layer 772 and the insulating layer 727 formed over the electrode 723. The electrode 723 can function as a back gate electrode. Thus, the insulating layer 727 can function as a gate insulating layer. The insulating layer 727 can be formed using a material and a method similar to those of the insulating layer 726.

Like the transistor 811, the transistor 831 has a high on-state current for its area. That is, the area of the transistor 831 can be small for a required on-state current. In accordance with one embodiment of the present invention, the area of a transistor can be reduced. Therefore, in accordance with one embodiment of the present invention, a semiconductor device having a high degree of integration can be provided.

A transistor 840 illustrated in FIG. 45B1 is a type of top-gate transistor. The transistor 840 is different from the transistor 830 in that the semiconductor layer 742 is formed after the formation of the electrodes 744*a* and 744*b*. A transistor 841 illustrated in FIG. 45B2 is different from the transistor 840 in that the electrode 723 and the insulating layer 727 are included. In the transistors 840 and 841, part of the semiconductor layer 742 is formed over the electrode 744*a* and another part of the semiconductor layer 742 is formed over the electrode 744*b*.

Like the transistor 811, the transistor 841 has a high on-state current for its area. That is, the area of the transistor 841 can be small for a required on-state current. In accordance with one embodiment of the present invention, the area of a transistor can be reduced. Therefore, in accordance with one embodiment of the present invention, a semiconductor device having a high degree of integration can be provided.

A transistor 842 illustrated in FIG. 46A1 is a type of top-gate transistor. The transistor 842 is different from the transistor 830 or 840 in that the electrodes 744*a* and 744*b* are formed after the formation of the insulating layer 729. The electrodes 744*a* and 744*b* are electrically connected to the semiconductor layer 742 through openings formed in the insulating layers 728 and 729.

Part of the insulating layer 726 that does not overlap with the electrode 746 is removed, and the impurity 755 is introduced into the semiconductor layer 742 using the electrode 746 and the insulating layer 726 that is left as a mask, so that an impurity region can be formed in the semiconductor layer 742 in a self-aligned manner (see FIG. 46A3). The transistor 842 includes a region where the insulating layer 726 extends beyond an end portion of the electrode 746. The semiconductor layer 742 in a region into which the impurity 755 is introduced through the insulating layer 726 has a lower impurity concentration than the semiconductor layer 742 in a region into which the impurity 755 is introduced without through the insulating layer 726. Thus, a lightly doped drain (LDD) region is formed in a region adjacent to a portion of the semiconductor layer 742 which overlaps with the electrode 746.

A transistor 843 illustrated in FIG. 46A2 is different from the transistor 842 in that the electrode 723 is included. The transistor 843 includes the electrode 723 that is formed over the substrate 771 and overlaps with the semiconductor layer 742 with the insulating layer 772 provided therebetween. The electrode 723 can function as a back gate electrode.

As in a transistor 844 illustrated in FIG. 46B1 and a transistor 845 illustrated in FIG. 46B2, the insulating layer 726 in a region that does not overlap with the electrode 746 may be completely removed. Alternatively, as in a transistor 846 illustrated in FIG. 46C1 and a transistor 847 illustrated in FIG. 46C2, the insulating layer 726 may be left.

In the transistors 842 to 847, after the formation of the electrode 746, the impurity 755 is introduced into the semiconductor layer 742 using the electrode 746 as a mask, so that an impurity region can be formed in the semiconductor layer 742 in a self-aligned manner. In accordance with one embodiment of the present invention, a transistor with favorable electrical characteristics can be provided. Furthermore, in accordance with one embodiment of the present invention, a semiconductor device having a high degree of integration can be provided.

At least part of this embodiment can be implemented in combination with any of the other embodiments described in this specification as appropriate.

Embodiment 4

In this embodiment, a structure example of a touch panel module including a touch panel of one embodiment of the present invention and an IC will be described with reference to drawings.

Figure 47:
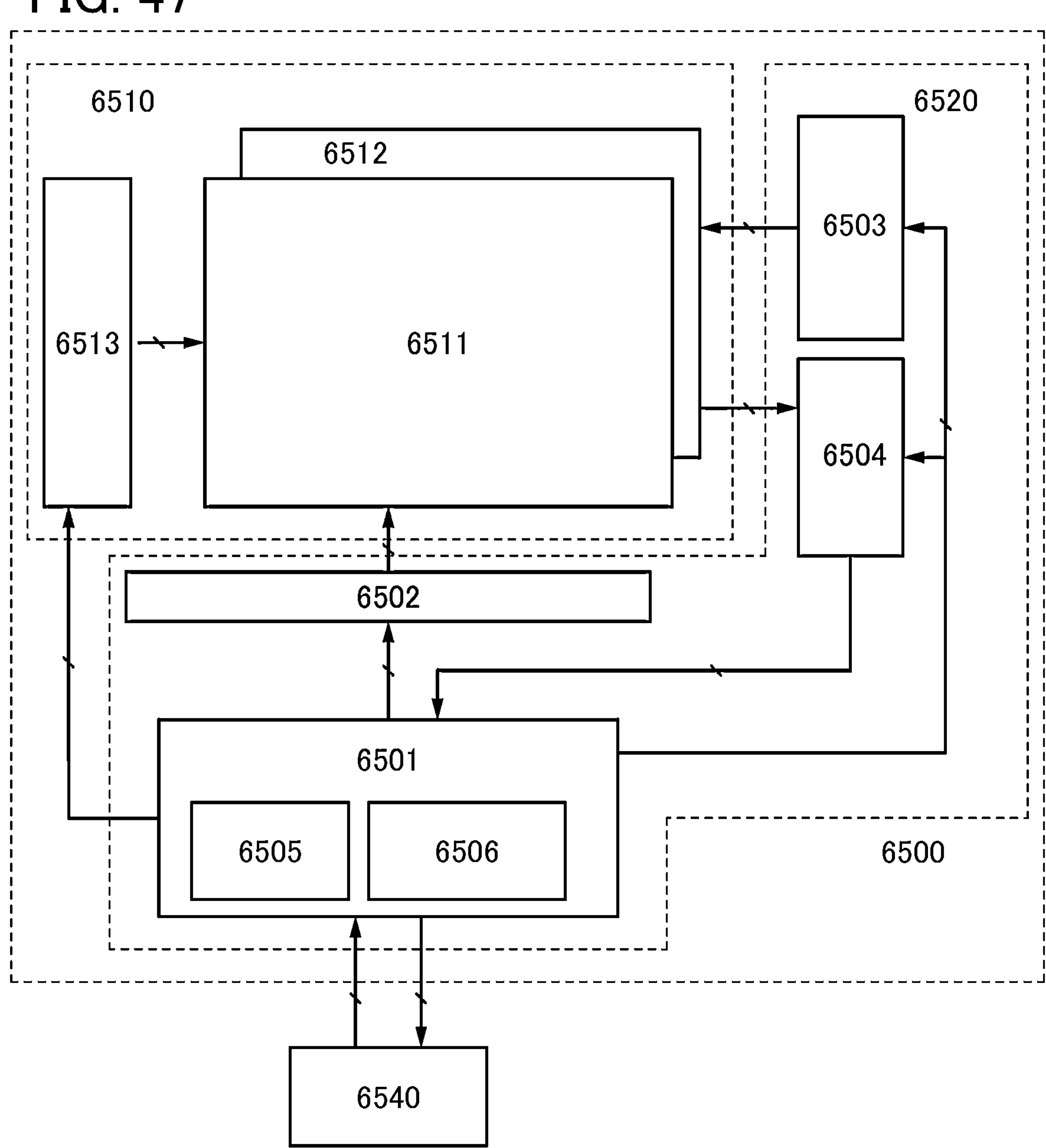
FIG. 47 is a block diagram of a touch panel module of an embodiment.

FIG. 47 is a block diagram of a touch panel module 6500. The touch panel module 6500 includes a touch panel 6510 and an IC 6520.

The touch panel 6510 includes a display portion 6511, an input portion 6512, and a scan line driver circuit 6513. The display portion 6511 includes a plurality of pixels, a plurality of signal lines, and a plurality of scan lines and has a function of displaying an image. The input portion 6512 includes a plurality of sensor elements for sensing the contact or approach of an object to the touch panel 6510 and functions as a touch sensor. The scan line driver circuit 6513 has a function of outputting scan signals to the scan lines included in the display portion 6511.

The display portion 6511 and the input portion 6512 are separately illustrated in the touch panel 6510 for simplicity; however, a so-called in-cell touch panel having both a function of displaying an image and a function of a touch sensor is preferable.

As a touch sensor that can be used for the input portion 6512, a capacitive touch sensor can be used. Examples of the capacitive touch sensor are a surface capacitive touch sensor and a projected capacitive touch sensor. Examples of the projected capacitive touch sensor include a self-capacitive touch sensor and a mutual capacitive touch sensor. The use of a mutual capacitive touch sensor is preferable because multiple points can be sensed simultaneously.

Note that one embodiment of the present invention is not limited thereto, and any of various sensors that can sense the approach or contact of an object such as a finger or a stylus can be used as the input portion 6512. For the touch sensor, in addition to a capacitive type, a variety of types such as a resistive type, a surface acoustic wave type, an infrared type, and an optical type can be used, for example.

As typical examples of the in-cell touch panel, a semi-in-cell type and a full-in-cell type can be given. The semi-in-cell type refers to a structure in which an electrode or the like included in a touch sensor is provided over a substrate that supports a display element and a counter substrate or over the counter substrate. Meanwhile, a full-in-cell type refers to a structure in which an electrode or the like included in a touch sensor is provided over a substrate that supports a display element. In the case of a full-in-cell touch panel, a structure of a counter substrate can be simplified, which is preferable. In particular, when an electrode included in a display element also serves as an electrode in a touch sensor in a full-in-cell touch sensor, a manufacturing process can be simplified and manufacturing cost can be reduced, which is preferable.

The resolution of the display portion 6511 is preferably as high as HD (number of pixels: 1280×720), FHD (number of pixels: 1920×1080), WQHD (number of pixels: 2560×1440), WQXGA (number of pixels: 2560×1600), 4K (number of pixels: 3840×2160), or 8K (number of pixels: 7680×4320). In particular, resolution of 4K, 8K, or higher is preferable. The pixel density (definition) of the pixels in the display portion 6511 is higher than or equal to 300 ppi, preferably higher than or equal to 500 ppi, more preferably higher than or equal to 800 ppi, more preferably higher than or equal to 1000 ppi, more preferably higher than or equal to 1200 ppi. The display portion 6511 with such high resolution and high definition enables an increase in a realistic sensation, sense of depth, and the like in personal use such as portable use and home use.

The IC 6520 includes a circuit unit 6501, a signal line driver circuit 6502, a sensor driver circuit 6503, and a sensing circuit 6504. The circuit unit 6501 includes a timing controller 6505, an image processing circuit 6506, or the like.

The signal line driver circuit 6502 has a function of outputting a video signal that is an analog signal to a signal line included in the display portion 6511. For example, the signal line driver circuit 6502 can include a shift register circuit and a buffer circuit in combination. The touch panel 6510 may include a demultiplexer circuit connected to a signal line.

The sensor driver circuit 6503 has a function of outputting a signal for driving a sensor element included in the input portion 6512. As the sensor driver circuit 6503, a shift register circuit and a buffer circuit can be used in combination, for example.

The sensing circuit 6504 has a function of outputting, to the circuit unit 6501, an output signal from the sensor element included in the input portion 6512. The sensing circuit 6504 can include an amplifier circuit and an analog-digital converter (ADC), for example. In that case, the sensing circuit 6504 converts an analog signal output from the input portion 6512 into a digital signal to be output to the circuit unit 6501.

The image processing circuit 6506 included in the circuit unit 6501 has a function of generating and outputting a signal for driving the display portion 6511 of the touch panel 6510, a function of generating and outputting a signal for driving the input portion 6512, and a function of analyzing a signal output from the input portion 6512 and outputting the signal to a CPU 6540.

As specific examples, the image processing circuit 6506 has the following functions: a function of generating a video signal in accordance with an instruction from the CPU 6540; a function of performing signal processing on a video signal in accordance with the specification of the display portion 6511, converting the signal into an analog video signal, and supplying the converted signal to the signal line driver circuit 6502; a function of generating a driving signal output to the sensor driver circuit 6503 in accordance with an instruction from the CPU 6540; and a function of analyzing a signal input from the sensing circuit 6504 and outputting the analyzed signal to the CPU 6540 as positional information.

The timing controller 6505 may have a function of generating and outputting a signal (e.g., a clock signal or a start pulse signal) output to the scan line driver circuit 6513 and the sensor driver circuit 6503 on the basis of a synchronization signal included in a video signal or the like on which the image processing circuit 6506 performs processing. Furthermore, the timing controller 6505 may have a function of generating and outputting a signal for determining timing when the sensing circuit 6504 outputs a signal. Here, the timing controller 6505 preferably outputs synchronized signals as the signal output to the scan line driver circuit 6513 and the signal output to the sensor driver circuit

6503. In particular, it is preferable that a period in which data in a pixel in the display portion 6511 is rewritten and a period in which sensing is performed with the input portion 6512 be separately provided. For example, the touch panel 6510 can be driven by dividing one frame period into a period in which data in a pixel is rewritten and a period in which sensing is performed. Furthermore, detection sensitivity and detection accuracy can be increased, for example, by providing two or more sensing periods in one frame period.

The image processing circuit 6506 can include a processor, for example. A microprocessor such as a digital signal processor (DSP) or a graphics processing unit (GPU) can be used, for example. Furthermore, such a microprocessor may be obtained with a programmable logic device (PLD) such as a field programmable gate array (FPGA) or a field programmable analog array (FPAA). The image processing circuit 6506 interprets and executes instructions from various programs with the processor to process various kinds of data and control programs. The programs executed by the processor may be stored in a memory region included in the processor or a memory device which is additionally provided.

A transistor which includes an oxide semiconductor in a channel formation region and has an extremely low off-state current can be used in the display portion 6511 or the scan line driver circuit 6513 included in the touch panel 6510, the circuit unit 6501, the signal line driver circuit 6502, the sensor driver circuit 6503, or the sensing circuit 6504 included in the IC 6520, the CPU 6540 provided outside the touch panel module 6500, or the like. With the use of the transistor having an extremely low off-state current as a switch for holding electric charge (data) which flows into a capacitor serving as a memory element, a long data retention period can be ensured. For example, by utilizing the characteristic for a register or a cache memory of the image processing circuit 6506, normally off computing is achieved where the image processing circuit 6506 operates only when needed and data on the previous processing is stored in the memory element in the rest of time; thus, power consumption of the touch panel module 6500 and an electronic device on which the touch panel module 6500 is mounted can be reduced.

Although the structure where the circuit unit 6501 includes the timing controller 6505 and the image processing circuit 6506 is used here, the image processing circuit 6506 itself or a circuit having a function of part of the image processing circuit 6506 may be provided outside the IC 6520. Alternatively, the CPU 6540 may have a function of the image processing circuit 6506 or part thereof. For example, the circuit unit 6501 can include the signal line driver circuit 6502, the sensor driver circuit 6503, the sensing circuit 6504, and the timing controller 6505.

Although the example where the IC 6520 includes the circuit unit 6501 is shown here, the structure where the circuit unit 6501 is not included in the IC 6520 may be employed. In that case, the IC 6520 can include the signal line driver circuit 6502, the sensor driver circuit 6503, and the sensing circuit 6504. For example, in the case where the touch panel module 6500 includes a plurality of ICs, the circuit unit 6501 may be separately provided and a plurality of ICs 6520 without the circuit unit 6501 may be provided, and alternatively, the IC 6520 and an IC including only the signal line driver circuit 6502 can be provided in combination.

When an IC has a function of driving the display portion 6511 of the touch panel 6510 and a function of driving the input portion 6512 as described above, the number of ICs mounted on the touch panel module 6500 can be reduced; accordingly, cost can be reduced.

Figure 48A:
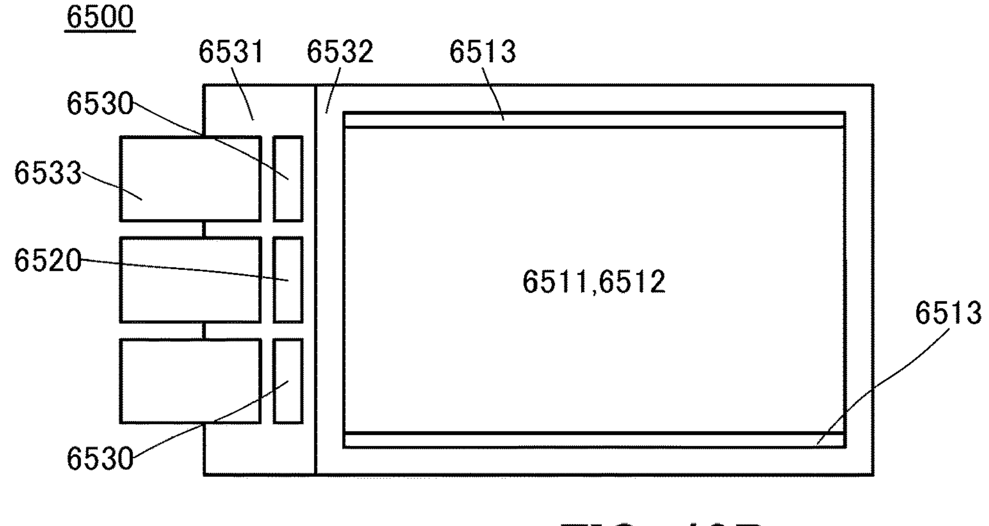
FIGS. 48A to 48C each show a structure example of a touch panel module of an embodiment.
Figure 48B:
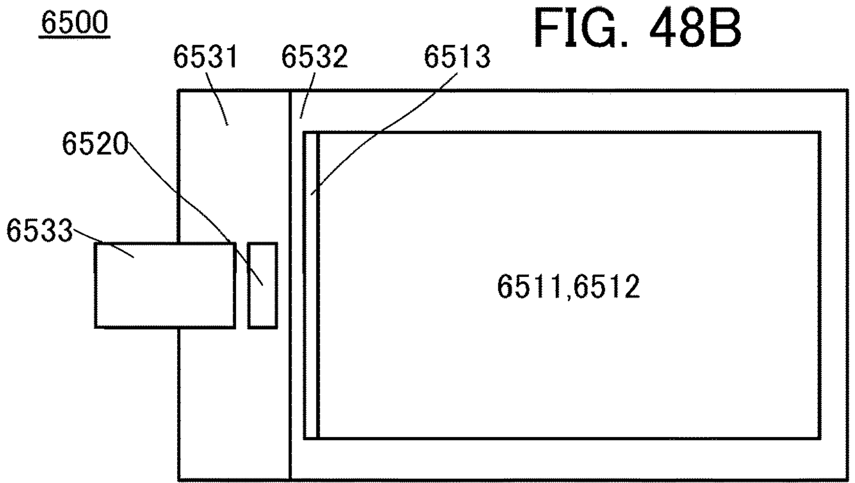
Figure 48C:
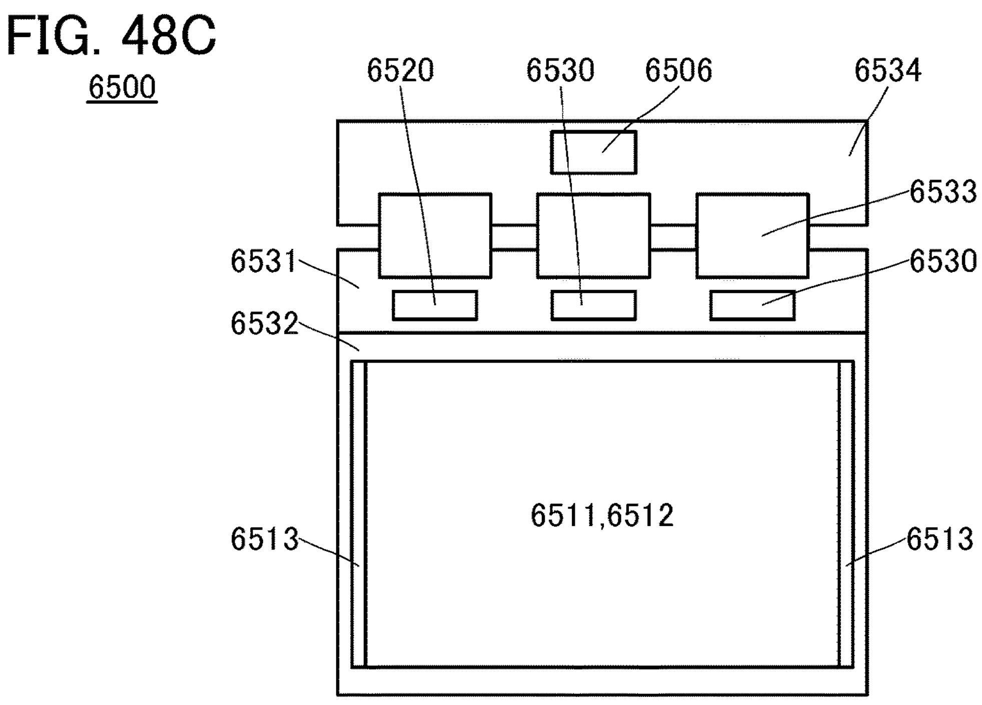

FIGS. 48A to 48C each are a schematic diagram of the touch panel module 6500 on which the IC 6520 is mounted.

In FIG. 48A, the touch panel module 6500 includes a substrate 6531, a counter substrate 6532, a plurality of FPCs 6533, the IC 6520, ICs 6530, and the like. The display portion 6511, the input portion 6512, and the scan line driver circuits 6513 are provided between the substrate 6531 and the counter substrate 6532. The IC 6520 and the ICs 6530 are mounted on the substrate 6531 by a COG method.

The IC 6530 is an IC in which only the signal line driver circuit 6502 is provided in the above-described IC 6520 or an IC in which the signal line driver circuit 6502 and the circuit unit 6501 are provided in the above-described IC 6520. The IC 6520 and the IC 6530 are supplied with a signal from the outside through the FPCs 6533. Furthermore, a signal can be output to the outside from the IC 6520 or the IC 6530 through the FPC 6533.

FIG. 48A illustrates an example where the display portion 6511 is positioned between two scan line driver circuits 6513. The ICs 6530 are provided in addition to the IC 6520. Such a structure is preferable in the case where the display portion 6511 has extremely high resolution.

FIG. 48B illustrates an example where one IC 6520 and one FPC 6533 are provided. It is preferable to bring functions into one IC 6520 in this manner because the number of components can be reduced. In the example in FIG. 48B, the scan line driver circuit 6513 is provided along a side close to the FPC 6533 among two short sides of the display portion 6511.

FIG. 48C illustrates an example where a printed circuit board (PCB) 6534 on which the image processing circuit 6506 and the like are mounted is provided. The ICs 6520 and 6530 over the substrate 6531 are electrically connected to the PCB 6534 through the FPCs 6533. The above-described structure without the image processing circuit 6506 can be applied to the IC 6520.

In each of FIGS. 48A to 48C, the IC 6520 or the IC 6530 may be mounted on the FPC 6533, not on the substrate 6531. For example, the IC 6520 or the IC 6530 may be mounted on the FPC 6533 by a chip on film (COF) method, a tape automated bonding (TAB) method, or the like.

A structure where the FPC 6533, the IC 6520 (and the IC 6530), or the like is provided on a short side of the display portion 6511 as illustrated in FIGS. 48A and 48B enables the frame of the display device to be narrowed; thus, the structure is preferably used for electronic devices such as smartphones, mobile phones, and tablet terminals, for example. The structure with the PCB 6534 illustrated in FIG. 48C can be preferably used for television devices, monitors, tablet terminals, or laptop personal computers, for example.

At least part of this embodiment can be implemented in combination with any of the other embodiments described in this specification as appropriate.

Embodiment 5

In this embodiment, a display module and electronic devices that include the display device of one embodiment of the present invention or a display system will be described with reference to FIG. 49, FIGS. 50A to 50H, FIGS. 51A and 51B, FIGS. 52A to 52H, FIGS. 53A1 to 53I, and FIGS. 54A to 54E.

Figure 49:
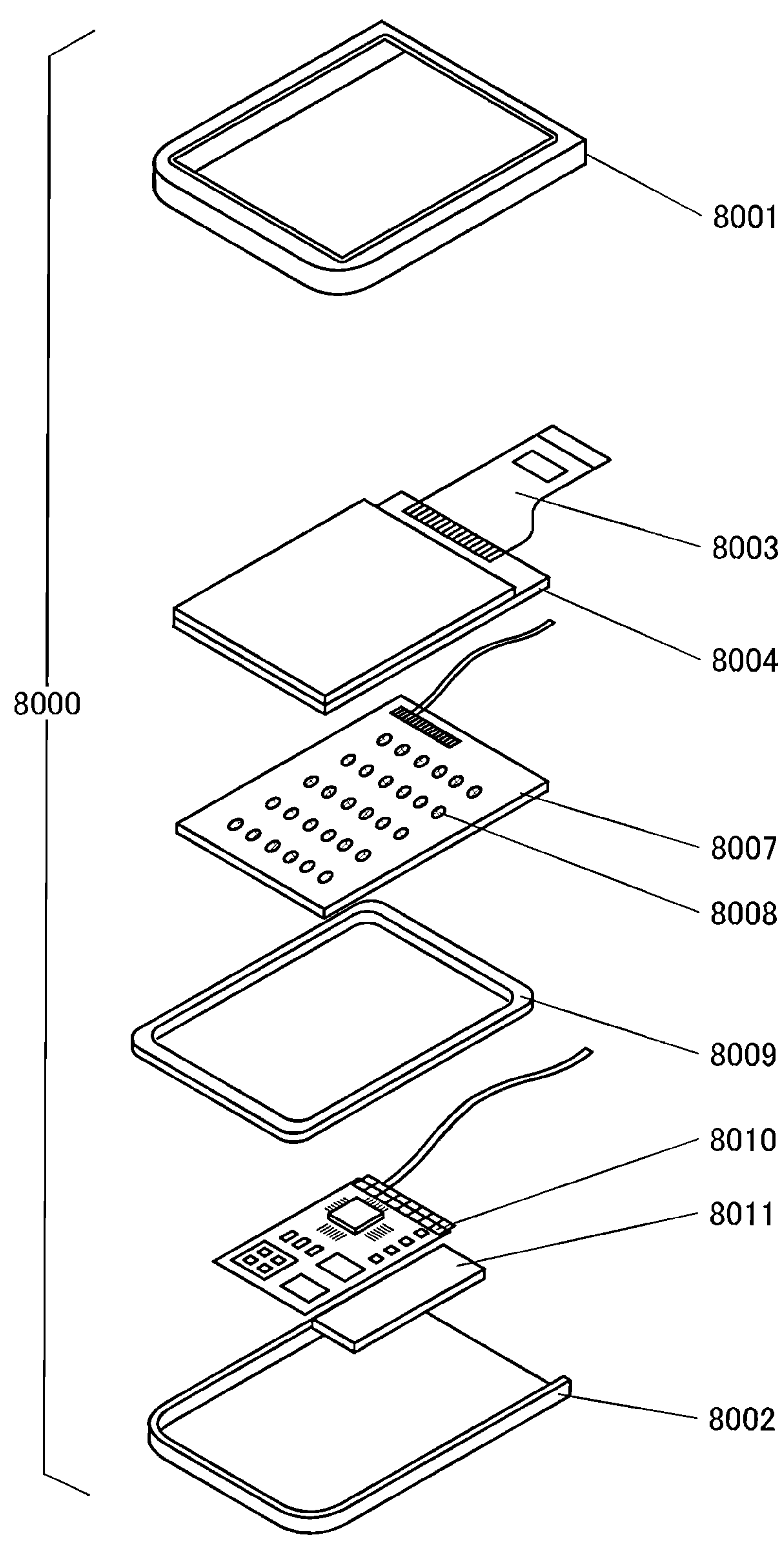
FIG. 49 illustrates a display module of an embodiment.

In a display module 8000 illustrated in FIG. 49, a touch panel 8004 connected to an FPC 8003, a frame 8009, a printed board 8010, and a battery 8011 are provided between an upper cover 8001 and a lower cover 8002.

The display panel, the touch panel, or the touch panel module of one embodiment of the present invention can be used for the touch panel 8004, for example.

The shapes and sizes of the upper cover 8001 and the lower cover 8002 can be changed as appropriate in accordance with the size of the touch panel 8004.

The touch panel 8004 can be a resistive touch panel or a capacitive touch panel and may be formed so as to overlap with a display panel. A counter substrate (sealing substrate) of the touch panel 8004 can have a touch panel function. A photosensor may be provided in each pixel of the touch panel 8004 so that an optical touch panel can be obtained.

In the case of a transmissive or a semi-transmissive liquid crystal element, a backlight 8007 may be provided as illustrated in FIG. 49. The backlight 8007 includes a light source 8008. Note that although a structure in which the light source 8008 is provided over the backlight 8007 is illustrated in FIG. 49, one embodiment of the present invention is not limited to this structure. For example, a structure in which the light source 8008 is provided at an end portion of the backlight 8007 and a light diffusion plate is further provided may be employed. Note that the backlight 8007 needs not be provided in the case where a self-luminous light-emitting element such as an organic EL element is used or in the case where a reflective panel or the like is employed.

The frame 8009 protects a display panel 8006 and functions as an electromagnetic shield for blocking electromagnetic waves generated by the operation of the printed board 8010. The frame 8009 can also function as a radiator plate.

The printed board 8010 is provided with a power supply circuit and a signal processing circuit for outputting a video signal and a clock signal. As a power source for supplying electric power to the power supply circuit, an external commercial power source or a power source using the battery 8011 provided separately may be used. The battery 8011 can be omitted in the case of using a commercial power source.

The touch panel 8004 can be additionally provided with a component such as a polarizing plate, a retardation plate, or a prism sheet.

Electronic devices and lighting devices can be manufactured by using the display panel, the light-emitting panel, the sensor panel, the touch panel, the touch panel module, the input device, the display device, or the input/output device of one embodiment of the present invention. Highly reliable electronic devices and lighting devices with curved surfaces can be manufactured by using the input device, the display device, or the input/output device of one embodiment of the present invention. In addition, flexible and highly reliable electronic devices and lighting devices can be manufactured by using the input device, the display device, or the input/output device of one embodiment of the present invention. Furthermore, electronic devices and lighting devices including touch sensors with improved detection sensitivity can be manufactured by using the input device or the input/output device of one embodiment of the present invention.

Examples of electronic devices include a television set (also referred to as a television or a television receiver), a monitor of a computer or the like, a digital camera, a digital video camera, a digital photo frame, a mobile phone (also referred to as a mobile phone device), a portable game machine, a portable information terminal, an audio reproducing device, a large game machine such as a pachinko machine, and the like.

In the case of having flexibility, the electronic device or the lighting device of one embodiment of the present invention can be incorporated along a curved inside/outside wall surface of a house or a building or a curved interior/exterior surface of a car.

Furthermore, the electronic device of one embodiment of the present invention may include a secondary battery. It is preferable that the secondary battery be capable of being charged by contactless power transmission.

As examples of the secondary battery, a lithium ion secondary battery such as a lithium polymer battery (lithium ion polymer battery) using a gel electrolyte, a lithium ion battery, a nickel-hydride battery, a nickel-cadmium battery, an organic radical battery, a lead-acid battery, an air secondary battery, a nickel-zinc battery, and a silver-zinc battery can be given.

The electronic device of one embodiment of the present invention may include an antenna. When a signal is received by the antenna, the electronic device can display an image, data, or the like on a display portion. When the electronic device includes a secondary battery, the antenna may be used for contactless power transmission.

FIGS. 50A to 50H and FIGS. 51A and 51B illustrate electronic devices. These electronic devices can each include a housing 5000, a display portion 5001, a speaker 5003, an LED lamp 5004, operation keys 5005 (including a power switch or an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone 5008, and the like.

Figures 50A, 50B, 50C, 50D, 50E, 50F, 50G, 50H:
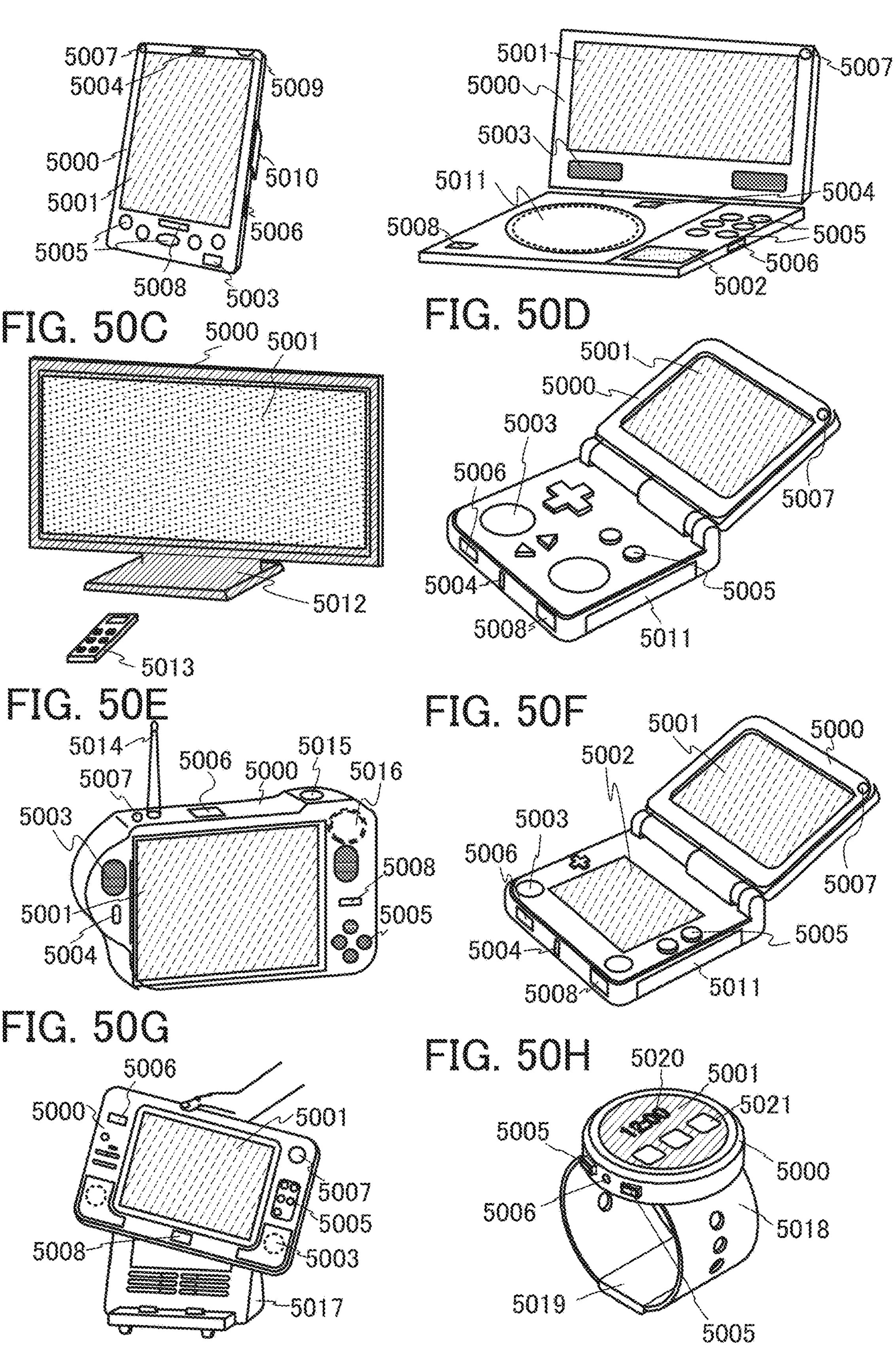
FIGS. 50A to 50H each illustrate an electronic device of an embodiment.

FIG. 50A illustrates a mobile computer, which can include a switch 5009, an infrared port 5010, and the like in addition to the above components.

FIG. 50B illustrates a portable image reproducing device provided with a recording medium (e.g., a DVD reproducing device), which can include a second display portion 5002, a recording medium reading portion 5011, and the like in addition to the above components.

FIG. 50C illustrates a television device, which can include a stand 5012 and the like in addition to the above components. The television device can be operated by an operation switch of the housing 5000 or a separate remote controller 5013. With operation keys of the remote controller 5013, channels and volume can be controlled, and images displayed on the display portion 5001 can be controlled. The remote controller 5013 may be provided with a display portion for displaying data output from the remote controller 5013.

FIG. 50D illustrates a portable game machine, which can include the recording medium reading portion 5011 and the like in addition to the above components.

FIG. 50E illustrates a digital camera that has a television reception function and can include an antenna 5014, a shutter button 5015, an image receiving portion 5016, and the like in addition to the above components.

FIG. 50F illustrates a portable game machine, which can include the second display portion 5002, the recording medium reading portion 5011, and the like in addition to the above components.

FIG. 50G illustrates a portable television receiver, which can include a charger 5017 capable of transmitting and receiving signals, and the like in addition to the above components.

FIG. 50H illustrates a wrist-watch-type information terminal, which can include a band 5018, a clasp 5019, and the like in addition to the above components. The display portion 5001 mounted in the housing 5000 also serving as a bezel includes a non-rectangular display region. The display portion 5001 can display an icon 5020 indicating time, another icon 5021, and the like.

Figure 51A:
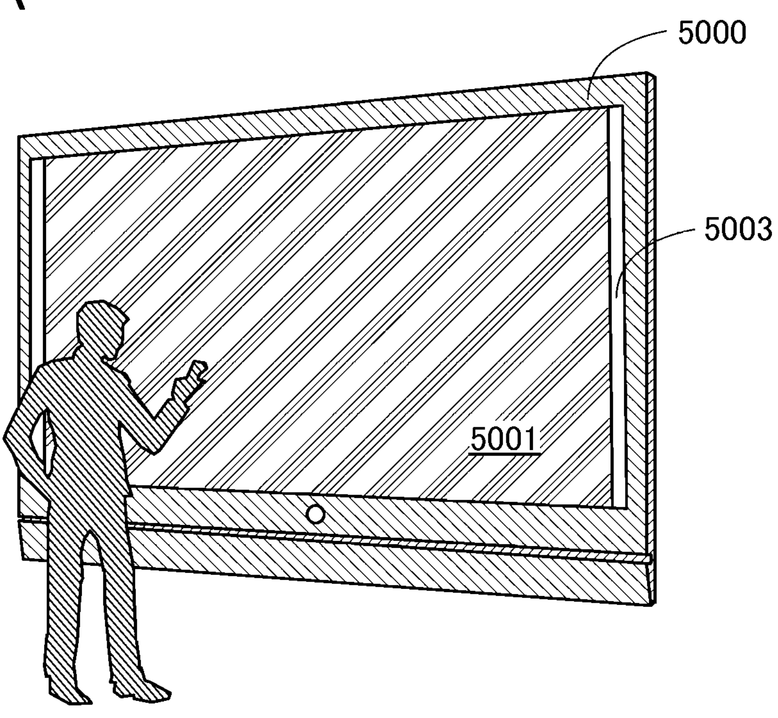
FIGS. 51A and 51B each illustrate an electronic device of an embodiment.
Figure 51B:
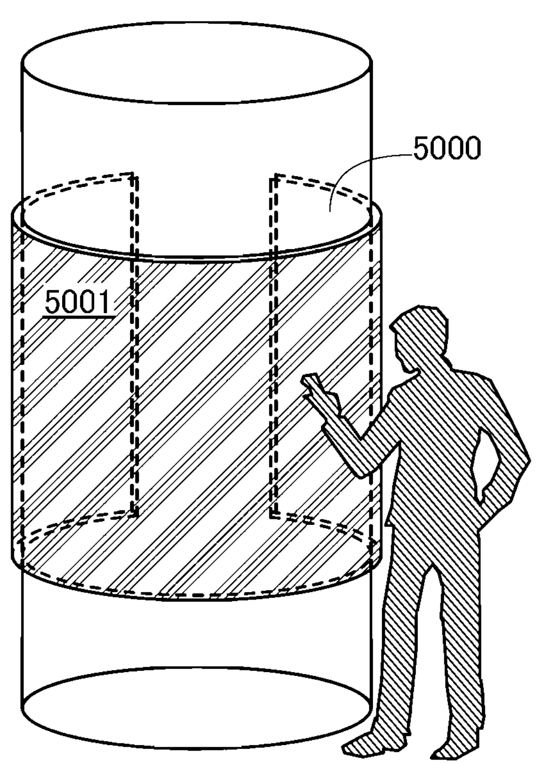

FIG. 51A illustrates a digital signage. FIG. 51B illustrates a digital signage mounted on a cylindrical pillar.

The electronic devices illustrated in FIGS. 50A to 50H and FIGS. 51A and 51B can have a variety of functions, for example, a function of displaying a variety of information (e.g., a still image, a moving image, and a text image) on a display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading a program or data stored in a recording medium and displaying the program or data on a display portion. Furthermore, the electronic device including a plurality of display portions can have a function of displaying image information mainly on one display portion while displaying text information mainly on another display portion, a function of displaying a three-dimensional image by displaying images where parallax is considered on a plurality of display portions, or the like. Furthermore, the electronic device including an image receiving portion can have a function of photographing a still image, a function of photographing a moving image, a function of automatically or manually correcting a photographed image, a function of storing a photographed image in a recording medium (an external recording medium or a recording medium incorporated in the camera), a function of displaying a photographed image on a display portion, or the like. Note that the functions of the electronic devices illustrated in FIGS. 50A to 50H and FIGS. 51A and 51B are not limited thereto, and the electronic devices can have a variety of functions.

FIGS. 52A, 52B, 52C1, 52C2, 52D, and 52E illustrate examples of an electronic device including a display portion 7000 with a curved surface. The display surface of the display portion 7000 is bent, and images can be displayed on the bent display surface. The display portion 7000 may be flexible.

The display portion 7000 can be formed using the display panel, the light-emitting panel, the sensor panel, the touch panel, the display device, the input/output device, or the like of one embodiment of the present invention. One embodiment of the present invention makes it possible to provide a highly reliable electronic device having a curved display portion.

Figures 52A, 52B, 52D, 52E, 52F, 52G, 52H:
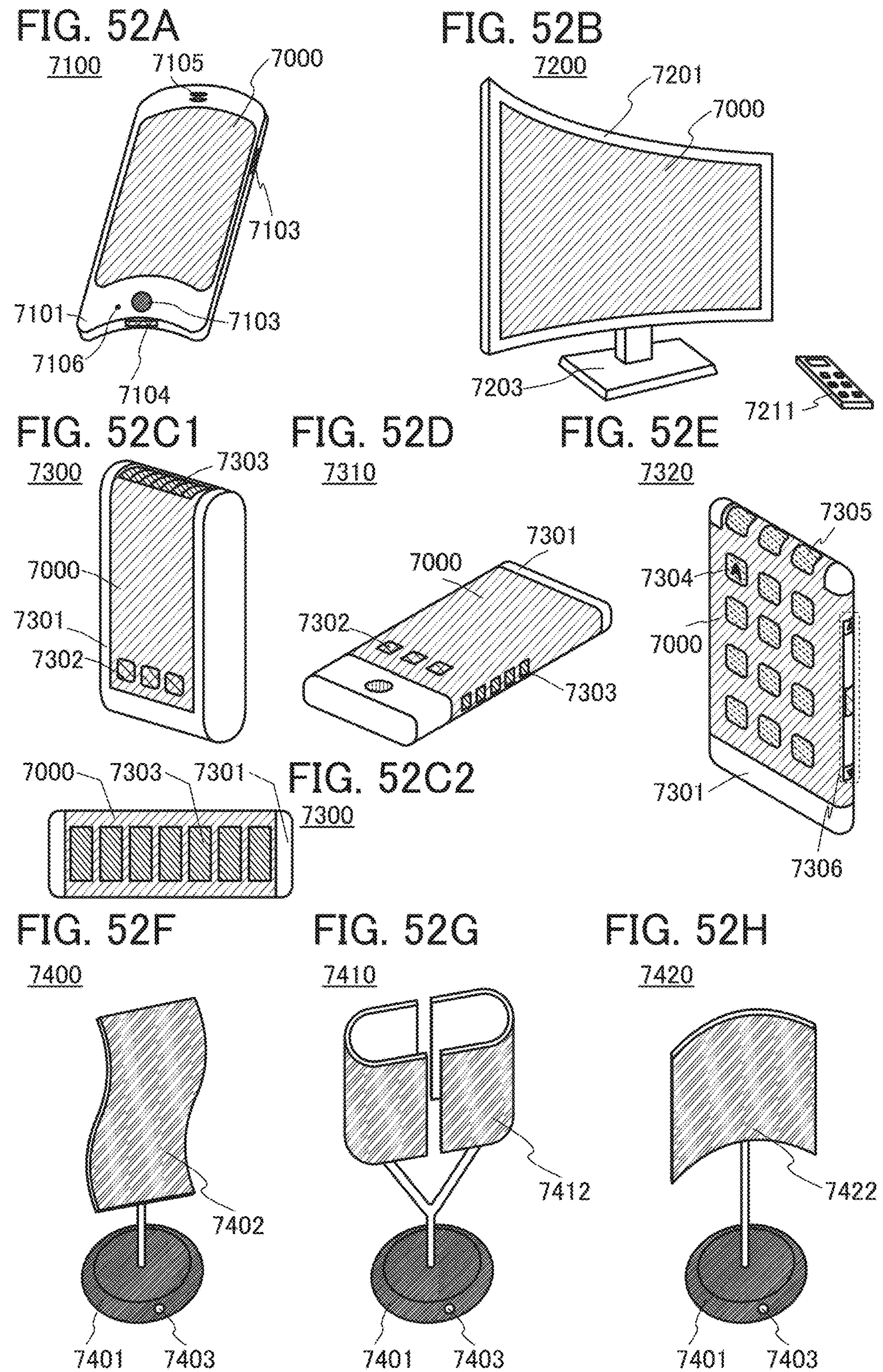

FIG. 52A illustrates an example of a mobile phone. A mobile phone 7100 includes a housing 7101, the display portion 7000, operation buttons 7103, an external connection port 7104, a speaker 7105, a microphone 7106, and the like.

The mobile phone 7100 illustrated in FIG. 52A includes a touch sensor in the display portion 7000. Moreover, operations such as making a call and inputting a letter can be performed by touch on the display portion 7000 with a finger, a stylus, or the like.

With the operation buttons 7103, power ON or OFF can be switched. In addition, types of images displayed on the display portion 7000 can be switched; for example, switching from a mail creation screen to a main menu screen can be performed.

FIG. 52B illustrates an example of a television set. In a television set 7200, the display portion 7000 is incorporated into a housing 7201. Here, the housing 7201 is supported by a stand 7203.

The television set 7200 illustrated in FIG. 52B can be operated with an operation switch of the housing 7201 or a separate remote controller 7211. The display portion 7000 may include a touch sensor. The display portion 7000 can be operated by touching the display portion with a finger or the like. The remote controller 7211 may be provided with a display portion for displaying data output from the remote controller 7211. With operation keys or a touch panel of the remote controller 7211, channels and volume can be controlled and images displayed on the display portion 7000 can be controlled.

The television set 7200 is provided with a receiver, a modem, and the like. A general television broadcast can be received with the receiver. When the television set is connected to a communication network with or without wires via the modem, one-way (from a transmitter to a receiver) or two-way (between a transmitter and a receiver or between receivers) data communication can be performed.

FIGS. 52C1, 52C2, 52D, and 52E illustrate examples of a portable information terminal. Each of the portable information terminals includes a housing 7301 and the display portion 7000. Each of the portable information terminals may also include an operation button, an external connection port, a speaker, a microphone, an antenna, a battery, or the like. The display portion 7000 is provided with a touch sensor. An operation of the portable information terminal can be performed by touching the display portion 7000 with a finger, a stylus, or the like.

FIG. 52C1 is a perspective view of a portable information terminal 7300. FIG. 52C2 is a top view of the portable information terminal 7300. FIG. 52D is a perspective view of a portable information terminal 7310. FIG. 52E is a perspective view of a portable information terminal 7320.

Each of the portable information terminals illustrated in this embodiment functions as, for example, one or more of a telephone set, a notebook, and an information browsing system. Specifically, the portable information terminals each can be used as a smartphone. Each of the portable information terminals illustrated in this embodiment is capable of executing a variety of applications such as mobile phone calls, e-mailing, reading and editing texts, music reproduction, Internet communication, and a computer game, for example.

The portable information terminals 7300, 7310, and 7320 can display characters and image information on its plurality of surfaces. For example, as illustrated in FIGS. 52C1 and 52D, three operation buttons 7302 can be displayed on one surface, and information 7303 indicated by a rectangle can be displayed on another surface. FIGS. 52C1 and 52C2 illustrate an example in which information is displayed at the top of the portable information terminal. FIG. 52D illustrates an example in which information is displayed on the side of the portable information terminal. Information may be displayed on three or more surfaces of the portable information terminal. FIG. 52E illustrates an example where information 7304, information 7305, and information 7306 are displayed on different surfaces.

Examples of the information include notification from a social networking service (SNS), display indicating reception of an e-mail or an incoming call, the title of an e-mail or the like, the sender of an e-mail or the like, the date, the time, remaining battery, and the reception strength of an antenna. Alternatively, the operation button, an icon, or the like may be displayed instead of the information.

For example, a user of the portable information terminal 7300 can see the display (here, the information 7303) on the portable information terminal 7300 put in a breast pocket of his/her clothes.

Specifically, a caller's phone number, name, or the like of an incoming call is displayed in a position that can be seen from above the portable information terminal 7300. Thus, the user can see the display without taking out the portable information terminal 7300 from the pocket and decide whether to answer the call.

FIGS. 52F to 52H each illustrate an example of a lighting device having a curved light-emitting portion.

The light-emitting portion included in each of the lighting devices illustrated in FIGS. 52F to 52H can be manufactured using the display panel, the light-emitting panel, the sensor panel, the touch panel, the display device, the input/output device, or the like of one embodiment of the present invention. According to one embodiment of the present invention, a highly reliable lighting device having a curved light-emitting portion can be provided.

A lighting device 7400 illustrated in FIG. 52F includes a light-emitting portion 7402 with a wave-shaped light-emitting surface and thus is a good-design lighting device.

A light-emitting portion 7412 included in a lighting device 7410 illustrated in FIG. 52G has two convex-curved light-emitting portions symmetrically placed. Thus, all directions can be illuminated with the lighting device 7410 as a center.

A lighting device 7420 illustrated in FIG. 52H includes a concave-curved light-emitting portion 7422. This is suitable for illuminating a specific range because light emitted from the concave-curved light-emitting portion 7422 is collected to the front of the lighting device 7420. In addition, with this structure, a shadow is less likely to be produced.

The light-emitting portion included in each of the lighting devices 7400, 7410 and 7420 may be flexible. The light-emitting portion may be fixed on a plastic member, a movable frame, or the like so that a light-emitting surface of the light-emitting portion can be bent freely depending on the intended use.

The lighting devices 7400, 7410, and 7420 each include a stage 7401 provided with an operation switch 7403 and the light-emitting portion supported by the stage 7401.

Note that although the lighting device in which the light-emitting portion is supported by the stage is described as an example here, a housing provided with a light-emitting portion can be fixed on a ceiling or suspended from a ceiling. Since the light-emitting surface can be curved, the light-emitting surface is curved to have a concave shape, whereby a particular region can be brightly illuminated, or the light-emitting surface is curved to have a convex shape, whereby a whole room can be brightly illuminated.

FIGS. 53A1, 53A2, 53B, 53C, 53D, 53E, 53F, 53G, 53H, and 53I each illustrate an example of a portable information terminal including a display portion 7001 having flexibility.

The display portion 7001 is manufactured using the display panel, the light-emitting panel, the sensor panel, the touch panel, the display device, the input/output device, or the like of one embodiment of the present invention. For example, a display device or an input/output device that can be bent with a radius of curvature of greater than or equal to 0.01 mm and less than or equal to 150 mm can be used. The display portion 7001 may include a touch sensor so that the portable information terminal can be operated by touching the display portion 7001 with a finger or the like. One embodiment of the present invention makes it possible to provide a highly reliable electronic device including a display portion having flexibility.

FIGS. 53A1 and 53A2 are a perspective view and a side view illustrating an example of the portable information terminal, respectively. A portable information terminal 7500 includes a housing 7501, the display portion 7001, a display portion tab 7502, operation buttons 7503, and the like.

The portable information terminal 7500 includes a rolled flexible display portion 7001 in the housing 7501.

The portable information terminal 7500 can receive a video signal with a control portion incorporated therein and can display the received video on the display portion 7001. The portable information terminal 7500 incorporates a battery. A terminal portion for connecting a connector may be included in the housing 7501 so that a video signal or power can be directly supplied from the outside with a wiring.

By pressing the operation buttons 7503, power ON/OFF, switching of displayed videos, and the like can be performed. Although FIGS. 53A1, 53A2, and 53B illustrate an example where the operation buttons 7503 are positioned on a side surface of the portable information terminal 7500, one embodiment of the present invention is not limited thereto. The operation buttons 7503 may be placed on a display surface (a front surface) or a rear surface of the portable information terminal 7500.

Figures 53B, 53C, 53D, 53E, 53F, 53G, 53H, 53I:
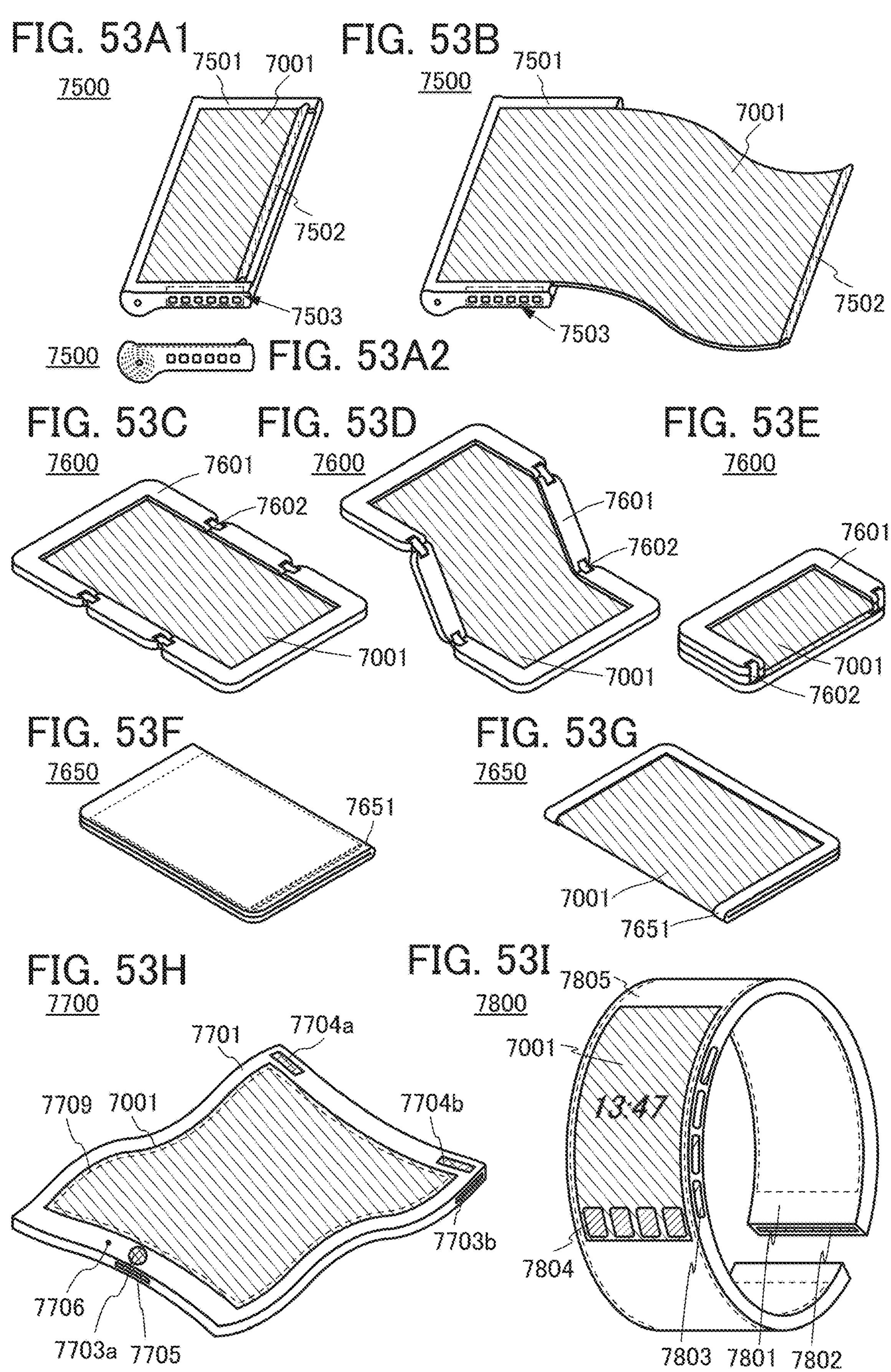

FIG. 53B illustrates the portable information terminal 7500 in a state where the display portion 7001 is pulled out with the display portion tab 7502. Videos can be displayed on the display portion 7001 in this state. In addition, the portable information terminal 7500 may perform different displays in the state where part of the display portion 7001 is rolled as shown in FIG. 53A1 and in the state where the display portion 7001 is pulled out with the display portion tab 7502 as shown in FIG. 53B. For example, in the state shown in FIG. 53A1, the rolled portion of the display portion 7001 is put in a non-display state, which results in a reduction in power consumption of the portable information terminal 7500.

A reinforcement frame may be provided for a side portion of the display portion 7001 so that the display portion 7001 has a flat display surface when pulled out.

Note that in addition to this structure, a speaker may be provided for the housing so that sound is output with an audio signal received together with a video signal.

FIGS. 53C to 53E illustrate an example of a foldable portable information terminal. FIG. 53C illustrates a portable information terminal 7600 that is opened. FIG. 53D illustrates the portable information terminal 7600 that is being opened or being folded. FIG. 53E illustrates the portable information terminal 7600 that is folded. The portable information terminal 7600 is highly portable when folded, and is highly browsable when opened because of a seamless large display area.

The display portion 7001 is supported by three housings 7601 joined together by hinges 7602. By folding the portable information terminal 7600 at a connection portion between two housings 7601 with the hinges 7602, the portable information terminal 7600 can be reversibly changed in shape from an opened state to a folded state.

FIGS. 53F and 53G illustrate an example of a foldable portable information terminal. FIG. 53F illustrates a portable information terminal 7650 that is folded so that the display portion 7001 is on the inside. FIG. 53G illustrates the portable information terminal 7650 that is folded so that the display portion 7001 is on the outside. The portable information terminal 7650 includes the display portion 7001 and a non-display portion 7651. When the portable information terminal 7650 is not used, the portable information terminal 7650 is folded so that the display portion 7001 is on the inside, whereby the display portion 7001 can be prevented from being contaminated or damaged.

FIG. 53H illustrates an example of a flexible portable information terminal. A portable information terminal 7700 includes a housing 7701 and the display portion 7001. The portable information terminal 7700 may include buttons 7703*a* and 7703*b* which serve as input means, speakers 7704*a* and 7704*b* which serve as sound output means, an external connection port 7705, a microphone 7706, or the like. A flexible battery 7709 can be included in the portable information terminal 7700. The battery 7709 may be arranged to overlap with the display portion 7001, for example.

The housing 7701, the display portion 7001, the battery 7709 are flexible. Thus, it is easy to curve the portable information terminal 7700 into a desired shape or to twist the portable information terminal 7700. For example, the portable information terminal 7700 can be folded so that the display portion 7001 is on the inside or on the outside. The portable information terminal 7700 can be used in a rolled state. Since the housing 7701 and the display portion 7001 can be transformed freely in this manner, the portable information terminal 7700 is less likely to be broken even when the portable information terminal 7700 falls down or external stress is applied to the portable information terminal 7700.

The portable information terminal 7700 can be used conveniently in various situations because the portable information terminal 7700 is lightweight. For example, the portable information terminal 7700 can be used in the state where the upper portion of the housing 7701 is suspended by a clip or the like, or in the state where the housing 7701 is fixed to a wall by magnets or the like.

FIG. 53I illustrates an example of a wrist-watch-type portable information terminal. The portable information terminal 7800 includes a band 7801, the display portion 7001, an input-output terminal 7802, operation buttons 7803, and the like. The band 7801 has a function of a housing. A flexible battery 7805 can be included in the portable information terminal 7800. The battery 7805 may overlap with the display portion 7001 and the band 7801, for example.

The band 7801, the display portion 7001, and the battery 7805 have flexibility. Thus, the portable information terminal 7800 can be easily curved to have a desired shape.

With the operation buttons 7803, a variety of functions such as time setting, ON/OFF of the power, ON/OFF of wireless communication, setting and cancellation of silent mode, and setting and cancellation of power saving mode can be performed. For example, the functions of the operation buttons 7803 can be set freely by the operating system incorporated in the portable information terminal 7800.

By touching an icon 7804 displayed on the display portion 7001 with a finger or the like, application can be started.

The portable information terminal 7800 can employ near field communication conformable to a communication standard. In that case, for example, mutual communication between the portable information terminal and a headset capable of wireless communication can be performed, and thus hands-free calling is possible.

The portable information terminal 7800 may include the input-output terminal 7802. In the case where the input-output terminal 7802 is included in the portable information terminal 7800, data can be directly transmitted to and received from another information terminal via a connector. Charging through the input-output terminal 7802 is also possible. Note that charging of the portable information terminal described as an example in this embodiment can be performed by contactless power transmission without using the input-output terminal.

FIGS. 54A to 54C illustrate an example of a watch-type foldable portable information terminal. A portable information terminal 7900 includes a display portion 7901, a housing 7902, a housing 7903, a band 7904, an operation button 7905, and the like.

The portable information terminal 7900 can be reversibly changed in shape from a state in which the housing 7902 overlaps with the housing 7903 as illustrated in FIG. 54A into a state in which the display portion 7901 is opened as illustrated in FIG. 54C by lifting the housing 7902 as illustrated in FIG. 54B. Therefore, the portable information terminal 7900 can be generally used in a state where the display portion 7901 is folded and can be used in a wide display region by developing the display portion 7901.

When the display portion 7901 functions as a touch panel, the portable information terminal 7900 can be operated by touching the display portion 7901. The portable information terminal 7900 can be operated by pushing, turning, or sliding the operation button 7905 vertically, forward, or backward.

A lock mechanism is preferably provided so that the housing 7902 and the housing 7903 are not detached from each other accidentally when overlapping with each other as illustrated in FIG. 54A. In that case, it is preferable that the lock state can be canceled by pushing the operation button 7905, for example. Alternatively, the lock state may be canceled by utilizing restoring force of a spring or the like as a mechanism in which the portable information terminal is automatically changed in form from the state illustrated in FIG. 54A into the state illustrated in FIG. 54C. Alternatively, the position of the housing 7902 relative to the housing 7903 may be fixed by utilizing magnetic force instead of the lock mechanism. By utilizing magnetic force, the housing 7902 and the housing 7903 can be easily attached or detached. For example, one of the housing 7902 and the housing 7903 is provided with a ferromagnet, and the other thereof is provided with a magnet such as a ferromagnet or a paramagnet so that the latter magnet overlaps with the former ferromagnet when the two housings overlap with each other.

Although the display portion 7901 can be opened in a direction substantially perpendicular to the bending direction of the band 7904 in FIGS. 54A to 54C, the display portion 7901 may be opened in a direction substantially parallel to the bending direction of the band 7904 as illustrated in FIGS. 54D and 54E. In that case, the display portion 7901 may be used in a bent state to be wound to the band 7904.

The electronic devices in this embodiment each include a display portion for displaying some kind of information. The display panel, the touch panel, the touch panel module, or the like of one embodiment of the present invention can be used for the display portion.

At least part of this embodiment can be implemented in combination with any of the other embodiments described in this specification as appropriate.

This application is based on Japanese Patent Application serial no. 2015-107248 filed with Japan Patent Office on May 27, 2015, the entire contents of which are hereby incorporated by reference.

What is claimed is:

1. A touch panel comprising:
a first transistor, a second transistor, a capacitor, and a touch sensor over a first substrate;
a first insulating layer over the first transistor, the second transistor, and the capacitor;
a second insulating layer over the first insulating layer;
a light-emitting element over the second insulating layer;
a second substrate over the light-emitting element; and
a polarizing plate overlapping with the light-emitting element,
wherein the first transistor comprises a first gate electrode, a first semiconductor layer, and a first gate insulating layer between the first gate electrode and the first semiconductor layer,
wherein the second transistor comprises a second semiconductor layer,
wherein the touch panel further comprises:
a first conductive layer over the second substrate; and
a second conductive layer over the first gate insulating layer,
wherein the first conductive layer comprises a first portion configured to function as the first gate electrode of the first transistor and a second portion configured to function as one electrode of the capacitor, and
wherein the second conductive layer comprises a first portion in contact with the first conductive layer and a second portion configured to function as one of a source electrode and a drain electrode of the second transistor.

2. The touch panel according to claim 1,
wherein the touch sensor comprises a first wiring and a second wiring,
wherein, when seen from above, the first wiring comprises a portion parallel to a signal line, and
wherein, when seen from above, the second wiring comprises a portion parallel to a scan line.

3. The touch panel according to claim 1,
wherein the polarizing plate is positioned below the first substrate.

4. A touch panel comprising:
a first transistor, a second transistor, a capacitor, and a touch sensor over a first substrate; and
a polarizing plate below the first substrate,
wherein the first transistor comprises a first gate electrode, a first semiconductor layer, and a first gate insulating layer between the first gate electrode and the first semiconductor layer,
wherein the second transistor comprises a second semiconductor layer,
wherein the touch panel further comprises:
a first conductive layer over the second substrate; and
a second conductive layer over the first gate insulating layer,
wherein the first conductive layer comprises a first portion configured to function as the first gate electrode of the first transistor and a second portion configured to function as one electrode of the capacitor, and
wherein the second conductive layer comprises a first portion in contact with the first conductive layer and a second portion configured to function as one of a source electrode and a drain electrode of the second transistor.

5. The touch panel according to claim 4,
wherein the touch sensor comprises a first wiring and a second wiring,
wherein, when seen from above, the first wiring comprises a portion parallel to a signal line, and
wherein, when seen from above, the second wiring comprises a portion parallel to a scan line.

* * * * *